United States Patent
Sandgren et al.

(10) Patent No.: US 12,553,684 B2
(45) Date of Patent: Feb. 17, 2026

(54) NON-LETHAL GAS OPERATED GUN

(71) Applicant: Unit Solutions, Inc., Culver City, CA (US)

(72) Inventors: Glenn Sandgren, Culver City, CA (US); Juan D. Tobón, Culver City, CA (US); Nathaniel Jacob Leon, Baltimore, MD (US); Christopher Blodgett, Downers Grove, IL (US); Daniel Luby, Downers Grove, IL (US); Charles Miller, Downers Grove, IL (US); Jamie Scott Snider, Culver City, CA (US); Sol Cody Snider, Culver City, CA (US); Zachary Christopher Lloyd, Culver City, CA (US)

(73) Assignee: Unit Solutions, Inc., Culver City, CA (US)

( * ) Notice: Subject to any disclaimer, the term of this patent is extended or adjusted under 35 U.S.C. 154(b) by 164 days.

(21) Appl. No.: 18/594,041

(22) Filed: Mar. 4, 2024

(65) Prior Publication Data

US 2024/0344801 A1   Oct. 17, 2024

Related U.S. Application Data

(63) Continuation of application No. 17/712,474, filed on Apr. 4, 2022, now Pat. No. 11,920,887, which is a
(Continued)

(51) Int. Cl.
*F41B 11/02* (2006.01)
*F41A 33/06* (2006.01)
(Continued)

(52) U.S. Cl.
CPC ............. *F41B 11/62* (2013.01); *F41A 33/06* (2013.01); *F41B 11/50* (2013.01); *F41B 11/56* (2013.01); *F41B 11/721* (2013.01); *F41B 11/73* (2013.01)

(58) Field of Classification Search
CPC ........... F41B 11/00; F41B 11/50; F41B 11/55; F41B 11/56; F41B 11/62; F41B 11/72
See application file for complete search history.

(56) References Cited

U.S. PATENT DOCUMENTS

| 3,603,020 A | 9/1971 | Wise |
| 4,616,622 A * | 10/1986 | Milliman ................ F41B 11/72 251/324 |

(Continued)

FOREIGN PATENT DOCUMENTS

| EP | 2 113 736 A1 | 11/2009 |
| EP | 2 354 750 A2 | 8/2011 |

(Continued)

OTHER PUBLICATIONS

Austrian Office Action dated Feb. 13, 2020 received in related Application No. A 9277/2017 (pp. 4).
(Continued)

*Primary Examiner* — John A Ricci
(74) *Attorney, Agent, or Firm* — Woodard, Emhardt, Henry, Reeves & Wagner, LLP

(57) ABSTRACT

A pre-pack assembly for use with an air gun and for use with a magazine that is removably insertable into the air gun, the pre-pack assembly includes a pre-pack that contains a gas canister, wherein inserting the pre-pack into the chamber of the magazine fluidly connects the gas canister with the magazine.

20 Claims, 84 Drawing Sheets

Related U.S. Application Data continuation-in-part of application No. 17/066,912, filed on Oct. 9, 2020, now Pat. No. 11,293,718, which is a continuation of application No. 16/193,304, filed on Nov. 16, 2018, now Pat. No. 10,801,804, which is a continuation-in-part of application No. 15/690,179, filed on Aug. 29, 2017, now Pat. No. 10,132,591.

(60) Provisional application No. 62/644,619, filed on Mar. 19, 2018, provisional application No. 62/380,947, filed on Aug. 29, 2016.

(51) Int. Cl.
| | |
|---|---|
| *F41B 11/06* | (2006.01) |
| *F41B 11/32* | (2006.01) |
| *F41B 11/50* | (2013.01) |
| *F41B 11/56* | (2013.01) |
| *F41B 11/62* | (2013.01) |
| *F41B 11/721* | (2013.01) |
| *F41B 11/73* | (2013.01) |

(56) References Cited

U.S. PATENT DOCUMENTS

| | | | |
|---|---|---|---|
| 4,819,610 A * | 4/1989 | Lacam | F41B 11/721 124/75 |
| 5,476,087 A | 12/1995 | Kunimoto | |
| 5,477,843 A | 12/1995 | Kunimoto | |
| 5,664,552 A | 9/1997 | Kunimoto | |
| 5,704,342 A * | 1/1998 | Gibson | F41B 11/62 124/76 |
| 6,073,620 A | 6/2000 | Kunimoto | |
| 6,112,734 A | 9/2000 | Kunimoto | |
| 6,470,872 B1 | 10/2002 | Tiberius | |
| 6,494,194 B2 | 12/2002 | Shipachev | |
| 6,729,322 B2 | 5/2004 | Schavone | |
| 6,892,718 B2 * | 5/2005 | Tiberius | F41B 11/51 124/56 |
| 7,237,543 B2 | 7/2007 | Su | |
| 7,306,462 B2 | 12/2007 | Metcalfe | |
| 7,415,977 B2 | 8/2008 | Chen | |
| 7,540,280 B2 | 6/2009 | Liao | |
| 7,861,702 B1 | 1/2011 | Sze | |
| 8,051,847 B2 | 11/2011 | Hu | |
| 8,056,276 B2 | 11/2011 | Hu | |
| 8,449,346 B2 | 5/2013 | Lee | |
| 8,602,785 B2 | 12/2013 | Jensen | |
| 8,833,353 B2 * | 9/2014 | Cho | F41B 11/721 124/73 |
| 9,038,304 B1 | 5/2015 | Hu | |
| 9,134,089 B2 | 9/2015 | Yang | |
| 9,194,647 B2 | 11/2015 | Maeda | |
| 9,395,146 B2 | 7/2016 | Tippmann, Jr. et al. | |
| 9,638,498 B2 | 5/2017 | Chang | |
| 9,791,236 B2 | 10/2017 | Lee | |
| 9,835,406 B2 | 12/2017 | Maeda | |
| 10,132,591 B2 | 11/2018 | Sandgren et al. | |
| 10,801,804 B2 | 10/2020 | Sandgren et al. | |
| 11,293,718 B2 | 4/2022 | Sandgren et al. | |
| 11,313,642 B2 * | 4/2022 | DiBlasio | F41B 11/62 |
| 2004/0200466 A1 | 10/2004 | Salva | |
| 2004/0256008 A1 | 12/2004 | Huang | |
| 2005/0133393 A1 | 6/2005 | Lawrence et al. | |
| 2006/0207584 A1 | 9/2006 | Yeh | |
| 2007/0215137 A1 | 9/2007 | Jones et al. | |
| 2007/0235014 A1 * | 10/2007 | Tiberius | F41B 11/723 124/52 |
| 2008/0289613 A1 | 11/2008 | Liao | |
| 2009/0229591 A1 * | 9/2009 | Gabrel | F41B 11/62 124/73 |
| 2011/0252957 A1 | 10/2011 | Overstreet | |
| 2011/0303206 A1 | 12/2011 | Lu | |
| 2014/0096755 A1 | 4/2014 | Larmer | |
| 2017/0176132 A1 | 6/2017 | Kng | |
| 2017/0336169 A1 * | 11/2017 | Axelsson | F41B 11/62 |

FOREIGN PATENT DOCUMENTS

| | | |
|---|---|---|
| EP | 2 455 700 A2 | 5/2012 |
| EP | 2 787317 A1 | 10/2014 |
| GB | 2 395 543 A | 5/2004 |
| JP | 338593 | 4/1991 |
| JP | H03236598 A | 10/1991 |
| JP | 2610610 B | 5/1997 |
| JP | 10220993 A | 8/1998 |
| JP | 2006308153 A | 11/2006 |
| JP | 5167434 | 3/2013 |
| JP | 2016029326 A | 3/2016 |
| KR | 101698115 B1 | 3/2017 |
| TW | M404964 U1 | 6/2011 |
| TW | 201721079 A | 12/2016 |

OTHER PUBLICATIONS

European Extended Search Report dated Feb. 20, 2020 received in related EP Application No. 17847409.4 (pp. 8).
KWA Operator's Manual for LM4 Series, KWA Performance Industries, Inc., City of Industry, California, Apr. 20, 2015.
Machine translation of JP2016029326 by PatBase on Mar. 12, 2020 (41 pages).
Machine translation of JPH10220993 by Patent Translate European Patent Office on Nov. 7, 2019 (pp. 19).
Taiwan Office Action received in related Taiwan Application No. 107107077 dated Jun. 25, 2021 (pp. 5).
Translation of Taiwan Office Action for related Taiwan Application No. 1071077077 dated Jun. 25, 2021 (pp. 4).
Machine Translation of TWM404964U1 by PatDocs PDF Export on Jun. 13, 2024 (pp. 9).

* cited by examiner

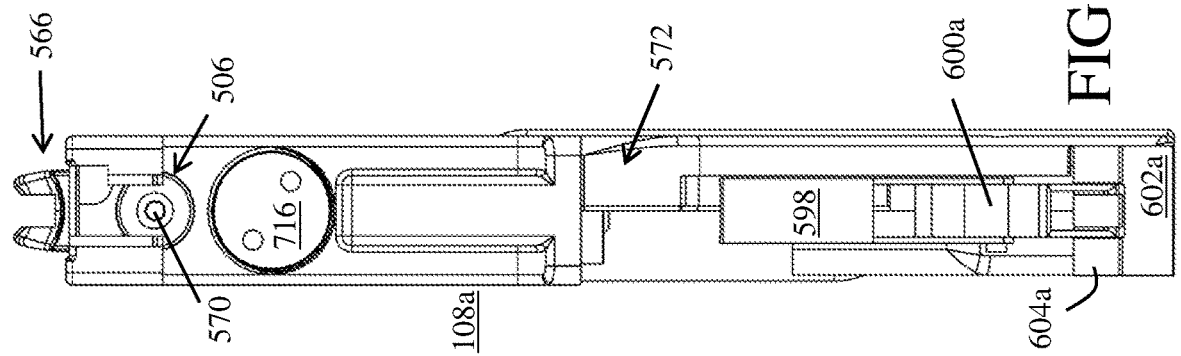
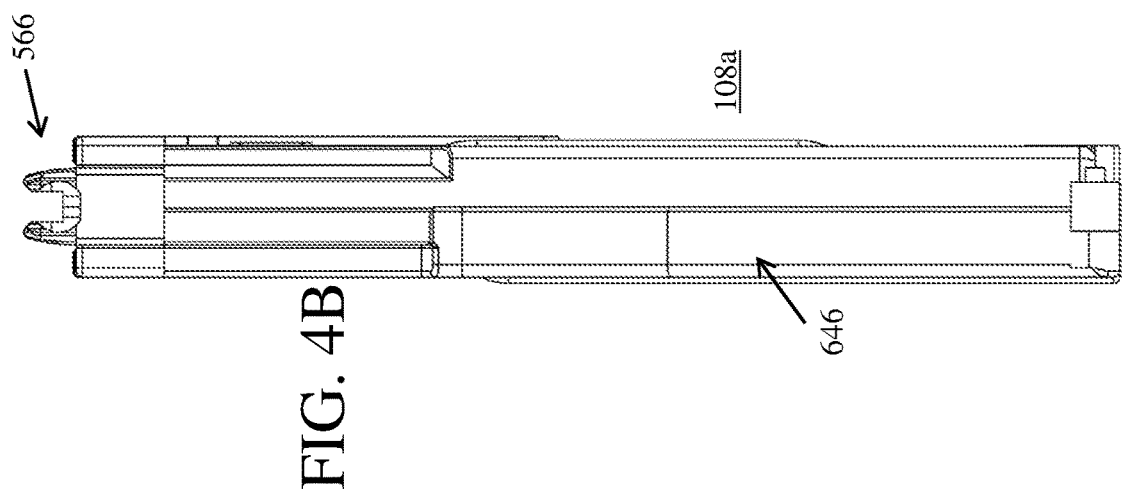
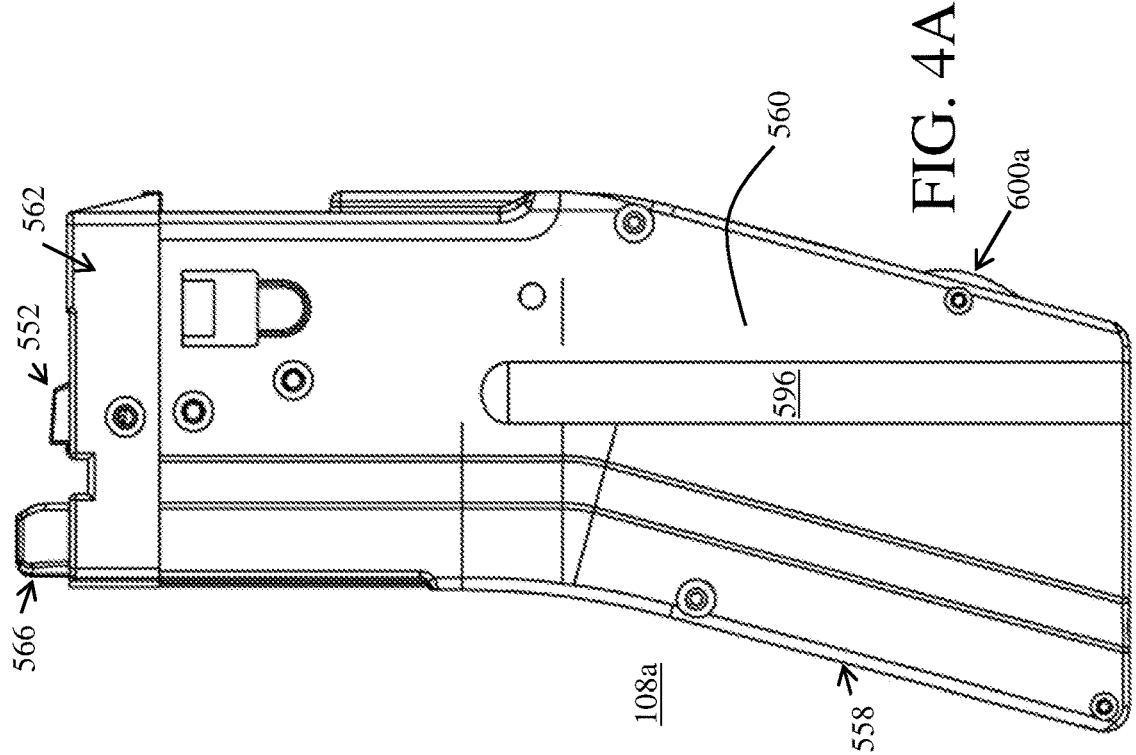

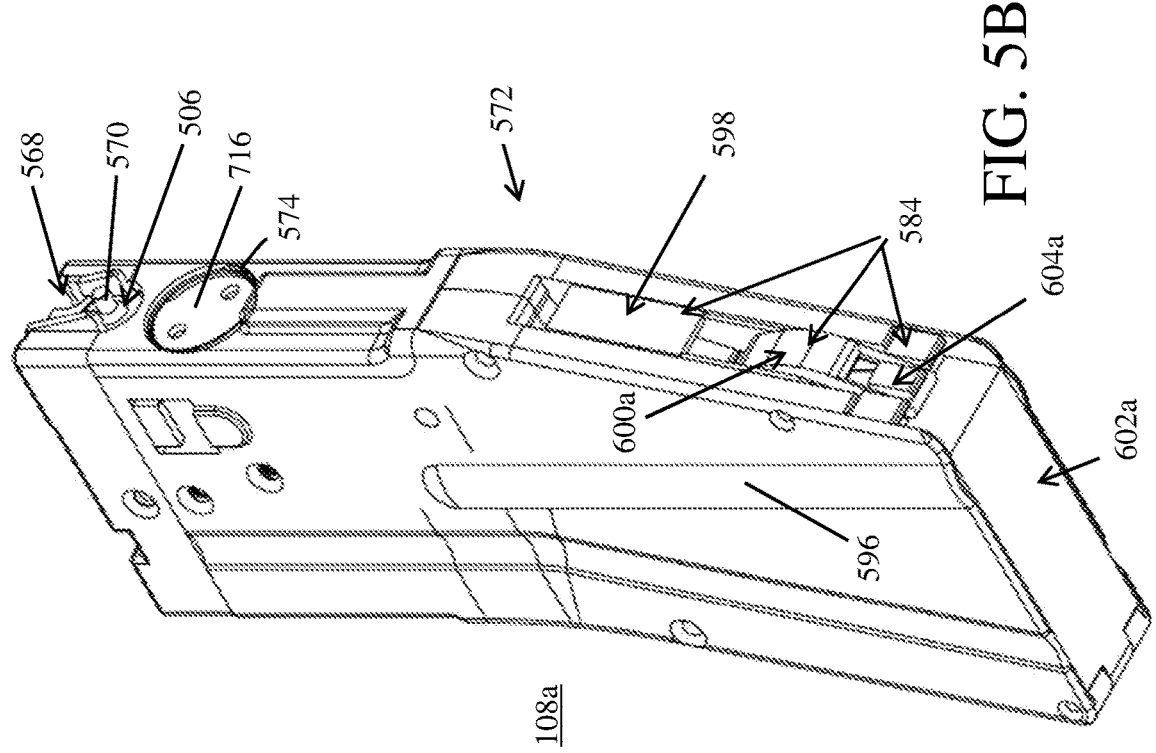
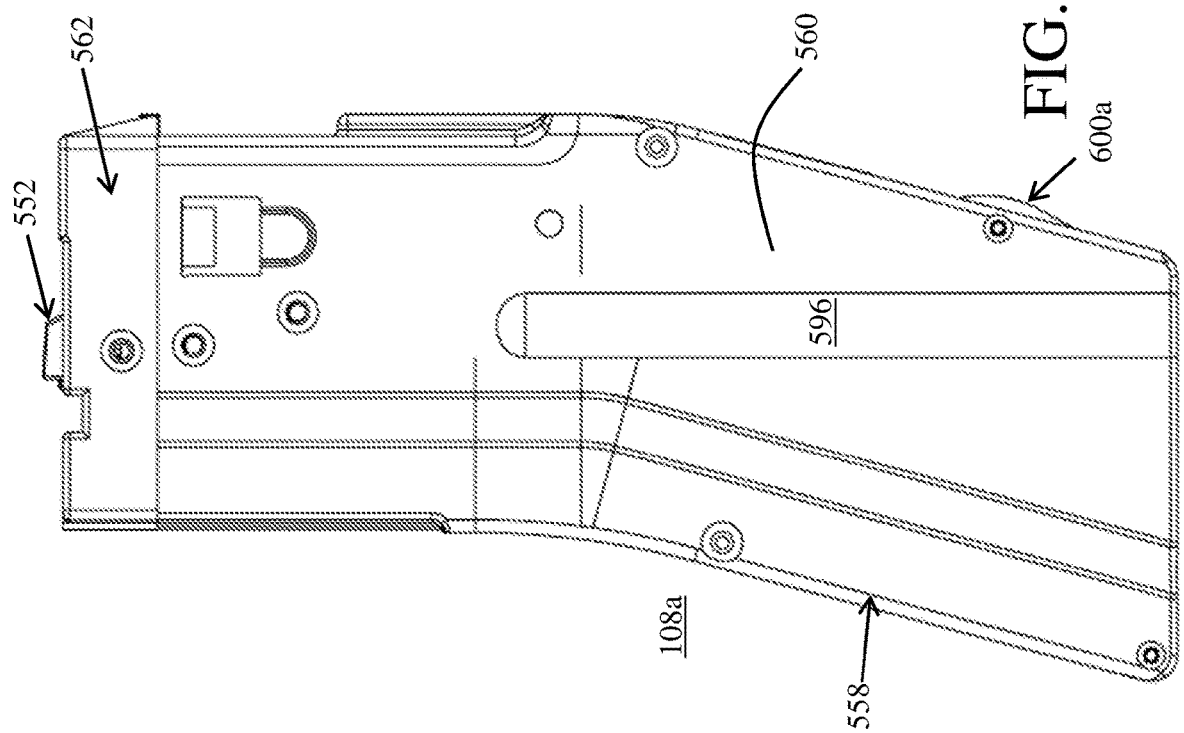

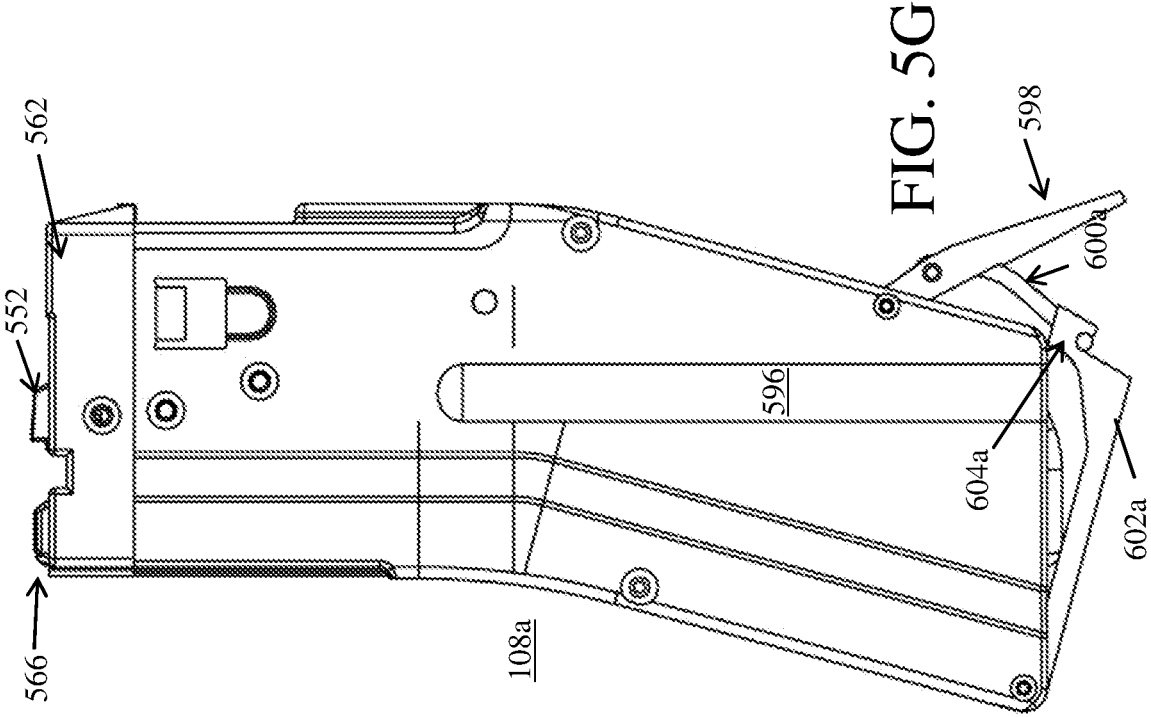
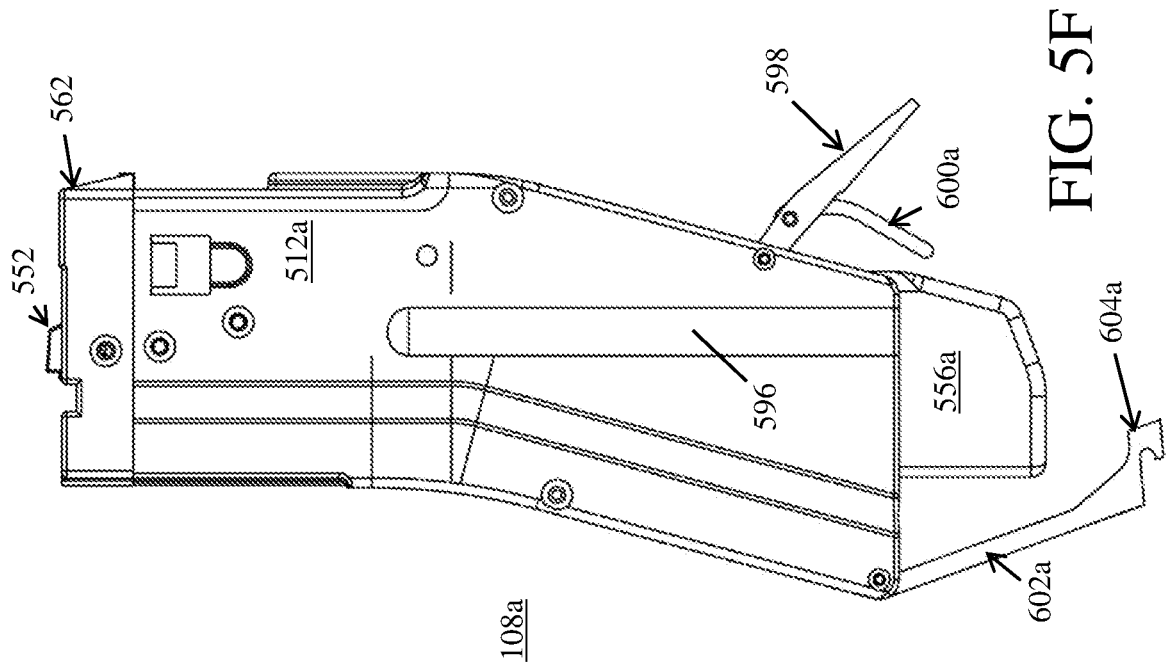

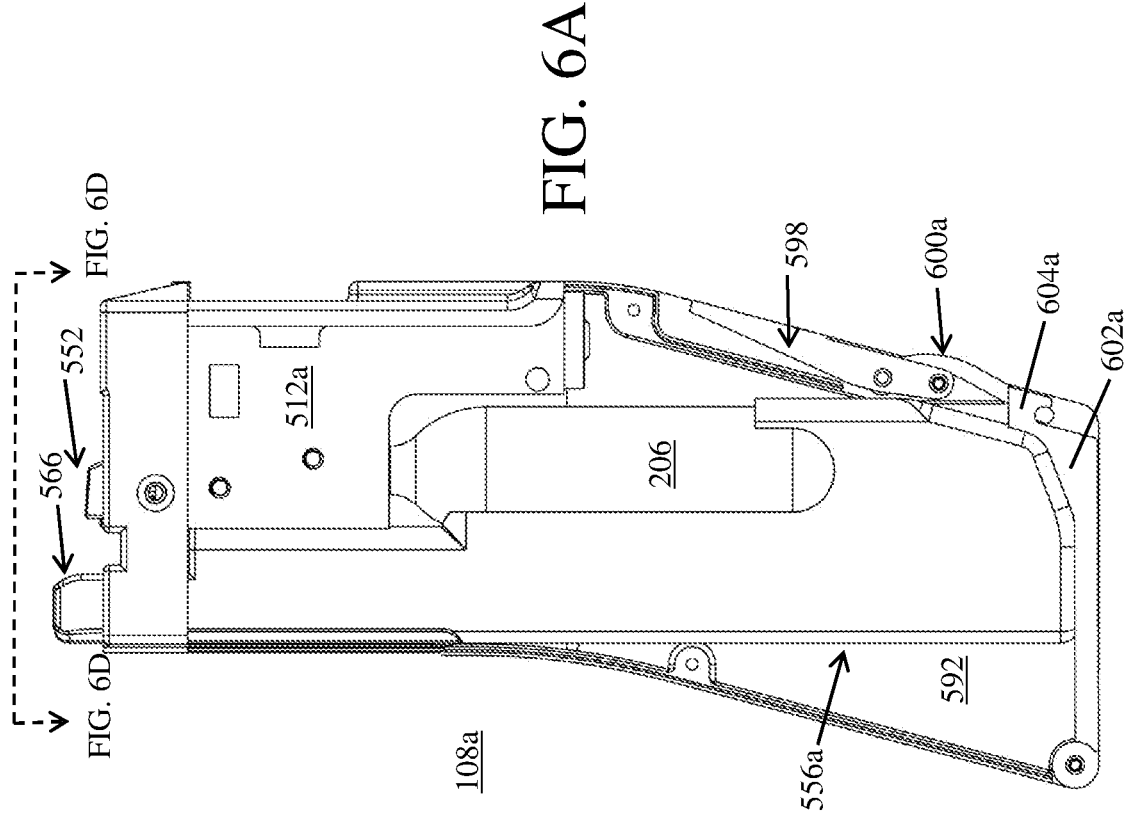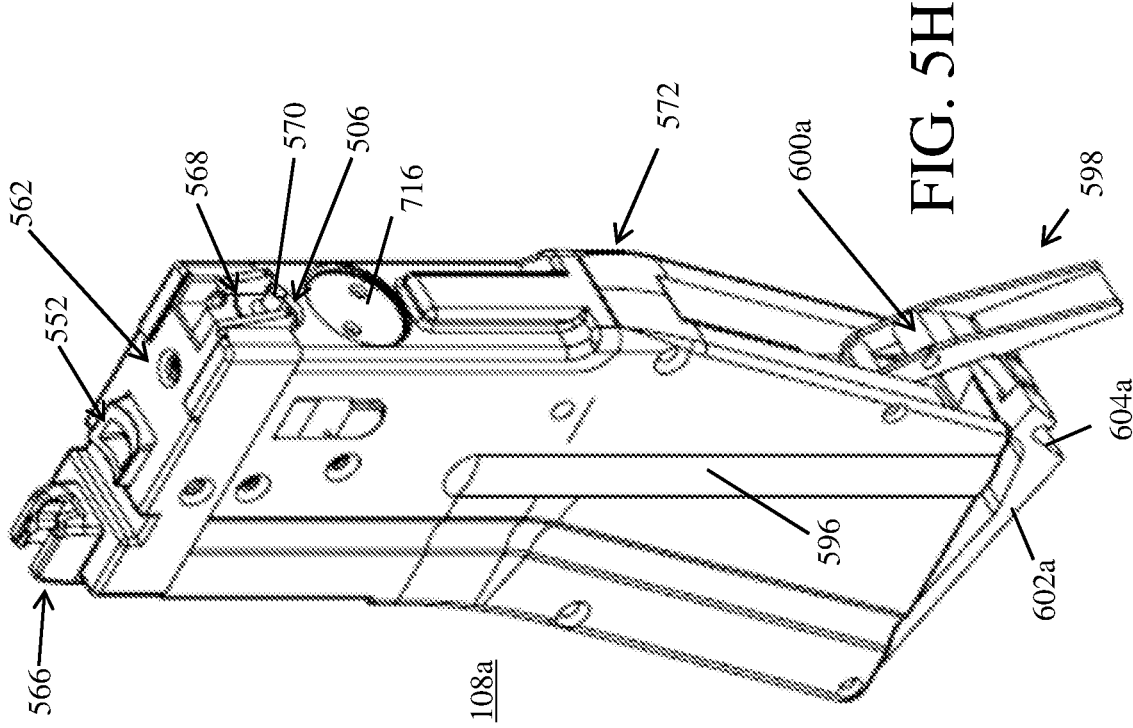

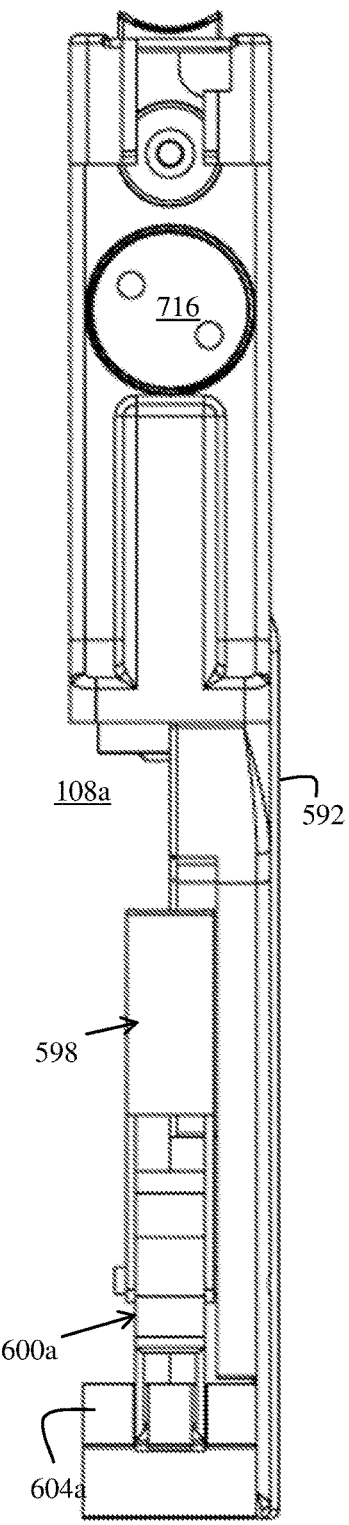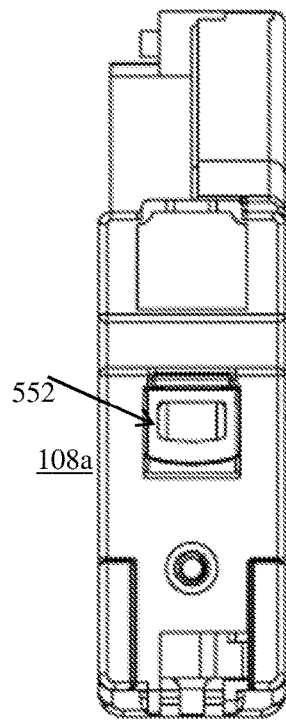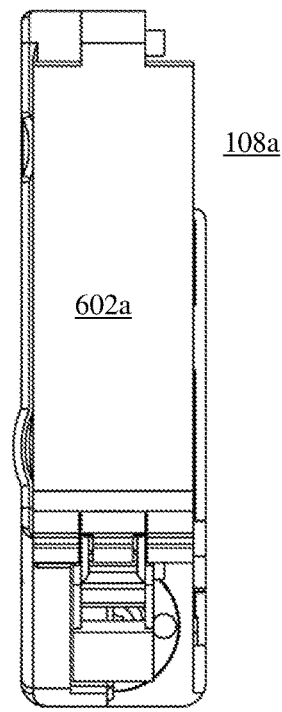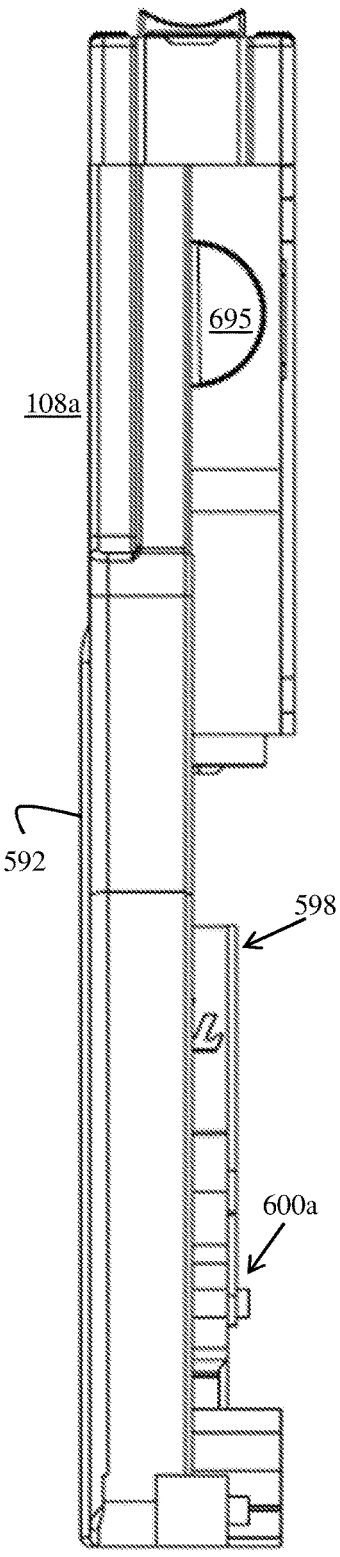
FIG. 7C
FIG. 7F
FIG. 7D
FIG. 7E

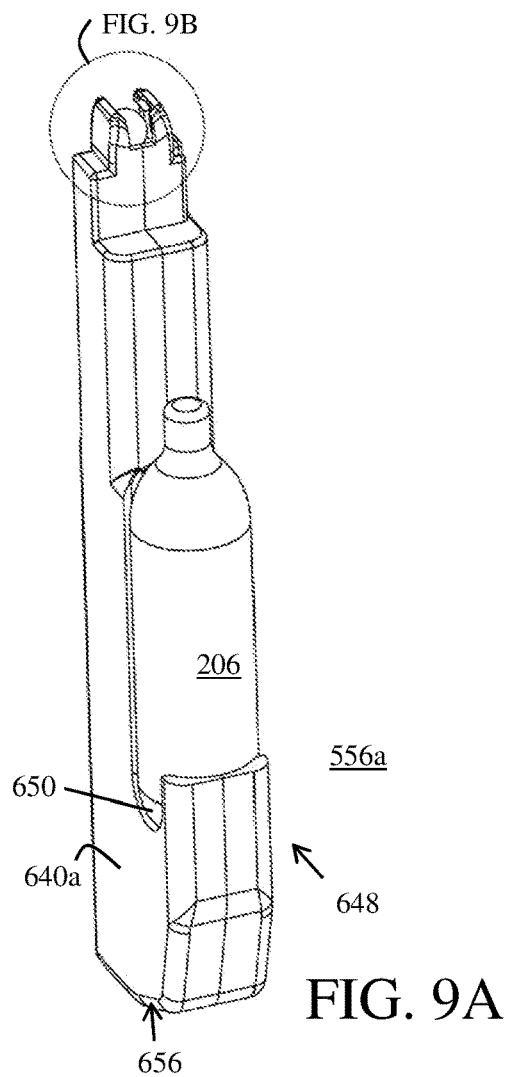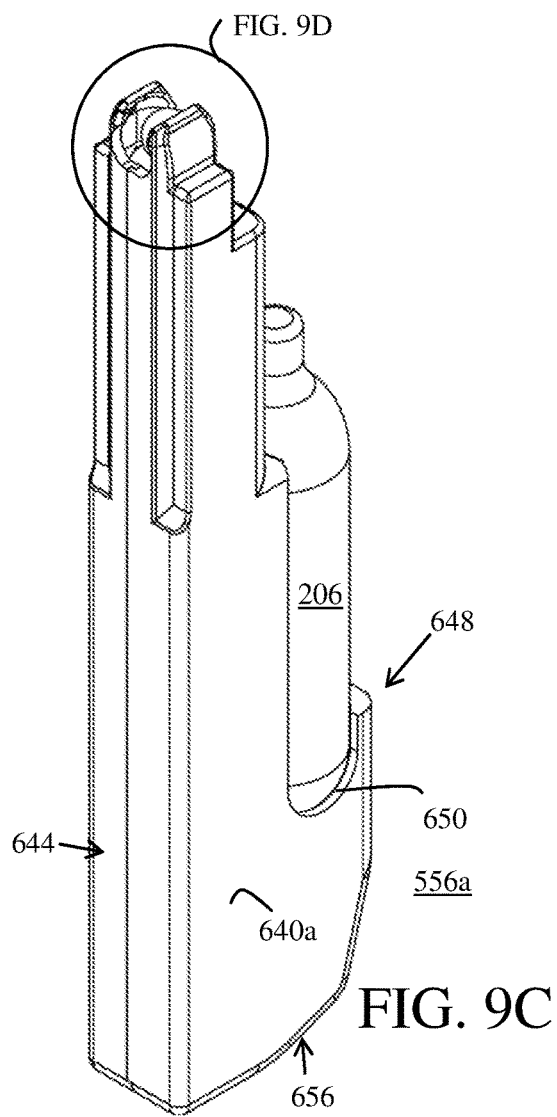
FIG. 9A
FIG. 9C
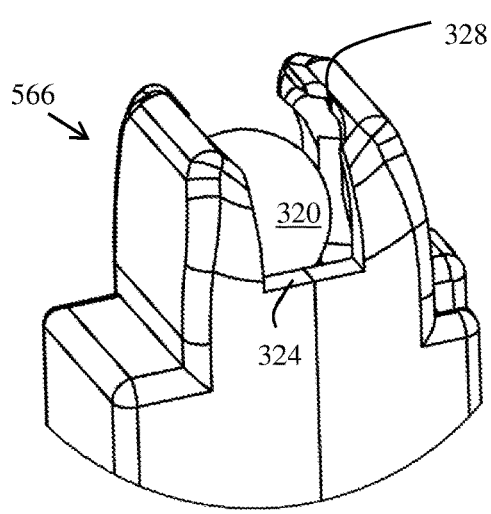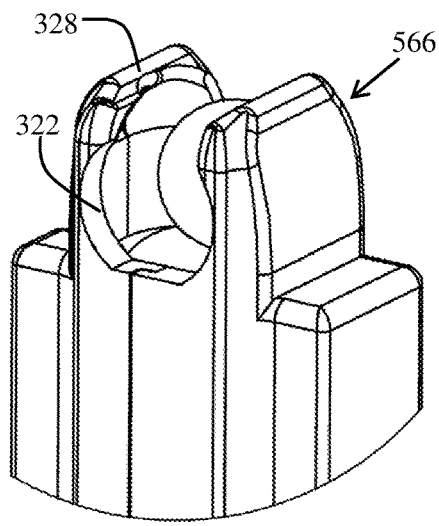
FIG. 9B
FIG. 9D

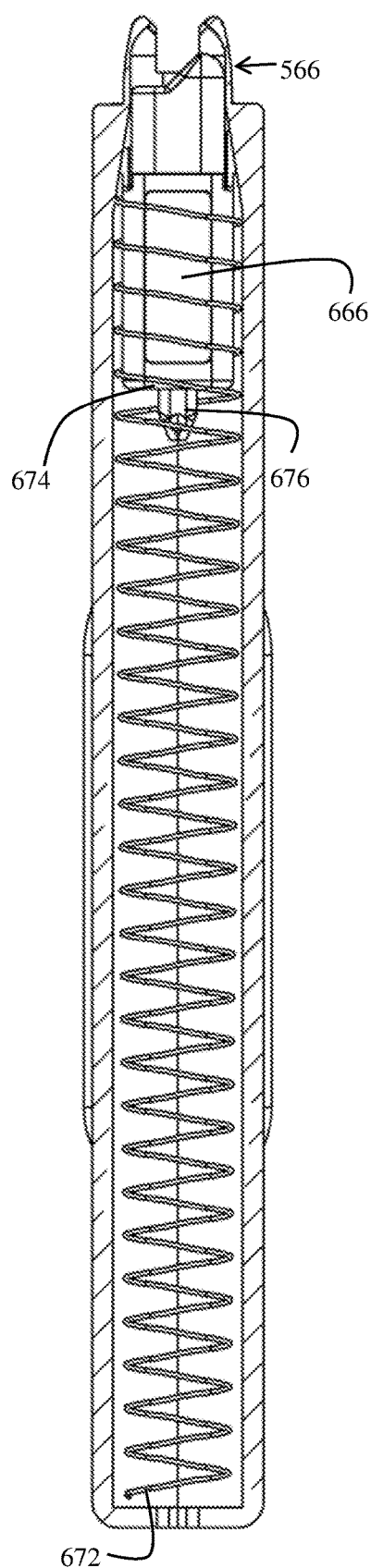
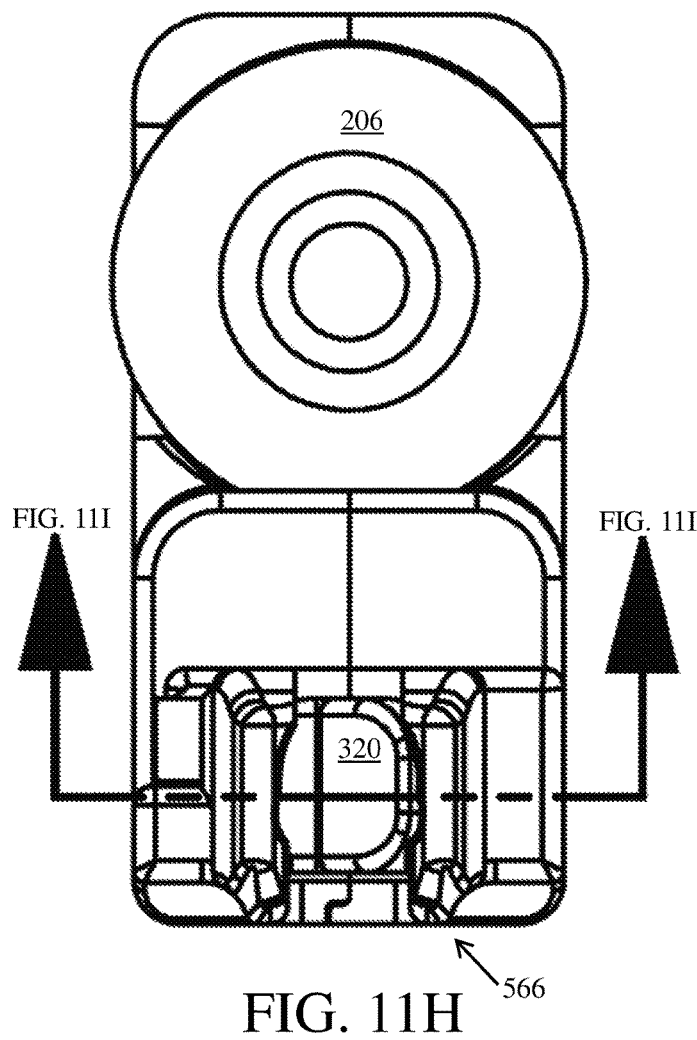
FIG. 11H
FIG. 11I

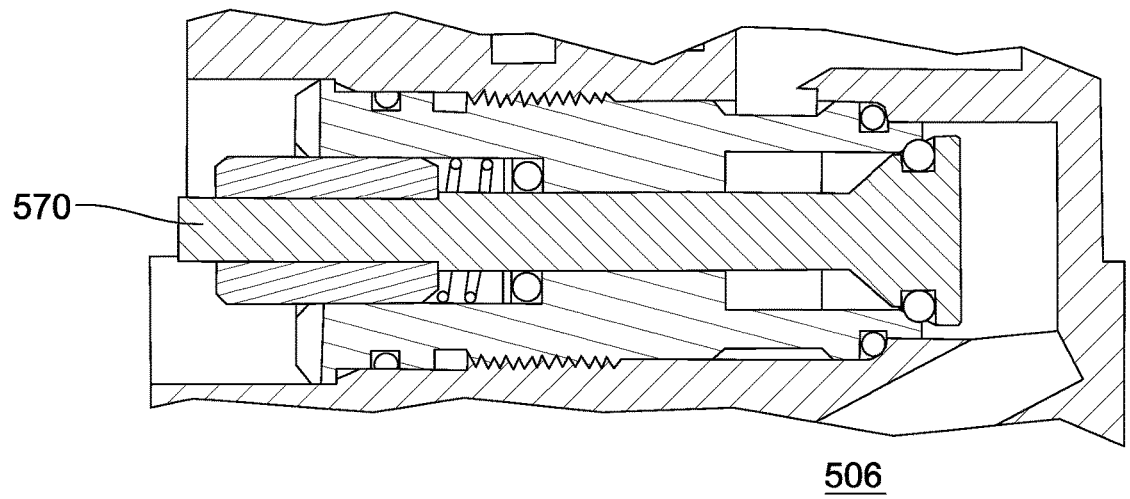
570
506
*Fig. 12K*
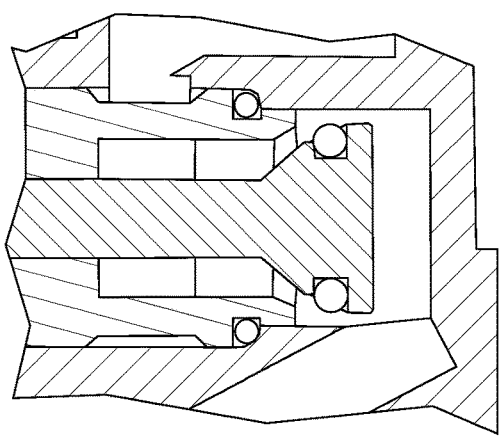 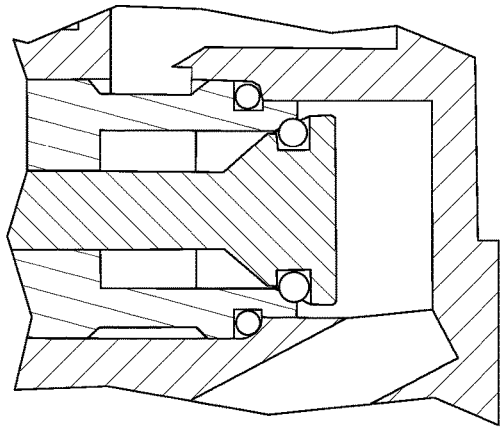
*Fig. 12L*    506         *Fig. 12M*    506

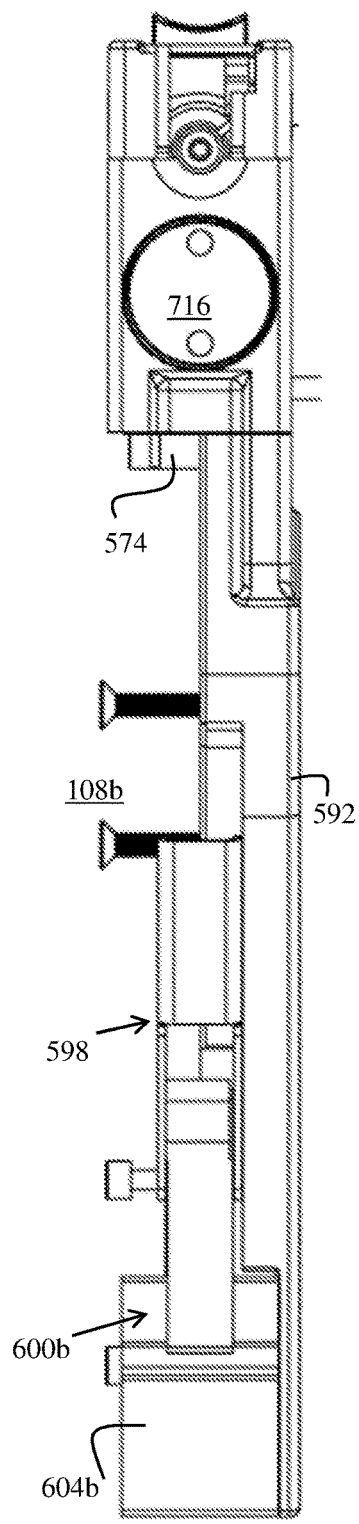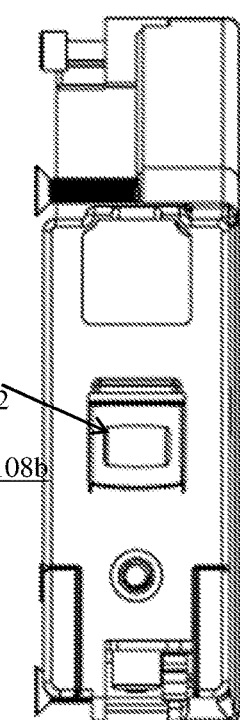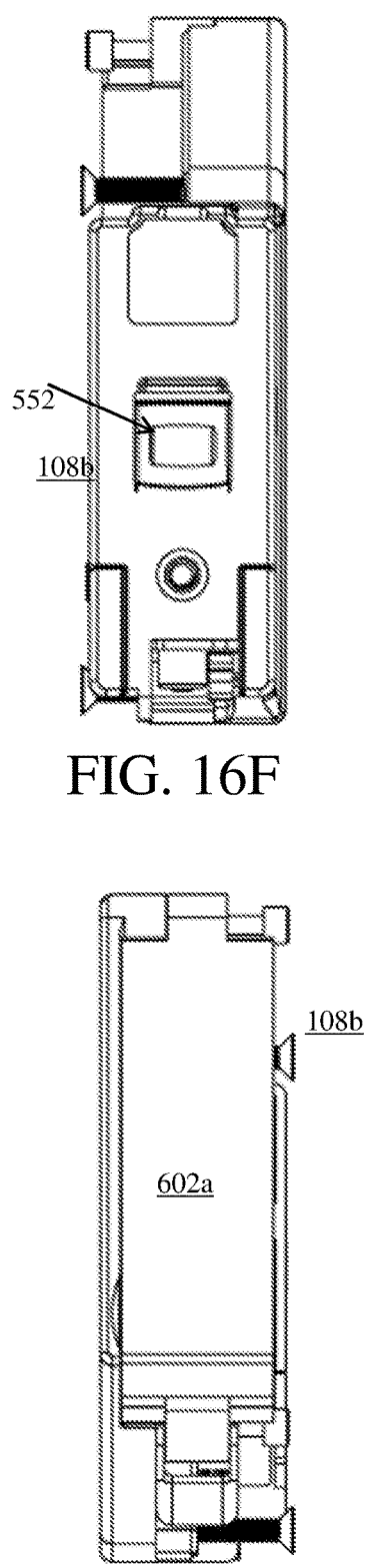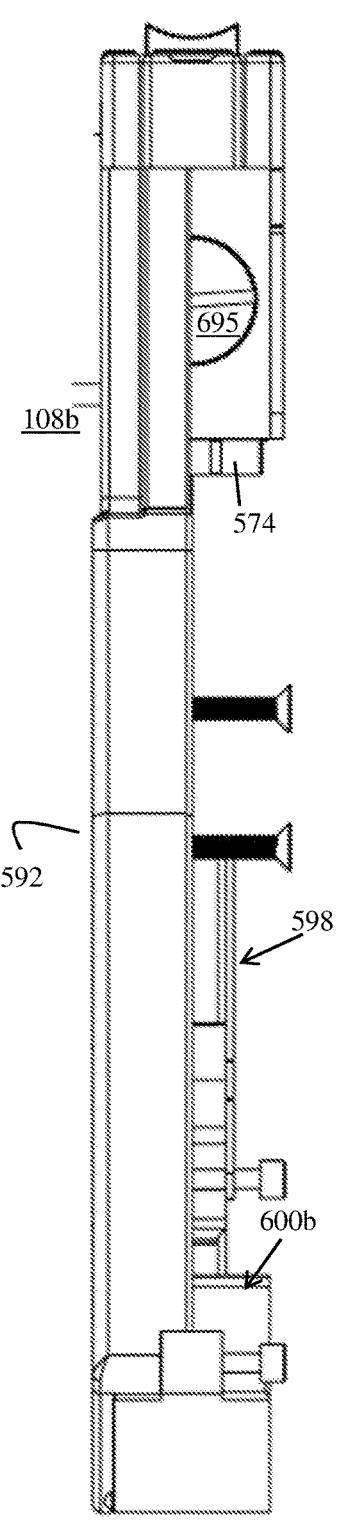
FIG. 16C
FIG. 16F
FIG. 16D
FIG. 16E

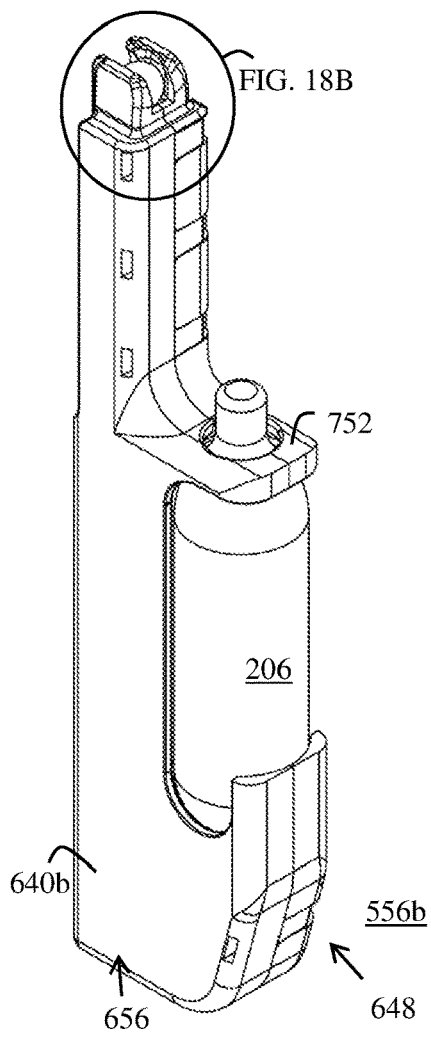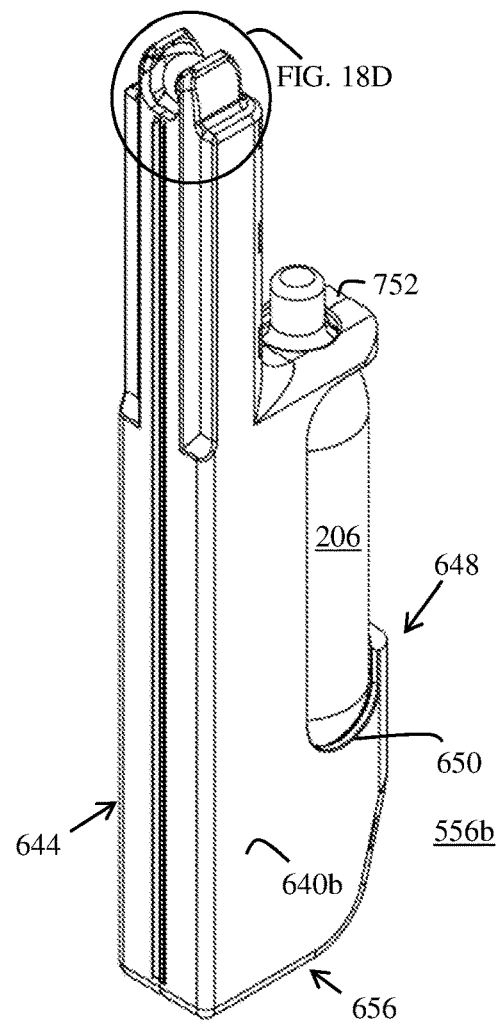
FIG. 18A
FIG. 18C
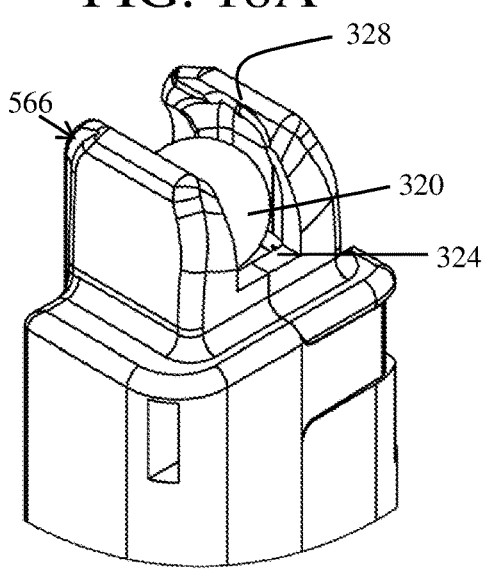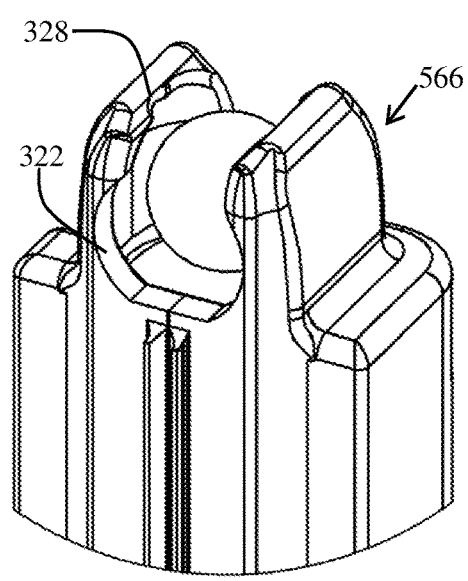
FIG. 18B
FIG. 18D

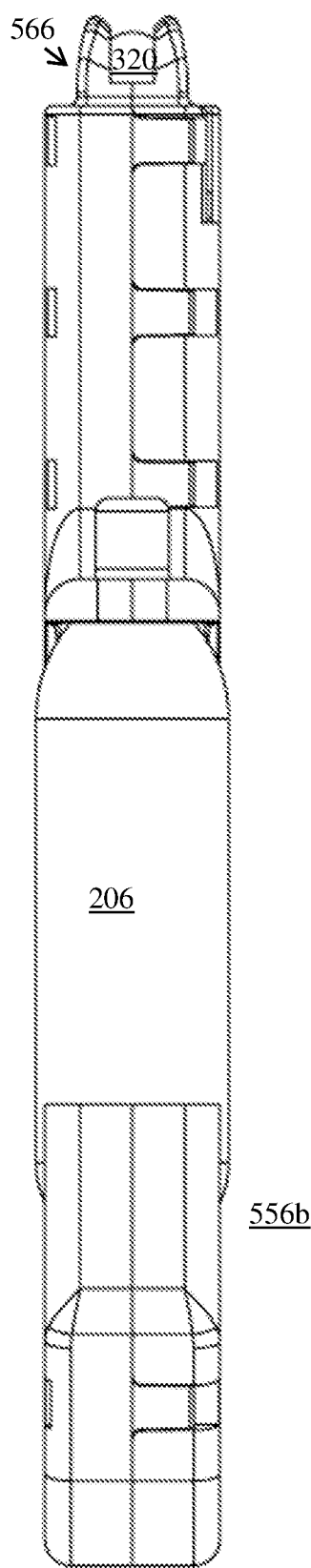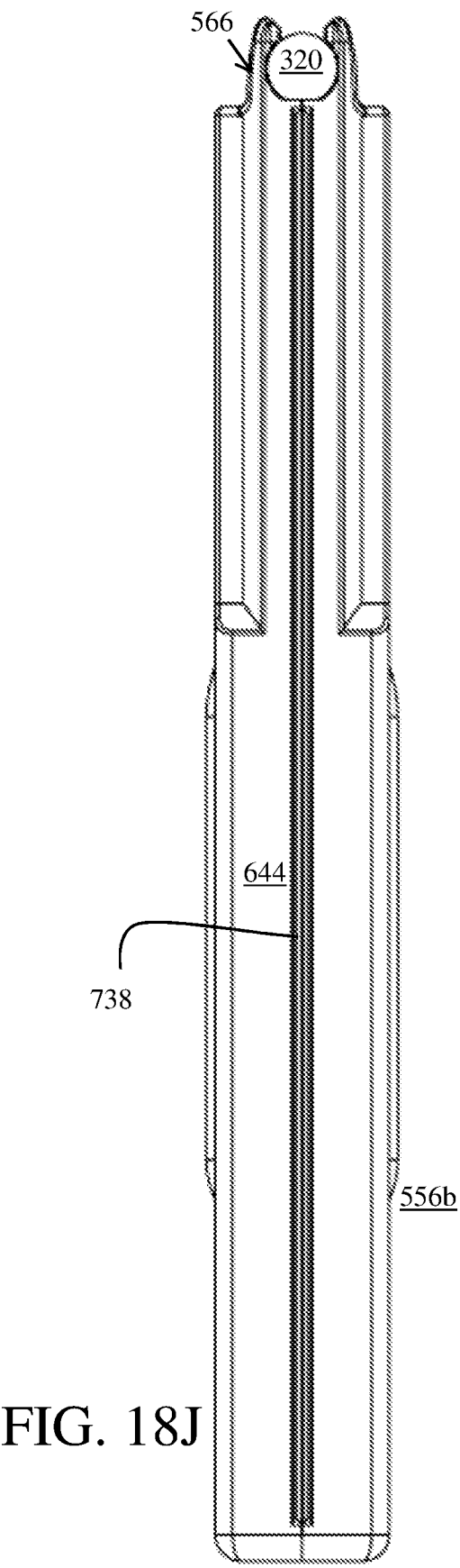
FIG. 18I
FIG. 18J

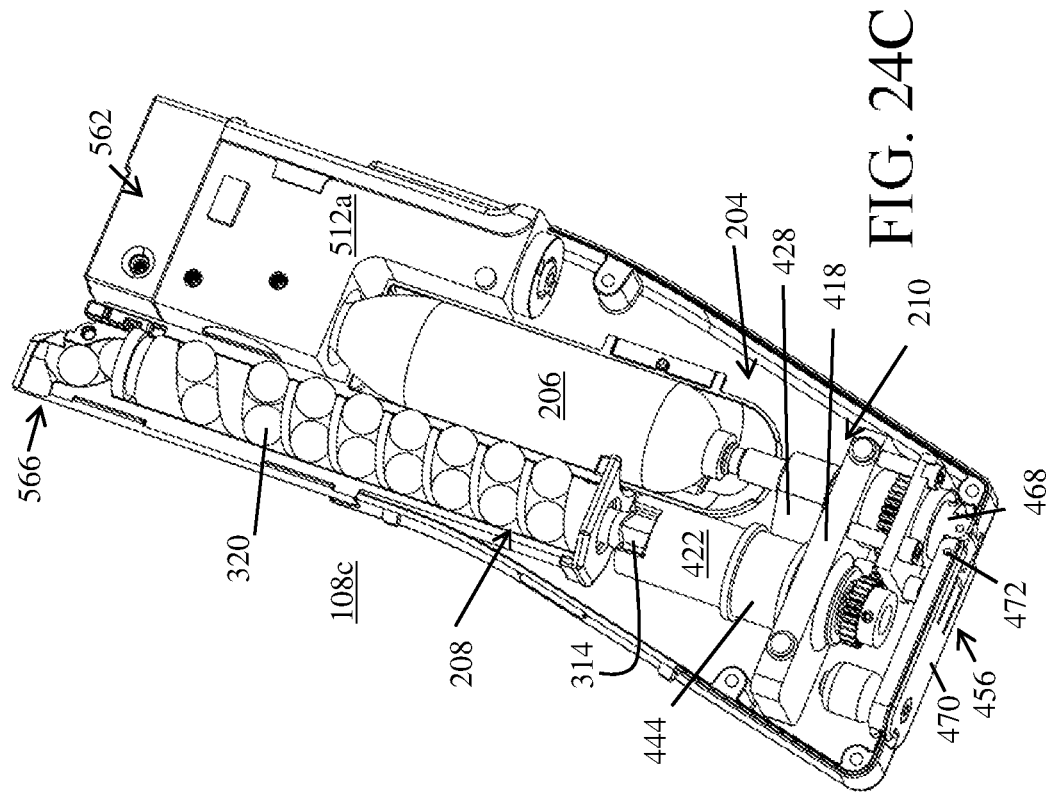
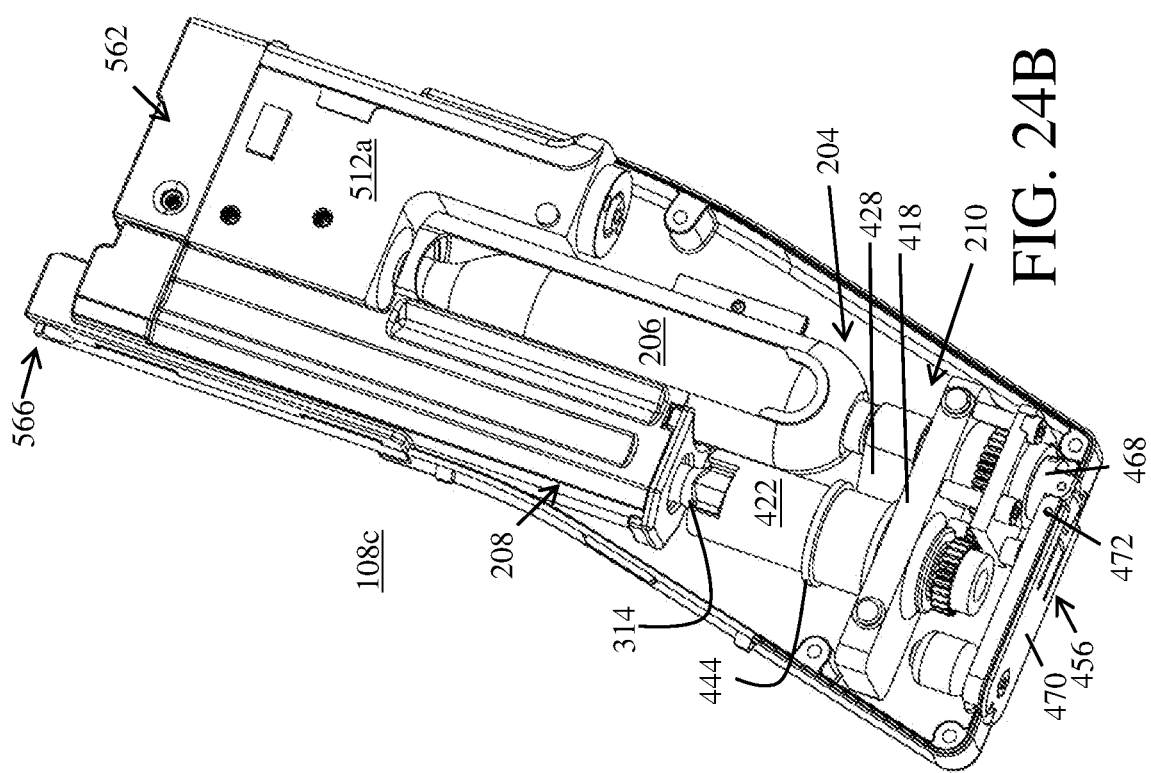
FIG. 24B
FIG. 24C

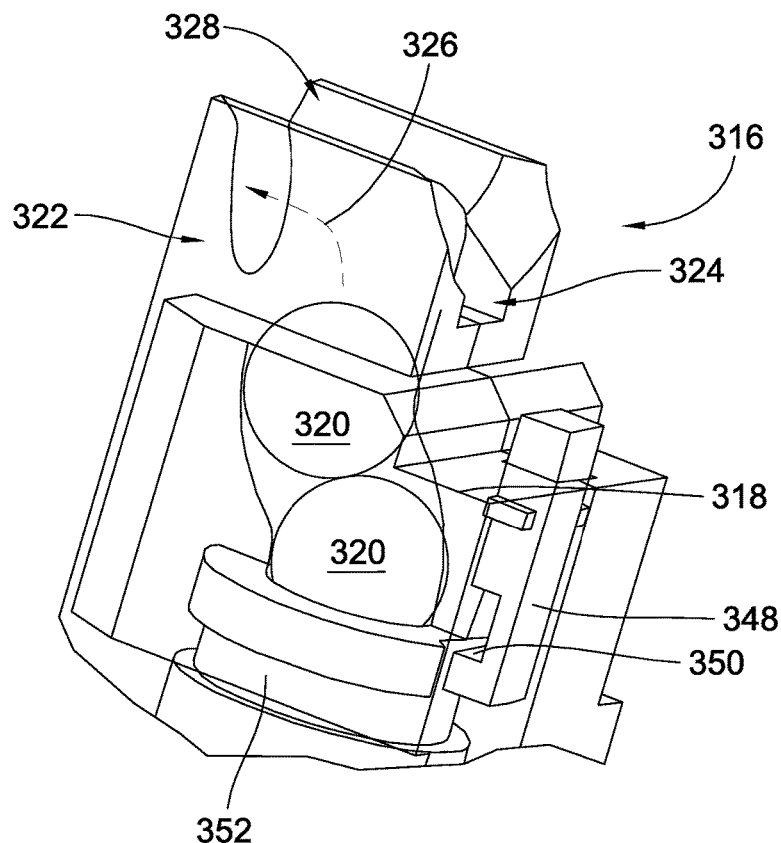
*Fig. 25J-2*
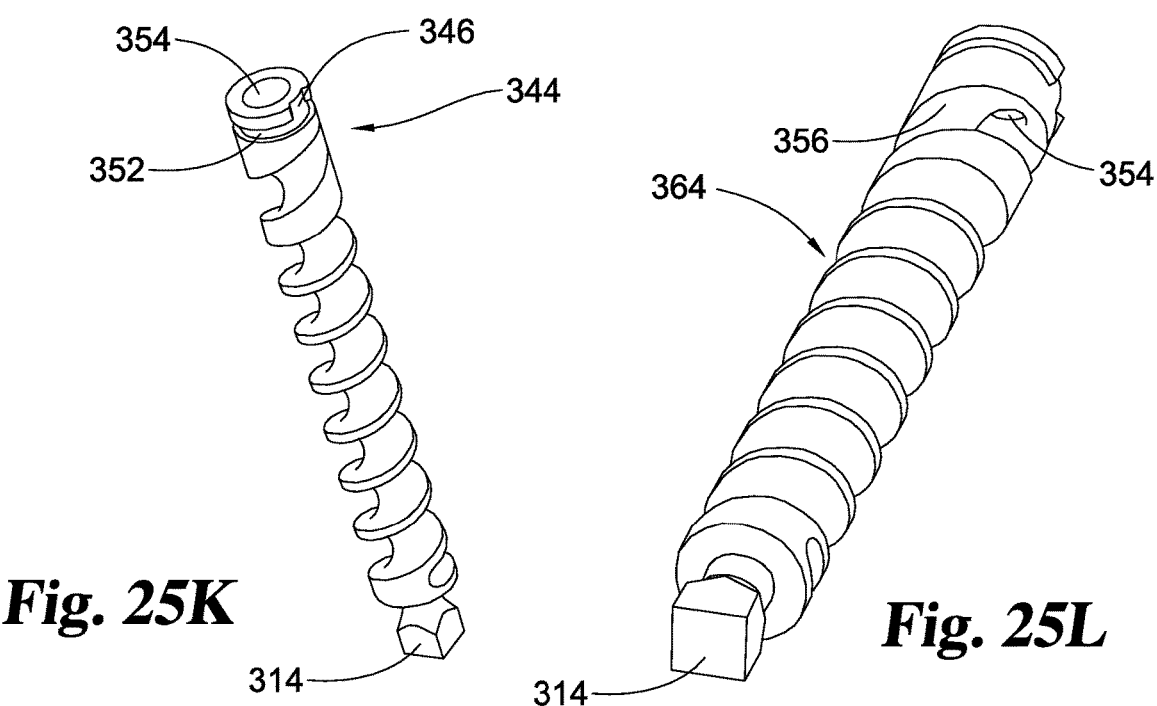
*Fig. 25K*
*Fig. 25L*

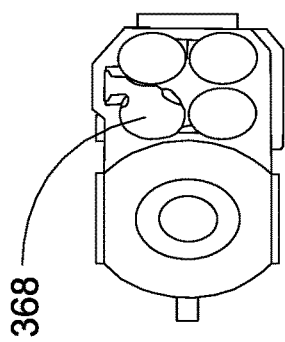
*Fig. 25Q-2*
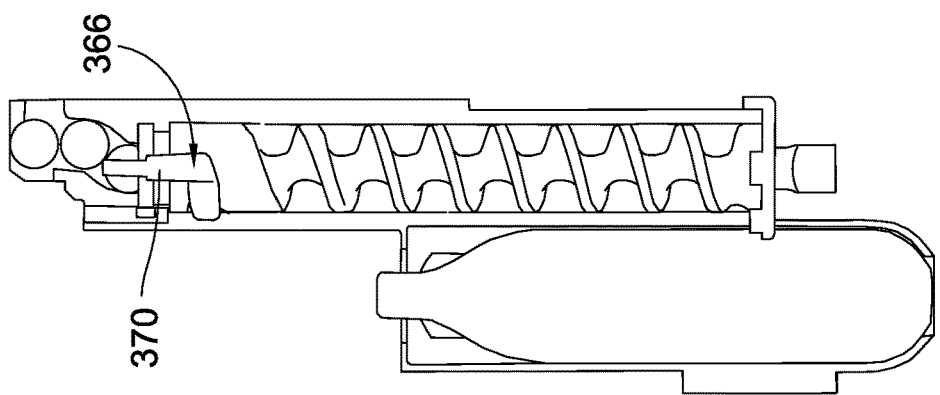
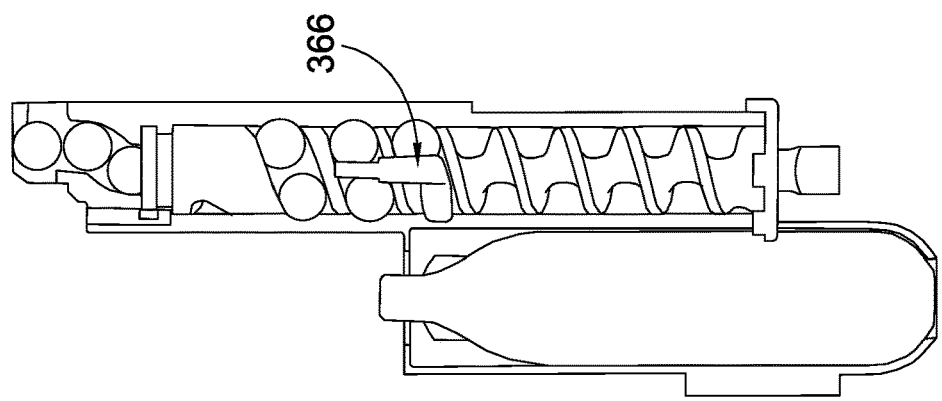
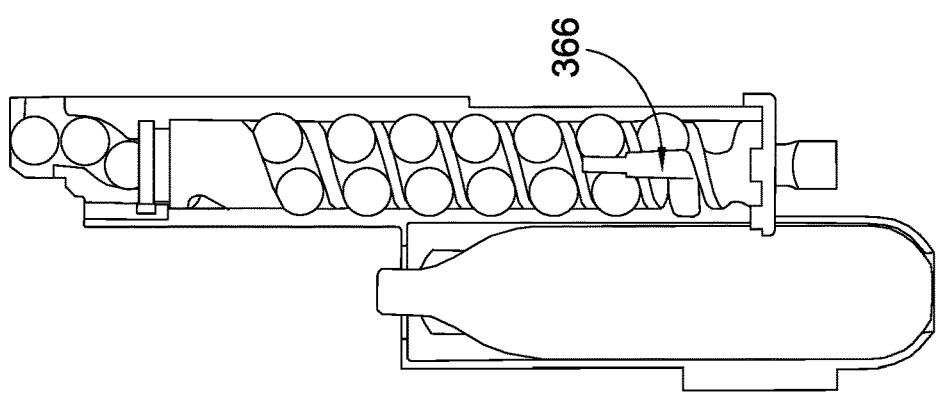
*Fig. 25Q-1*

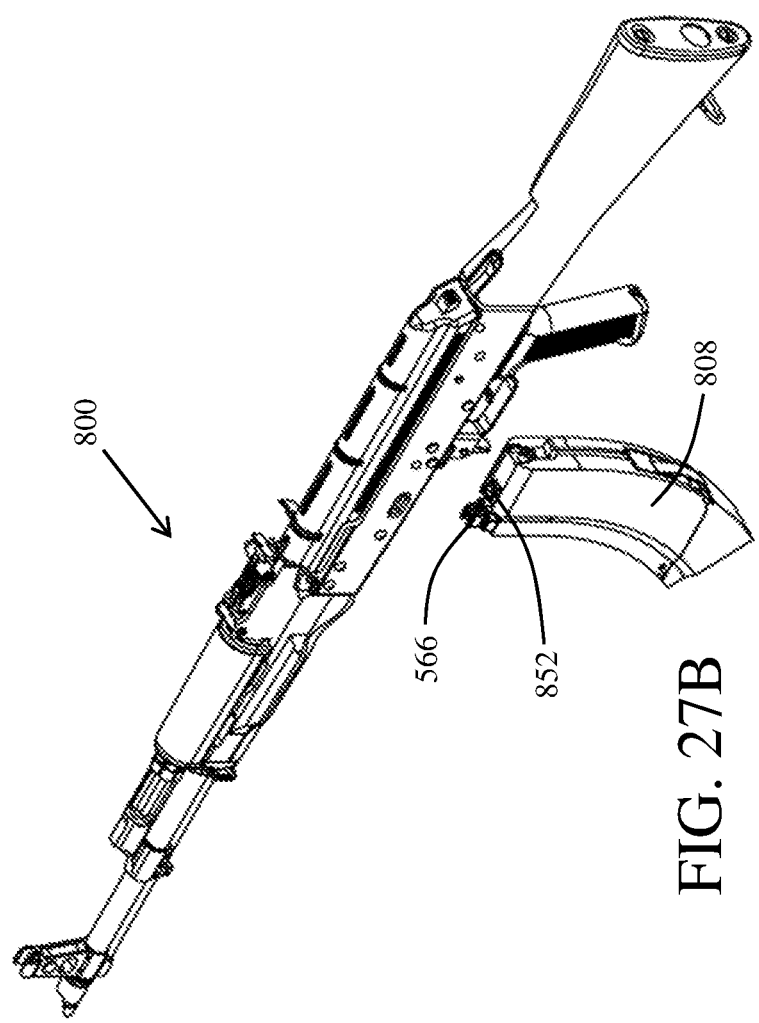
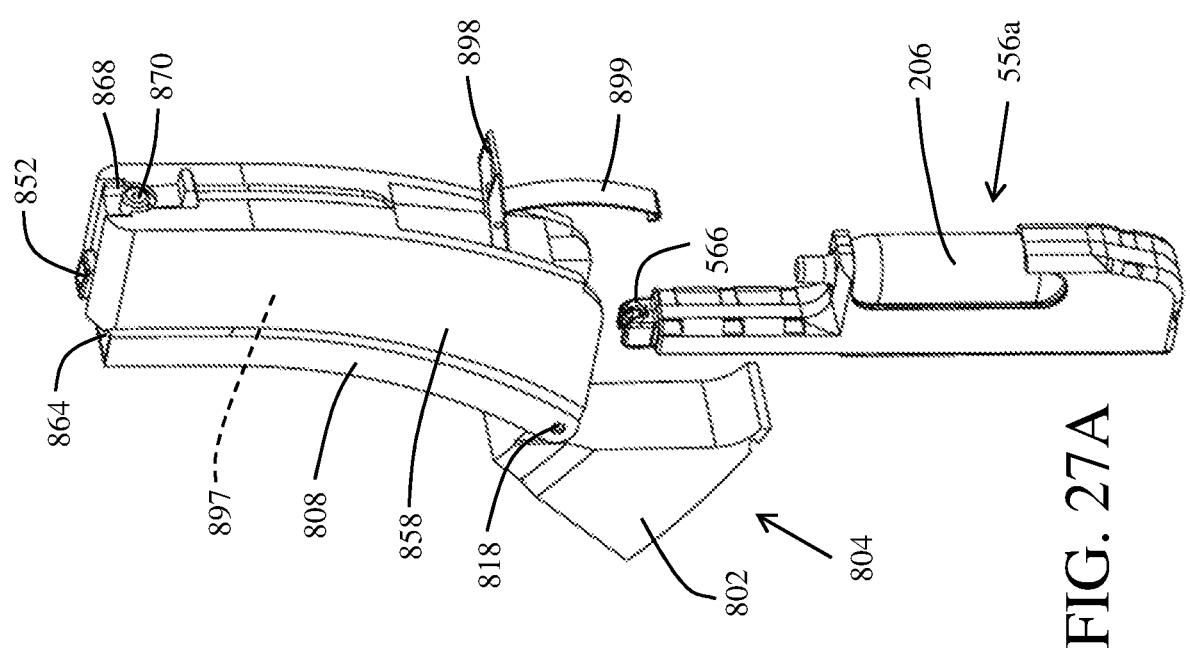
FIG. 27A
FIG. 27B

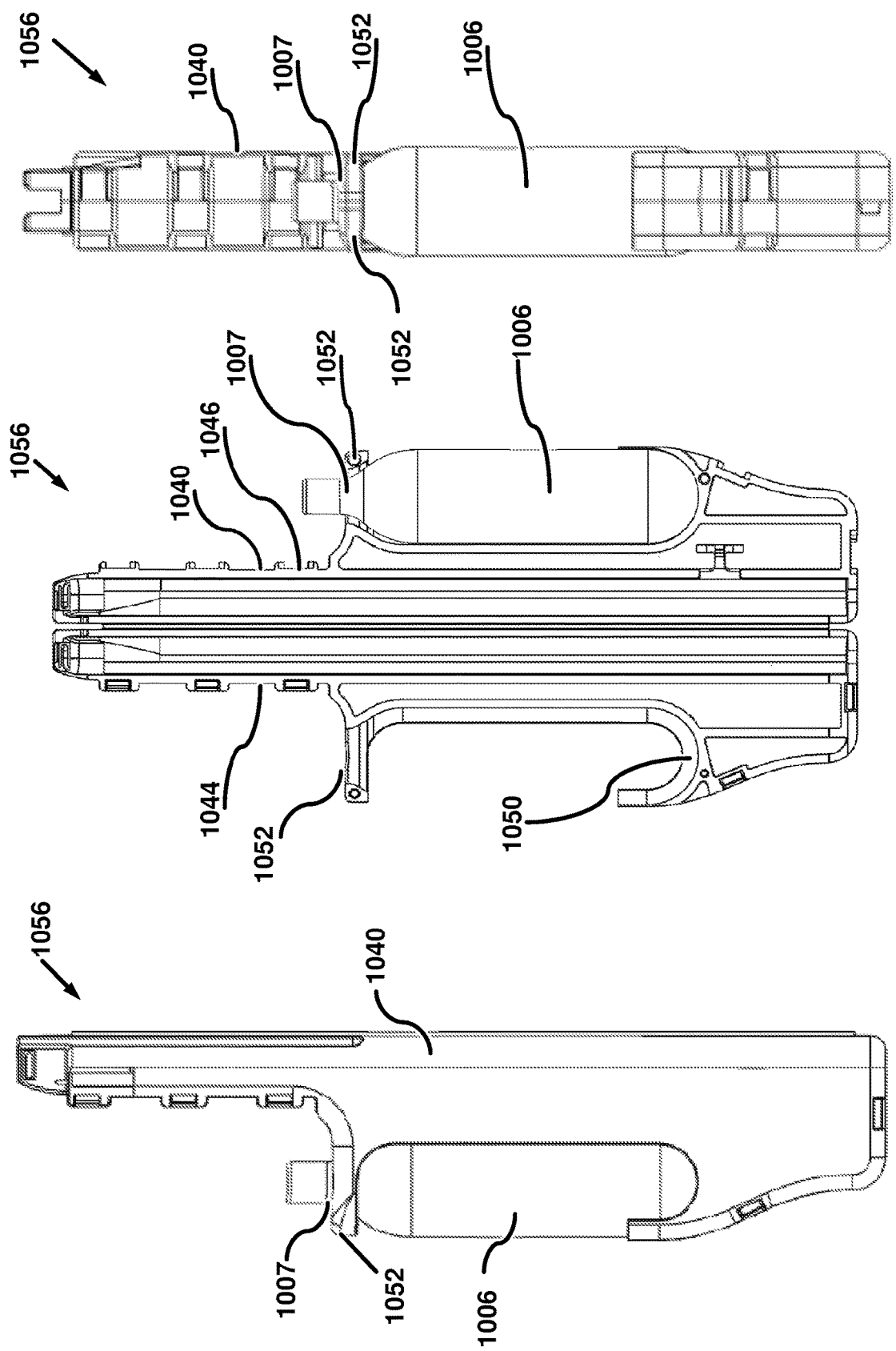

NON-LETHAL GAS OPERATED GUN

CROSS-REFERENCE TO RELATED APPLICATIONS

This application is continuation of U.S. patent application Ser. No. 17/712,474 filed Apr. 4, 2022, which is a continuation-in-part of U.S. patent application Ser. No. 17/066,912 filed Oct. 9, 2020, which is a continuation of U.S. patent application Ser. No. 16/193,304 filed Nov. 16, 2018, which is a continuation-in-part of U.S. patent application Ser. No. 15/690,179 filed Aug. 29, 2017, which claims the benefit of U.S. Provisional Application No. 62/380,947 filed Aug. 29, 2016 and U.S. Provisional Application No. 62/644,619, filed Mar. 19, 2018, which are all hereby incorporated by reference.

BACKGROUND OF THE INVENTION

Field of the Invention

One or more embodiments of the present invention relate to non-lethal gas-operated guns with magazines that hold and supply non-lethal projectiles to be fed automatically to the chamber of a non-lethal gas operated gun.

Description of Related Art

Conventional non-lethal gas-operated guns that use paintballs as non-lethal projectiles are well known and have been in use for a number of years by individuals and the military (e.g., for training). Regrettably, most such guns are unrealistic in terms of look and feel compared to actual guns that fire live ammunition such as the M4, M16 or their variants. Therefore, skills learned on such guns are generally not translated and applicable when using real guns.

Further, conventional magazines used by conventional air guns that use non-lethal projectiles require refill or reloading of the magazine through a slow, tedious process of individually hand-feeding or hand-loading each non-lethal projectile into the magazine.

Additionally, conventional magazines used by conventional air guns that use non-lethal projectiles require recharging of gas canister (e.g., $CO_2$ canister). It should be noted that with conventional magazines, the internal mechanics that drive the non-lethal projectiles into the chamber of a gun eventually wear out due to continuous reuse.

Accordingly, in light of the current state of the art and the drawbacks to current air guns, a need exists for a non-lethal gas-operated gun that would provide the users with similar look-and-feel of a real gun in most respects. Further, a need exists for a magazine of an air gun that would not require individual hand-feeding or hand-loading of each non-lethal projectile, separate recharging of gas, and that would not allow reuse of internal mechanical drives to a point where they would wear out and require individual replacement of parts.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 24A to 26E-2 are non-limiting, exemplary illustrations of another embodiment of a magazine and its components.

FIGS. 27A and 27B are non-limiting, exemplary illustrations of another embodiment of a non-lethal gas operated gun and its components.

FIGS. 29A, 29B and 29C are non-limiting, exemplary illustrations of another embodiment of a pre-pack.

DETAILED DESCRIPTION OF THE DRAWINGS

Figure 1A:
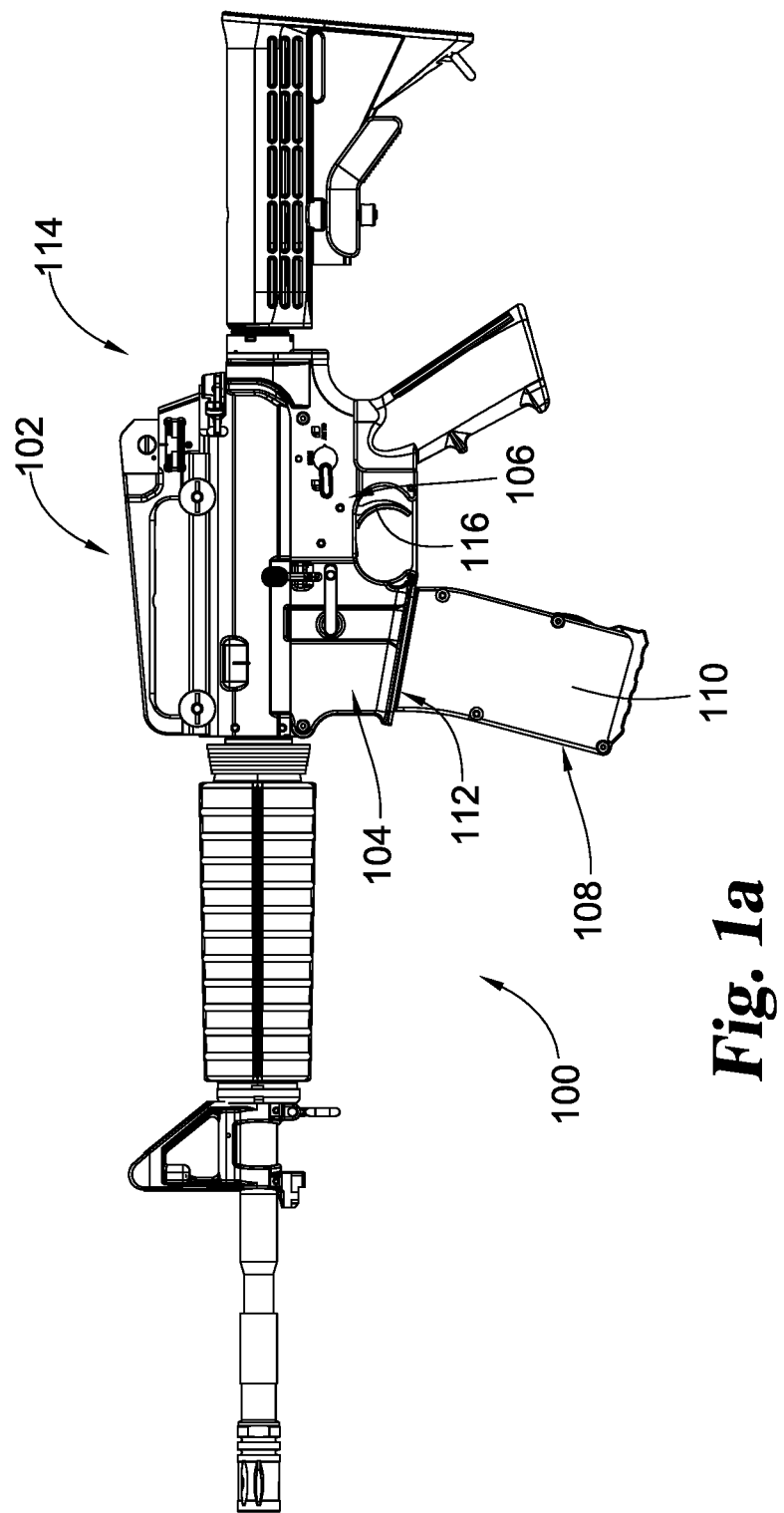
FIGS. 1A to 3G are non-limiting, exemplary illustrations of a non-lethal gas operated gun and its components invention.

The detailed description set forth below in connection with the appended drawings is intended as a description of presently preferred embodiments of the invention and is not intended to represent the only forms in which the present invention may be constructed and or utilized.

It is to be appreciated that certain features of the claimed invention, which are, for clarity, described in the context of separate embodiments, may also be provided in combination in a single embodiment. Conversely, various features of the claimed invention that are, for brevity, described in the context of a single embodiment may also be provided separately or in any suitable sub-combination or as suitable in any other described embodiment of the invention. Stated otherwise, although the claimed invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the claimed invention.

In the description given below and or the corresponding set of drawing figures, when it is necessary to distinguish the various members, elements, sections/portions, components, parts, or any other aspects (functional or otherwise) or features or concepts or operations of a device(s) or method(s) from each other, the description and or the corresponding drawing figures may follow reference numbers with a small alphabet character such as (for example) "magazine 108a, 108b, and etc." If the description is common to all of the various members, elements, sections/portions, components, parts, or any other aspects (functional or otherwise) or features or concepts or operations of a device(s) or method(s) such as (for example) to all magazines 108a, 108b, etc., then they may simply be referred to with reference number only and with no alphabet character such as (for example) "magazine 108."

Throughout the disclosure, references to M4, M16, or other conventional rifles or variants thereof are meant as illustrative, for convenience of example, and for discussion purposes only and should not be limiting. Further, for ease of understanding, throughout the disclosure, the variant M4 will be mentioned as the one, non-limiting, non-exhaustive example of a conventional weapon for M4 and its variants, M16 and its variant or others instead of specifically mentioning each individually.

Throughout the disclosure the use of the term non-lethal projectile(s) is defined as a non-lethal object propelled through the air by the non-lethal gas-operated gun, non-limiting, non-exhaustive listings of examples of non-lethal projectile(s) may include non-lethal round(s), BB(s), paintball(s), or the like.

The term "pre-pack" means "prepackaged."

The Applicant has discovered that most conventional non-lethal gas-operated guns operate at a lower pressure and as a result, require additional components for proper operation of the conventional non-lethal gas-operated guns. Further, most make inefficient management and usage of the gas. The Applicant has discovered and recognized that it is this lack of proper pressure and inefficient gas usage that has lead most conventional non-lethal gas-operated guns to use additional components (such as a hammer reset) for proper basic operations of the gun.

Accordingly, as detailed below, a non-lethal gas-operated gun is disclosed that maintains the proper basic operation of the gun without the use of additional components such as the hammer reset by sufficiently pressurizing the chamber of the gun and the efficient use and management of gas.

The disclosed non-lethal gas-operated gun may provide users with similar look-and-feel and experience of use of a real gun (such as the M4) in most respects, however uses non-lethal projectiles instead of live ammunition.

Further, the disclosed gas-operated gun includes a magazine that does not require individual hand-feeding or hand-loading of each non-lethal projectile, separate recharging of gas, and that does not allow reuse of internal mechanical drives to a point where they would wear out and require individual replacement of parts.

Figure 1B:
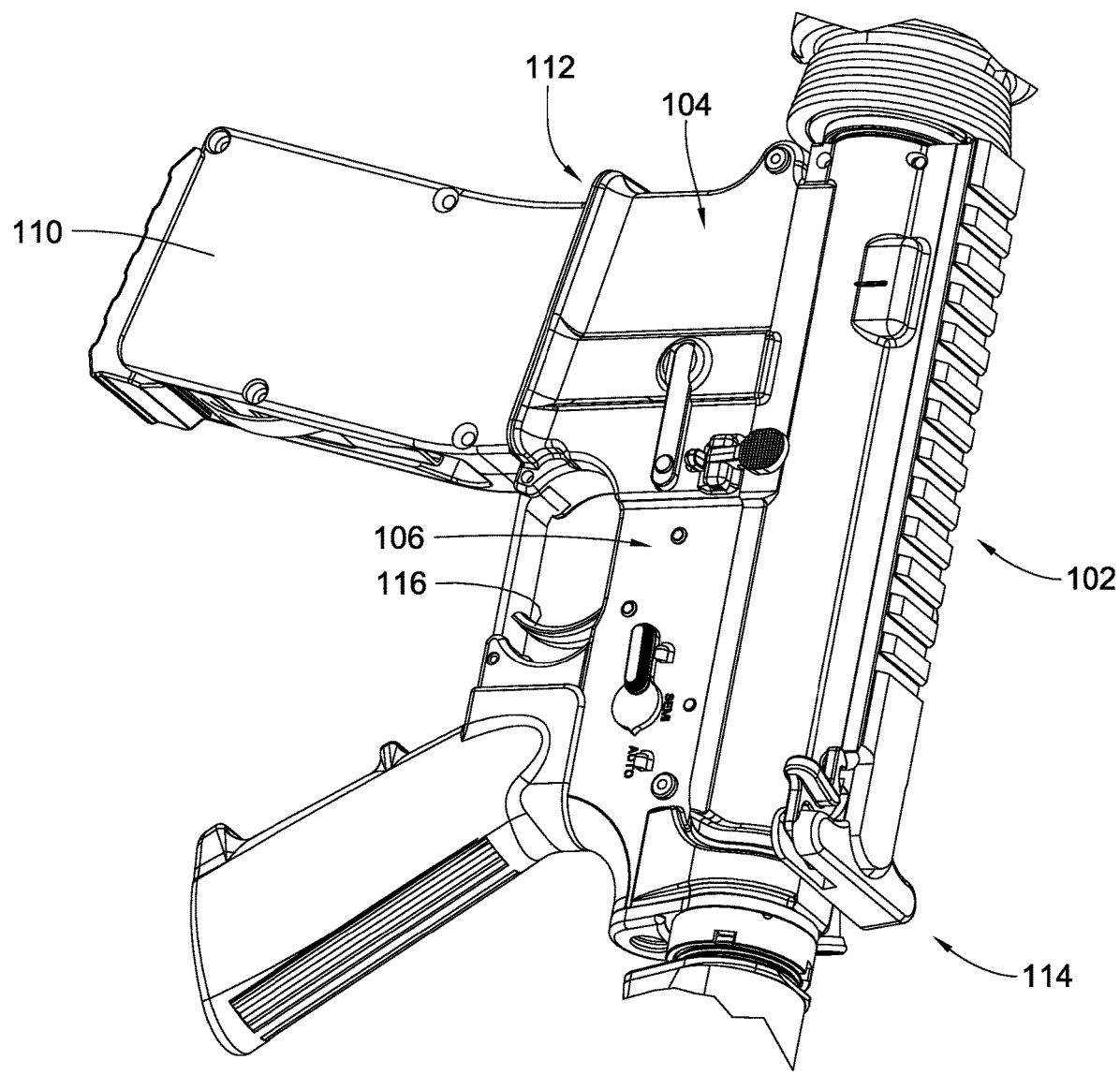

FIGS. 1A and 1B are non-limiting, exemplary illustrations of a non-lethal gas-operated gun. As illustrated, non-lethal gas-operated gun 100 looks, feels, and provides a user experience similar to that of a conventional rifle, but fires spherical non-lethal projectiles instead of live ammunition.

Non-lethal gas-operated gun 100 is comprised of an upper receiver assembly 102 (includes bolt carrier group 504 and other components) and a lower receiver assembly 104 (which includes trigger group 106 and other components) that accommodate spherical non-lethal projectiles rather than live ammunition.

Figure 4D:
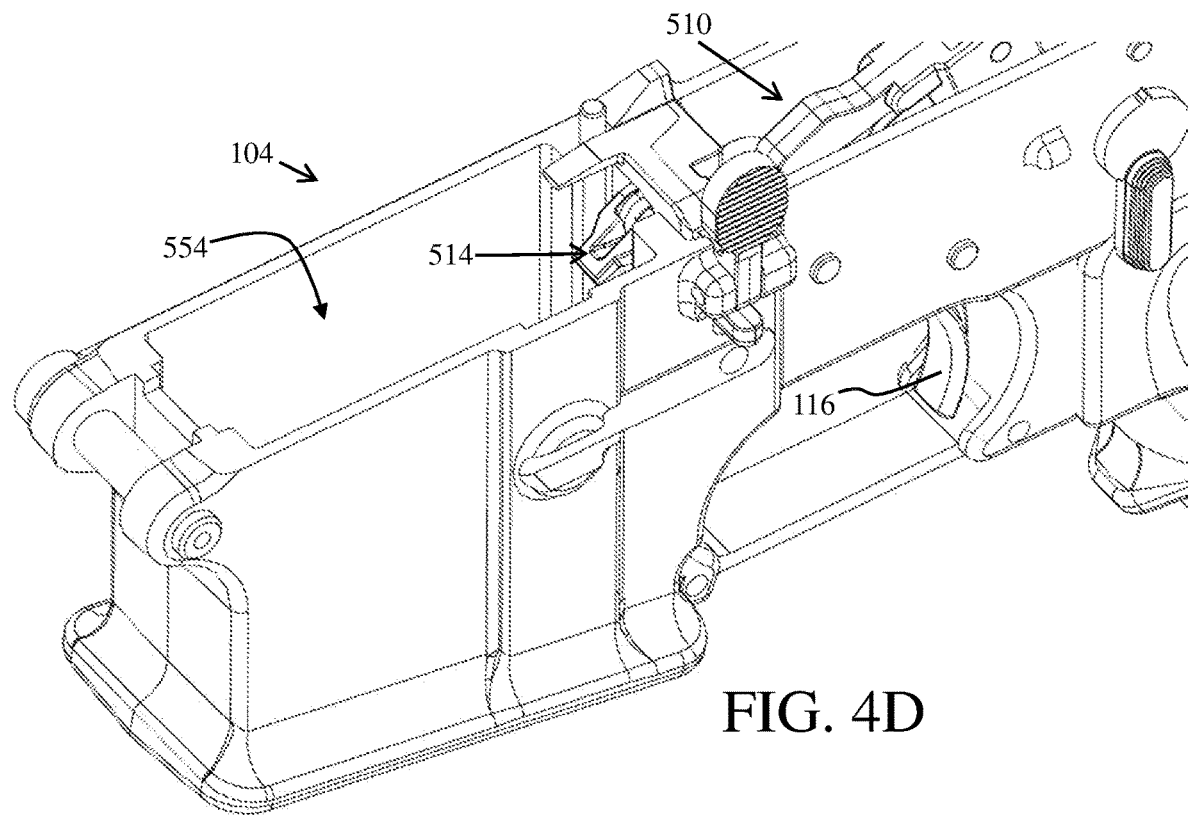
Figure 4E:
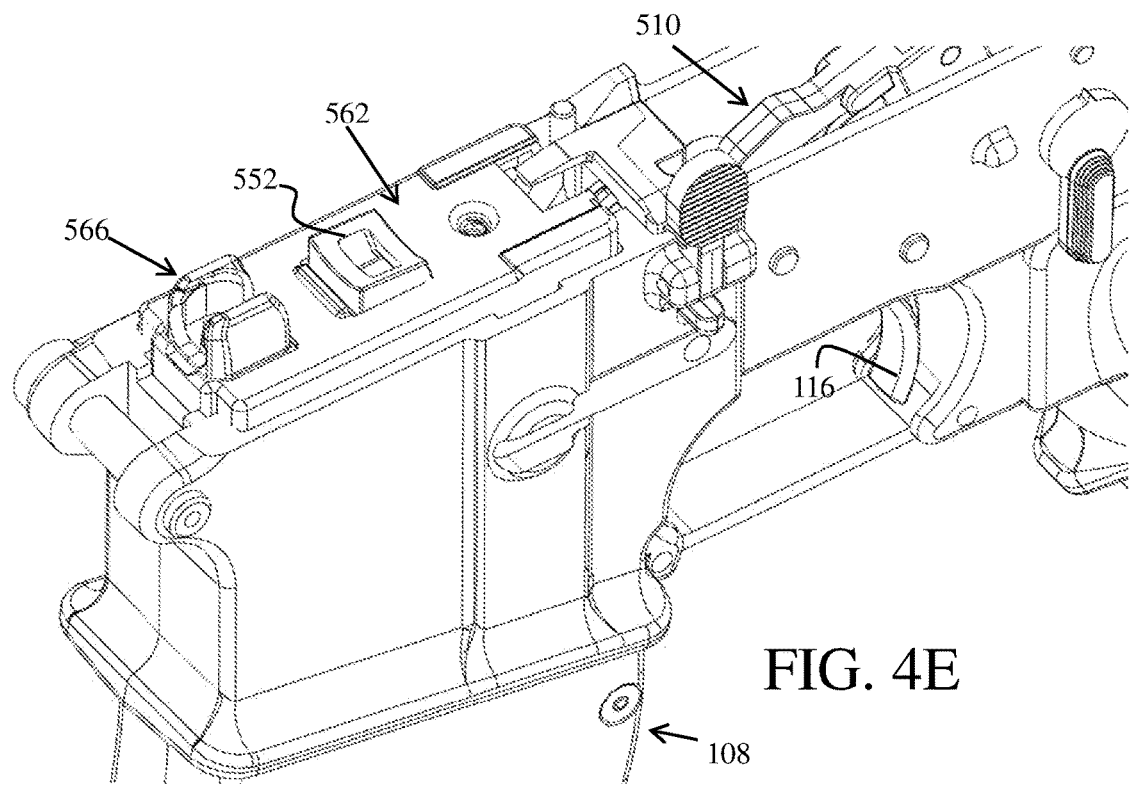
Figure 5D:
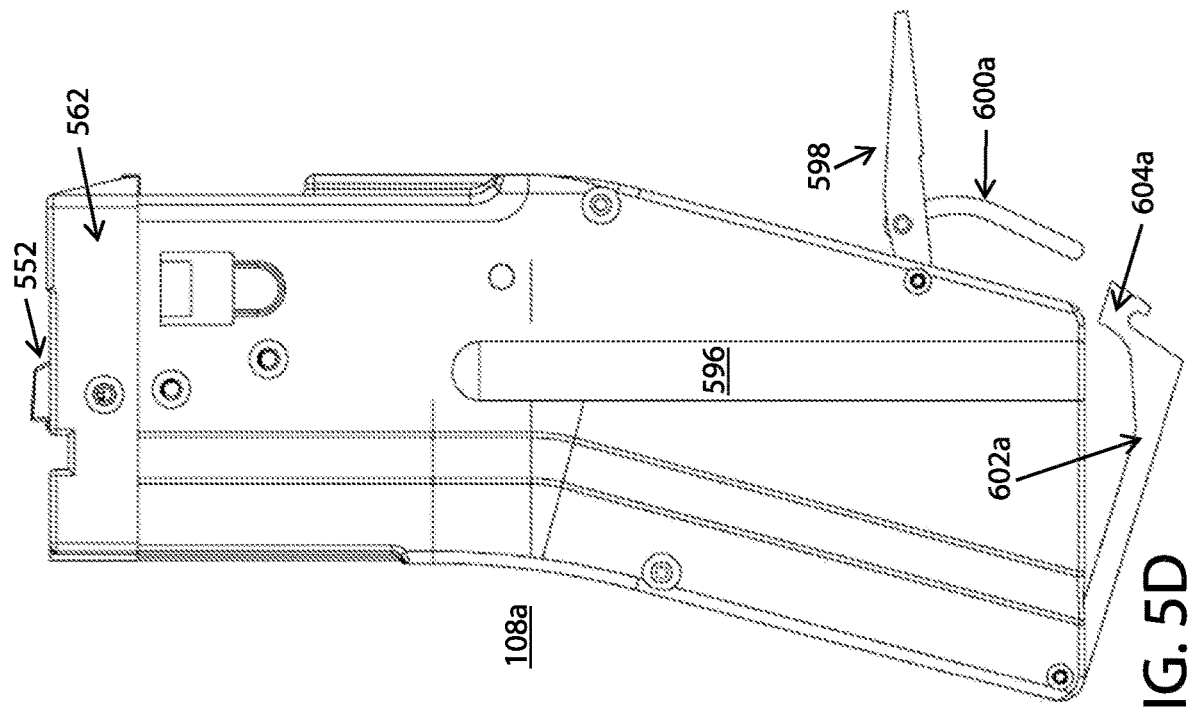
Figure 5C:
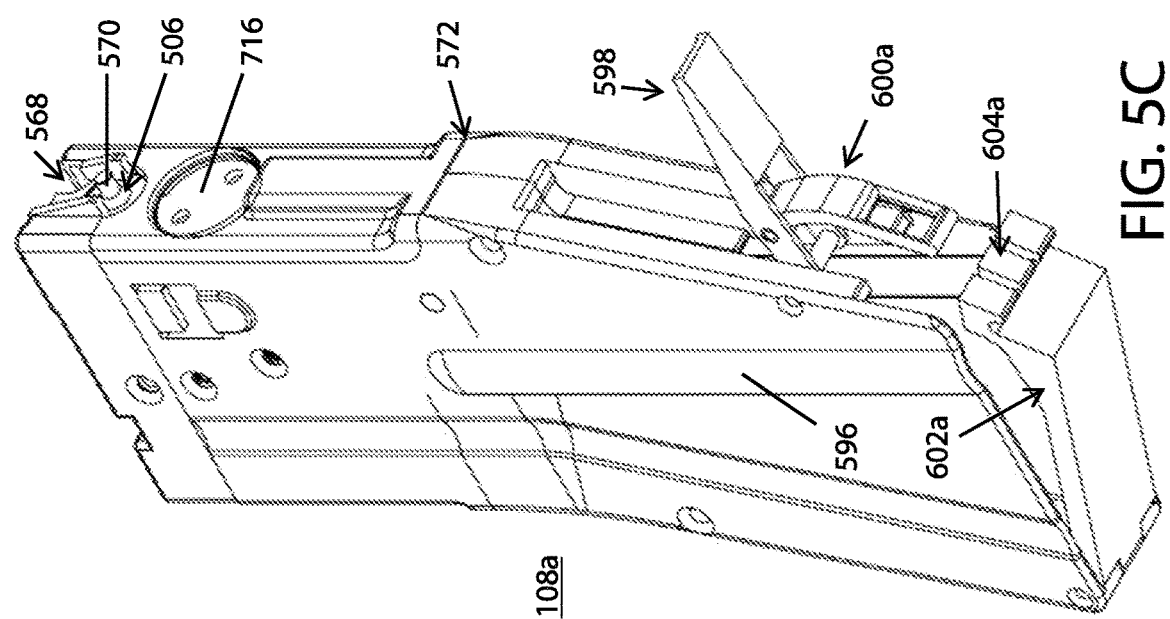
Figure 5E:
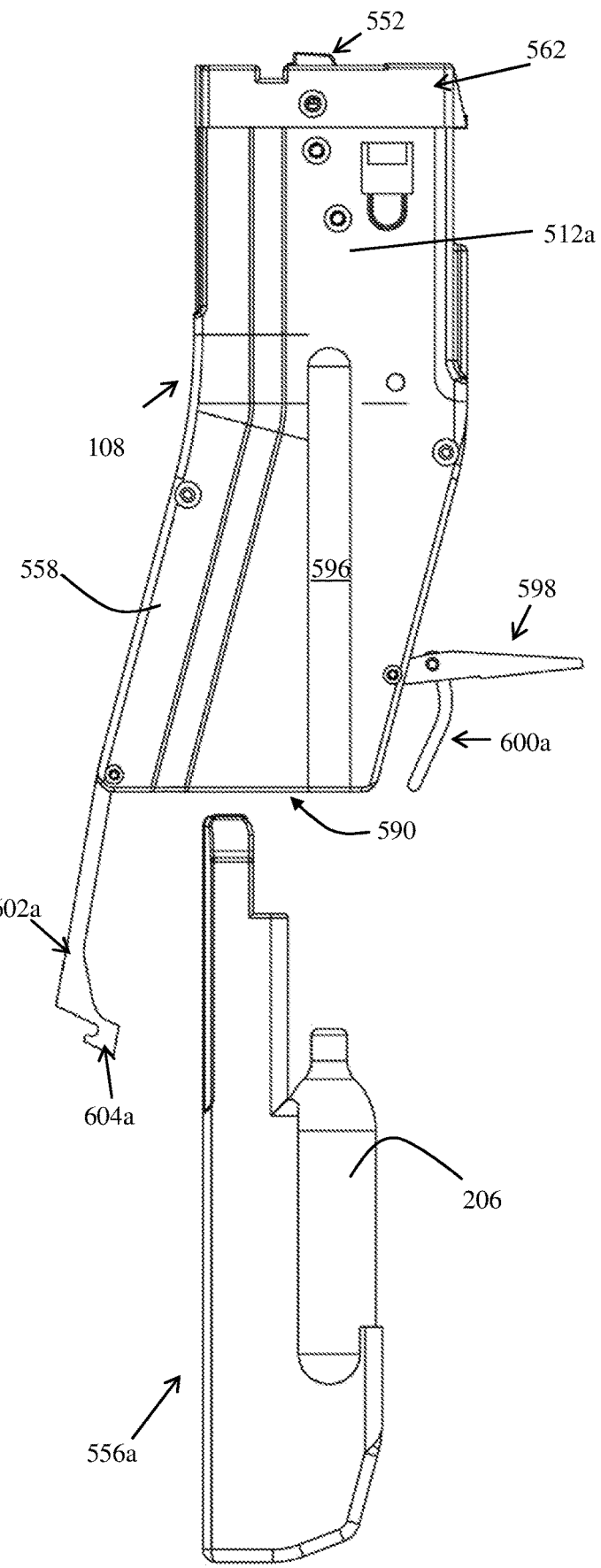
Figure 7A:
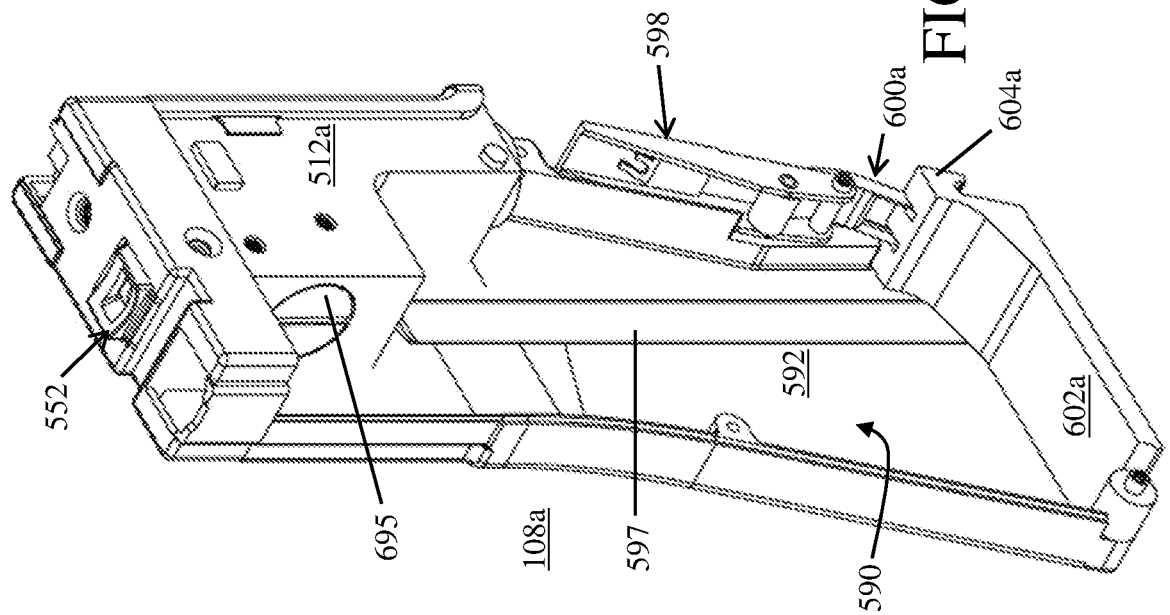

As further illustrated, non-lethal gas-operated gun 100 also includes a magazine 108, that holds and supplies non-lethal projectiles fed to the chamber of non-lethal gas-operated gun 100 (located in the upper assembly 102) through the cyclic action of the reciprocal bolt (detailed below). Housing 110 of magazine 108 is made to look, feel, and be experienced similar to a magazine of a conventional rifle such as the conventional live-fire M4 and its variants. As best illustrated in FIGS. 4D and 4E, the lower receiver assembly 104 includes an opening 554 (also known as the "magazine well") through which magazine 108 is inserted and detachably secured with non-lethal gas-operated gun 100 in well known manner.

The look, feel, experience, and use of non-lethal gas-operated gun 100 is very similar to that of an M4 or M16 rifle and their respective variants (such as the M4 carbine). For example, in order to use non-lethal gas-operated gun 100, magazine 108 is inserted into lower receiver 104 in the same manner as is done on an M4 rifle. The next operational act prior to firing non-lethal gas-operated gun 100 is to simply pull charging handle 114 of non-lethal gas-operated gun 100, similar to a conventional M16 variant rifle. Once the charging handle 114 is pulled, user simply fires rifle 100 by pulling trigger 116 of trigger group 106.

Regarding the actual feel and experience of non-lethal gas-operated gun 100 when it does fire non-lethal projectiles, non-lethal gas-operated gun 100 provides the same feel and experience as a well-known conventional Gas Blow Back (GBB) rifle. However, as detailed below, with less parts compared to other conventional non-lethal guns while maintaining proper operation.

Non-lethal gas-operated gun 100 uses pressure-regulated carbon dioxide ($CO_2$) gas, detailed below, to fire non-lethal projectiles (facilitated by GBB) and hence, users experience the same jerking or "kick" motion as for example, the conventional live-fire M4. It should be noted that GBB mechanism serves the purpose of providing recoil, but most importantly, a new round is chambered through the gun's GBB action.

FIGS. 2A-1 to 2E-4 are non-limiting, illustrations of the various views of non-lethal gas-operated gun 100. FIGS. 2A-1 to 2E-4 progressively illustrate in various corresponding views the cyclic actions of trigger group 106 and bolt carrier group 504 for holding, supplying, and firing of non-lethal projectiles before trigger 116 is pulled (FIGS. 2A-1 to 2A-4), as trigger 116 is pulled (FIGS. 2B-1 to 2B-4), rocket valve 502 closing (FIGS. 2C-1 to 2C-4), bolt carrier group 504 beginning to reset primary hammer 510 (FIGS. 2D-1 to 2D-4), and bolt carrier group 504 moving back (FIGS. 2E-1 to 2E-4) after which, trigger group 106 and bolt carrier group 504 are cycled back to positions shown in FIGS. 2A-1 to 2A-4.

Accordingly, FIGS. 2A-1 to 2A-4 are various views of non-lethal gas-operated gun 100 before pulling trigger 116. FIGS. 2B-1 to 2B-4 are various views of non-lethal gas-operated gun 100 when or as trigger 116 is pulled. FIGS. 2C-1 to 2C-4 are various views of non-lethal gas-operated gun 100 illustrating rocket valve 502 closing. FIGS. 2D-1 to 2D-4 are various views of non-lethal gas-operated gun 100 illustrating bolt carrier group 504 beginning to reset primary hammer 510. FIGS. 2E-1 to 2E-4 are various views of non-lethal gas-operated gun 100 illustrating back movement of the bolt carrier group 504.

In particular, FIGS. 2A-1, 2B-1, 2C-1, 2D-1, and 2E-1 are non-limiting, exemplary top views of non-lethal gas-operated gun 100.

FIGS. 2A-2, 2B-2, 2C-2, 2D-2, and 2E-2 are non-limiting, exemplary side-plan sectional views taken from the respective FIGS. 2A-1, 2B-1, 2C-1, 2D-1, and 2E-1 of non-lethal gas-operated gun 100, and are used to exemplary illustrate the progressive cyclic actions of the trigger and bolt carrier group for holding, supplying, and firing of non-lethal projectiles. FIGS. 2A-3, 2B-3, 2C-3, 2D-3, and 2E-3 are non-limiting, exemplary illustrations that show an enlarged portion of non-lethal gas-operated gun 100 indicated in respective FIGS. 2A-2, 2B-2, 2C-2, 2D-2, and 2E-2, with FIGS. 2A-4, 2B-4, 2C-4, 2D-4, and 2E-4 showing the same, but viewed at an angle.

FIGS. 2A-1 to 2E-4, illustrate a non-lethal gas-operated gun 100, comprising a trigger group 106 and a bolt carrier group 504 that provide cyclic actions of holding, supplying, and firing of non-lethal projectiles without the use of hammer reset component. As illustrated in FIGS. 2A-1 to 2A-4, prior to pulling trigger 116, disconnector 508 holds (or maintains) primary hammer 510 in place.

As illustrated in FIGS. 2B-1 to 2B-4, when trigger 116 is pulled (shown by arrow 520), disconnector 508 pivots free of primary hammer 510, which also frees primary hammer 510 to swing forward (shown by arrow 522) and strike against secondary hammer 514. As secondary hammer 514 is struck by primary hammer 510, it also swings forward and strikes against a poppet valve 506 of gas regulator system 512a of magazine 108, releasing gas (shown by arrows 518) into bolt carrier group 504 propelling a non-lethal projectile 320. That is, when poppet valve 506 is actuated/depressed by secondary hammer 514, pressurized gas 518 is released from magazine 108 and into bolt carrier group 504 via gas inlet 524 on bottom surface 528 of bolt 526.

As illustrated in FIGS. 2C-1 to 2C-4, after non-lethal projectile 320 exits bolt 526, rocket valve 502 pushes forward and blocks gas existing from front 528 of bolt 526 and through barrel 530. This closure of front 528 of bolt 526 directs gas 518 to rear 532 of bolt carrier group 504. The force of gas 518 against rear 532 of bolt carrier group 504 initiates the recoil process. That is, once a set volume "X" of pressurized gas is present in bolt 526, non-lethal projectile 320 is shot forward and bolt carrier group 504 is pushed back. Gas 518 propels non-lethal projectile 320 out of barrel 530 and rear moving gas 518 pushes bolt carrier group 504 backwards creating recoil.

As indicated above, Applicant has discovered and recognized that it is lack of proper pressure and inefficient gas usage that has lead most conventional gas-operated guns to use additional components (such as a hammer reset component) for proper basic operations of the gun. Accordingly, the disclosed gas-operated gun may maintain the proper basic operation of the gun without the use of additional components such as the hammer reset component by sufficiently pressurizing the chamber of the gun and the efficient use and management of gas. That is, the disclosed system provides a non-limiting, exemplary higher gas pressure of approximately 250 psi or higher, which provides sufficient gas flow in the momentary actuation of poppet valve 506 by secondary hammer 514. Therefore, no lag or dwell time is required to provide more gas flow and therefore, no need for a hammer reset component. Gas pressure may optionally be limited to no higher than 450 psi.

In particular, most conventional gas-operated guns use a lower gas pressure of less than 200 psi. This means that it may take "Y" millisecond to provide the required "X" volume of gas to bolt 526 for ejecting a non-lethal projectile 320 and moving bolt carrier group 504 back. Since "Y" milliseconds is longer than the momentary actuation of poppet valve 506 when struck by secondary hammer 514, conventional systems require the addition of the hammer reset component, which when set, locks poppet valve 506 to open/pressed position to release more gas until sufficient pressure is achieved so that bolt 526 has successfully pushed backwards to reset the hammer reset component and poppet valve 506 (releasing/closing poppet valve 506 to shut off gas flow). With the disclosed system, the non-limiting, exemplary higher pressure of greater than 250 psi means that it takes less than "Y" milliseconds to provide "X" volume of gas to bolt 526. Indeed, "X" volume of gas is released the second poppet valve 506 has been actuated thereby obviating the need for a hammer reset component to hold poppet valve 506 to open position for "Y" milliseconds. Further details are provided with respect to efficient use of gas to maintain high pressure when discussing details of gas regulator system 512a below in relations to FIGS. 12A to 12M).

As illustrated in FIGS. 2D-1 to 2D-4, as bolt carrier group 504 travels rearwards, it pushes against primary hammer 510, releasing pressure on secondary hammer 514 and poppet valve 506, and starting reset of the trigger group components, all without the use of reset hammer component.

As illustrated in FIGS. 2E-1 to 2E-4, as bolt carrier group 504 reaches the rear 536, primary hammer 510 is fully pressed down and reset, ready to fire once bolt carrier group 504 returns to forward. The manner in which bolt carrier group 504 moves forward is well known and convention. That is, well-known recoil buffer 764 pushes bolt carrier group 504 by a well-known spring (not shown for clarity) back to start position (FIGS. 2A-1 to 2A-4).

FIGS. 3A to 3G are non-limiting, exemplary illustrations of various views of a bolt of gas-operated gun shown in FIGS. 1A to 2E-4. Bolt 526 has been modified to enable a more efficient usage of gas while maintaining the proper basic operations of the gun. Bolt 526 includes a hood 538 with a generally greater thickness 540 (compared to conventional hoods of non-lethal gas-operated guns) to strengthen bolt 526 and provide a larger flat surface 542 to seal against hop-up 544 (best shown in FIG. 2A-4), which prevents potential gas leakage and hence, increases efficiency of gas usage.

As further illustrated, bolt 526 further includes an added filler 546 (configured as a beveled or slanted surface) to front bore 548 to better "cradle" non-lethal projectiles 320, and includes a generally thickened pusher 550 (FIG. 3B) to strengthen bolt 526. As further illustrated, bolt 526 now includes an integrated single piece gas-key that is shorter for a better fit within upper receiver 102, and includes a gas inlet 524 moved back and angled to better interface with magazine 108 gas seal outlet 552 (FIG. 2E-4 and FIG. 4E).

FIGS. 4A to 4C are non-limiting, exemplary illustrations of various view of a fully assembled magazine that includes a pre-pack, with FIG. 4A a lateral view, FIG. 4B a front view, and FIG. 4C a rear view of the magazine. In addition, FIGS. 4D and 4E are non-limiting, exemplary illustrations of a lower receiver (and "magazine well" 554) of non-lethal gas-operated gun 100 shown in FIGS. 1A to 3G with FIG. 4D illustrating lower receiver 104 without magazine 108, and FIG. 4E illustrating the same but with an inserted magazine 108.

As illustrated in FIGS. 4A to 4E, magazine 108 looks, feels, and provides the same experience as a conventional magazine of a conventional rifle such as the M4. To use magazine 108, a user may insert magazine 108 into magazine well 554 as shown in FIGS. 4D and 4E, and use non-lethal gas-operated gun 100 as if using a conventional rifle such as the M4. Magazine 108a includes a pre-pack 556a (detailed below) that supplies rounds to non-lethal gas-operated gun 100 through the action of the reciprocal bolt carrier group 504 as detailed above. Magazine 108 also includes a gas regulator system 512a (detailed below) for supply of gas (generally $CO_2$) to non-lethal gas-operated gun 100.

As illustrated in FIGS. 4A to 4E, magazine 108 is comprised of a housing 558 that has an exterior 560 with a form-factor commensurate with a magazine well 554 of non-lethal gas-operated gun 100. In other words, exterior 560 is shaped or configured and is adapted to be used with and fit non-lethal gas-operated gun 100.

Housing 558 includes a top side 562 that interfaces with upper receiver 102 of non-lethal gas-operated gun 100 and includes a front opening 564 that receives feeder 566 of a pre-pack 556a. Top side 562 further includes gas seal 552, and has a top, rear lateral opening 568 for receiving a strike (or actuation or switch) member 570 of a poppet valve 506.

Rear side 572 of magazine 108 includes a rear opening 574 for enabling access to an adjuster mechanism 716 (detailed below) of an adjustable stabilizer assembly 712 of outlet chamber 696 of pressure and flow stabilizer 690 of gas regulator system 512a (all of which are detailed below). The magazine further includes an enclosure assembly 584 to enable access into an interior 590 of housing 558 of magazine 108 to insert and remove pre-pack 556a.

FIGS. 5A to 5H are non-limiting, exemplary illustrations, progressively illustrating a non-limiting, exemplary method of insertion (and removal, if reversed) of a pre-pack into the magazine housing of magazine 108 shown in FIGS. 1A to 4E. As illustrated, a pre-pack 556a may be inserted and removed from magazine 108 housing 558 with ease through enclosure assembly 584. In the non-limiting exemplary instance illustrated in FIGS. 5A to 5E, magazine 108 is empty with no pre-pack 556a.

Once a pre-pack 556a is used and emptied out of its non-lethal projectiles 320, it may be removed and replaced with a new pre-pack 556a. A new pre-pack 556a may be inserted into magazine housing 558 by first opening enclosure assembly 584 (FIGS. 5A to 5D), and inserting a new pre-pack 556a (FIGS. 5E and 5F), and finally closing off the enclosure assembly 584 (FIGS. 5G, 5H, and 4A to 4E). As detailed below, interior 590 of magazine housing 558 is keyed (or indexed) to receive pre-pack 556a in only a certain orientation so that a gas reservoir (e.g., a canister) 206 of pre-pack 556a is aligned and mates with and is pierced by gas regulator system 512a of magazine 108 as enclosure assembly 584 is fully latched (FIGS. 4A to 4E).

Figure 6C:
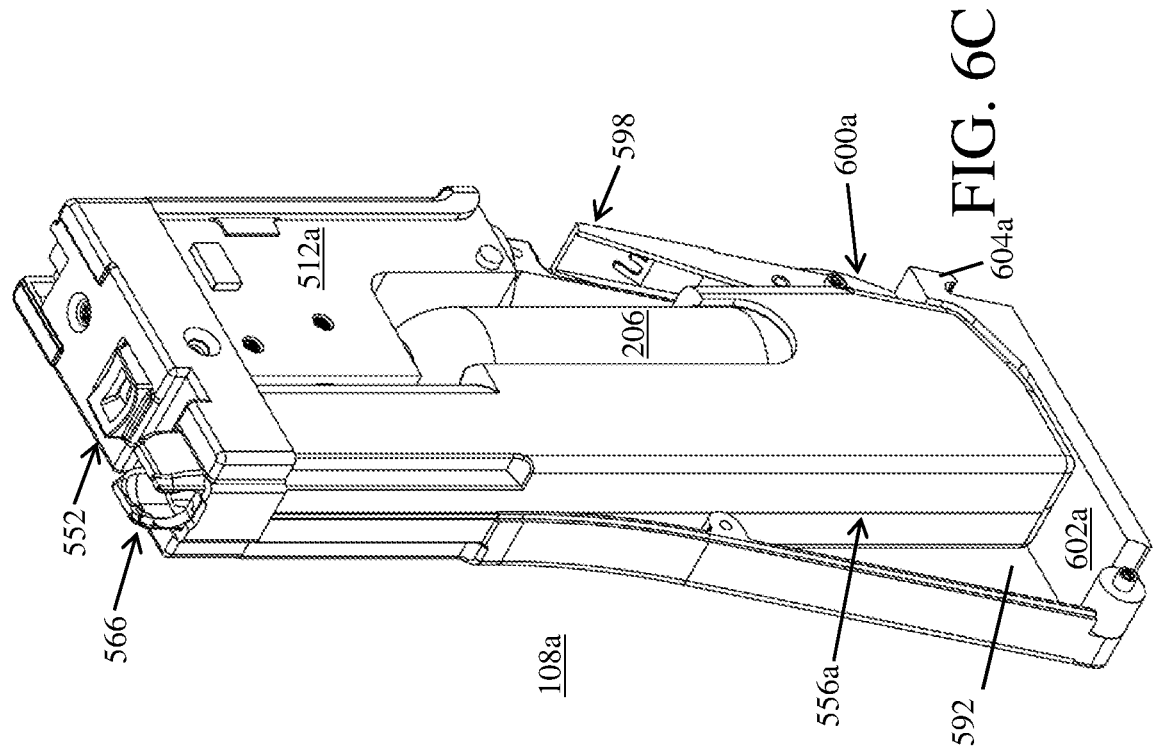
Figure 6B:
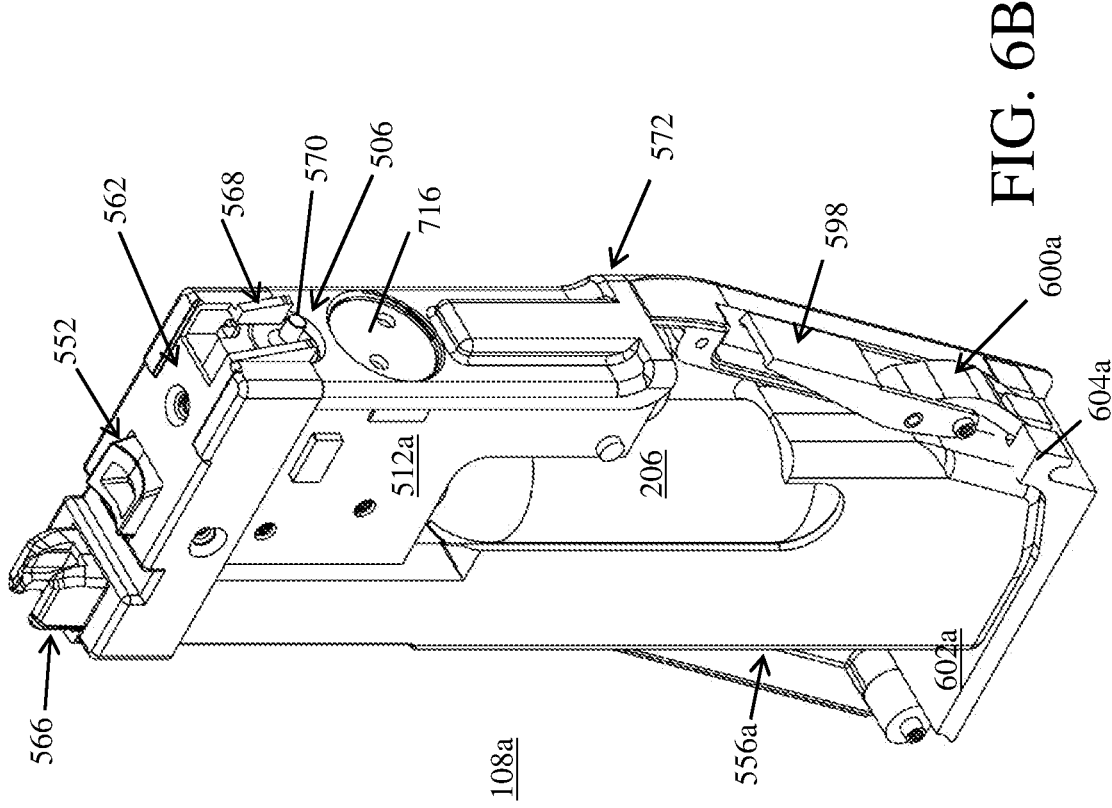
Figure 6D:
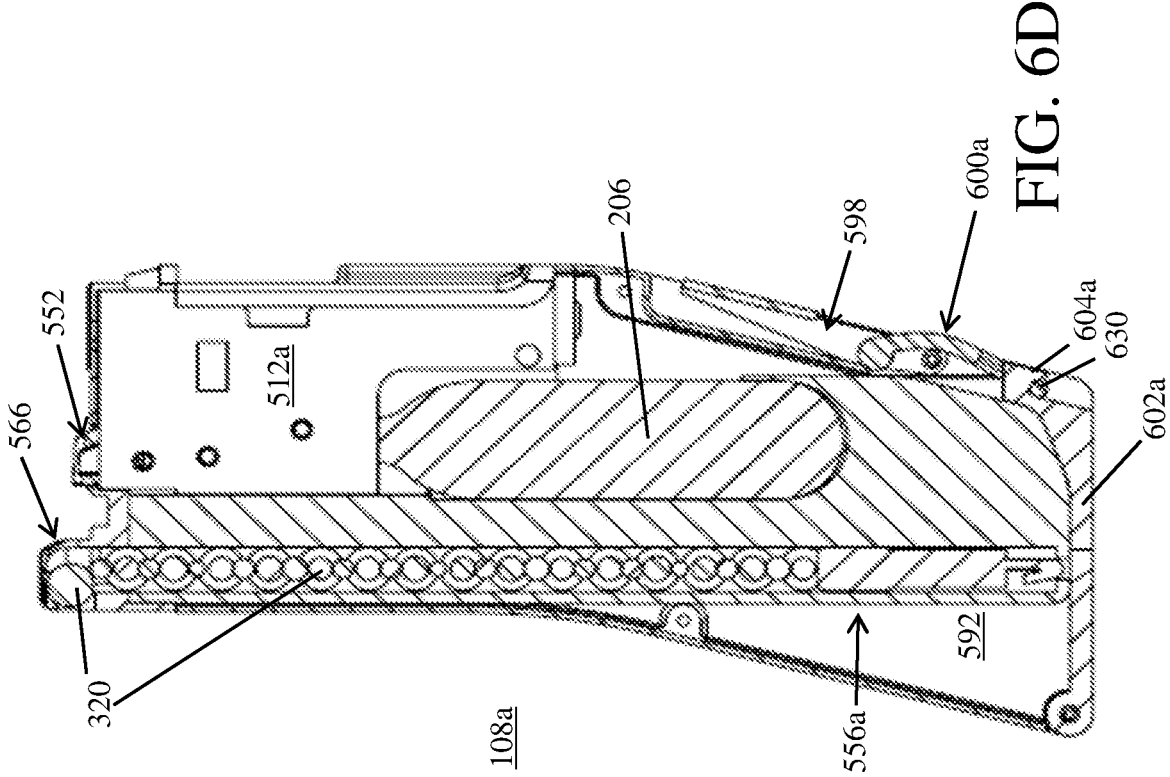
Figure 7B:
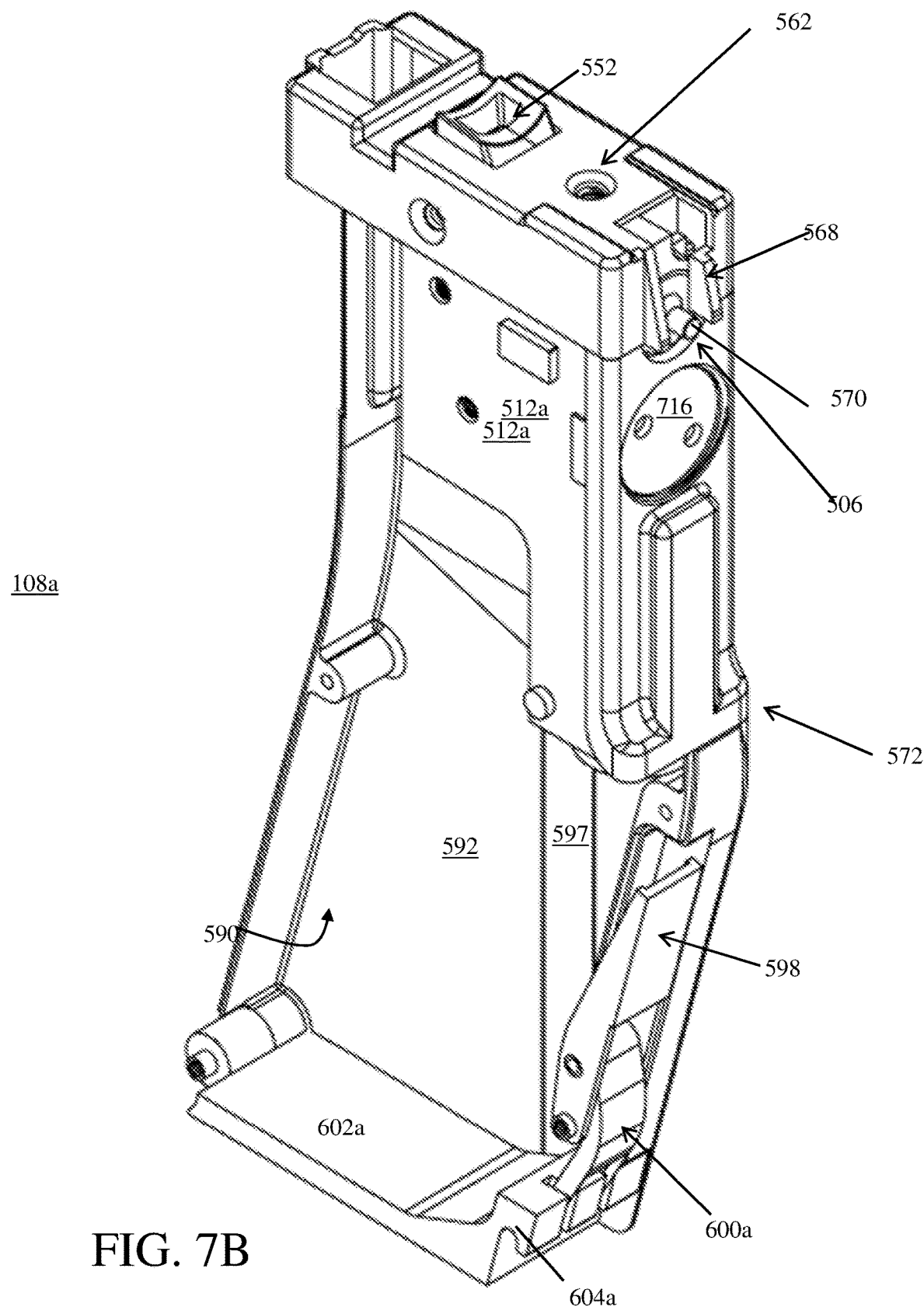
Figure 7G:
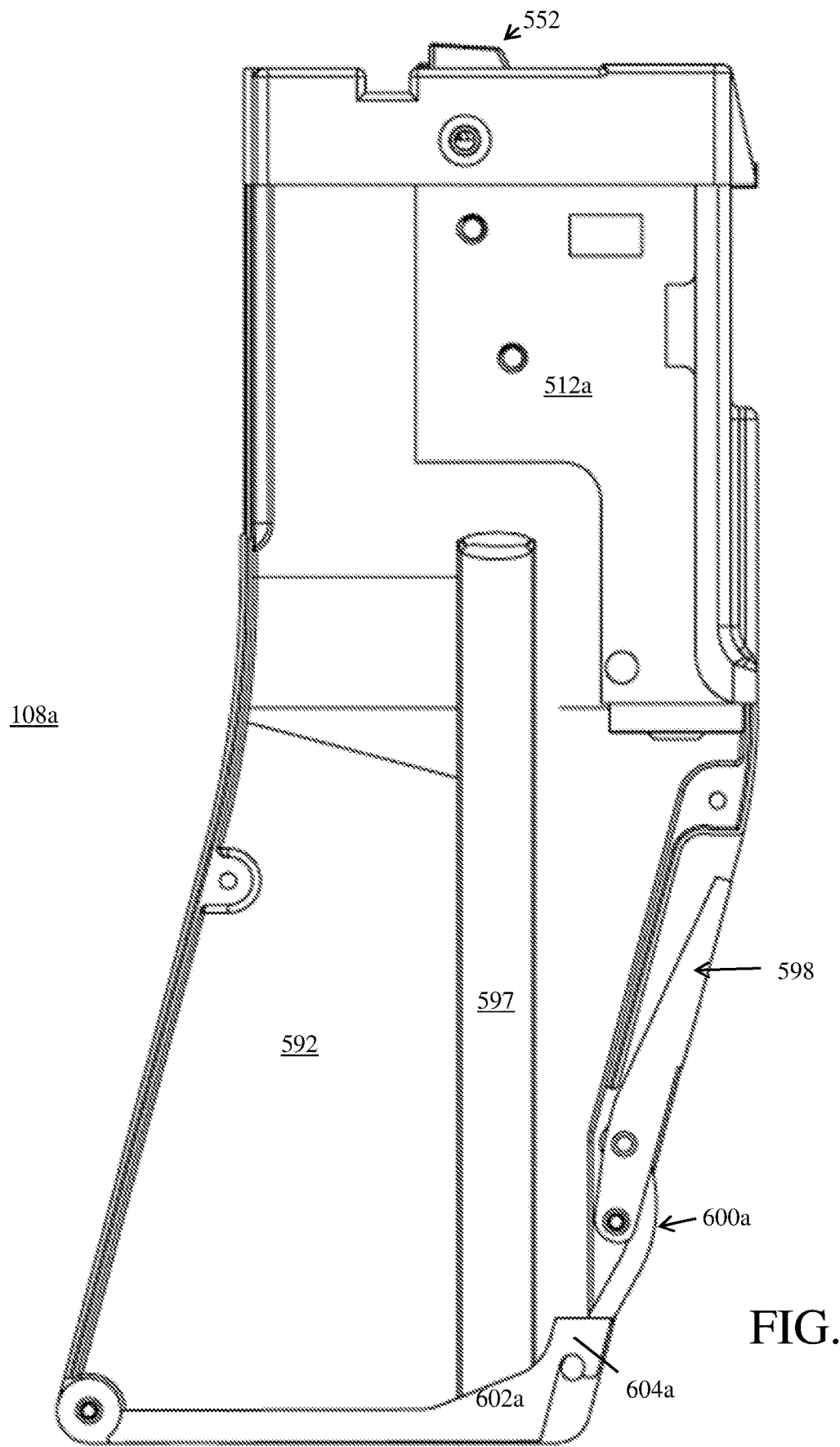

FIGS. 6A to 6D are non-limiting, exemplary illustrations of various views of the magazine illustrated in FIGS. 1A to 5H, but with a pre-pack and with one lateral wall removed. FIG. 6D is a partial sectional view taken from FIG. 6A (gas regulator system 512a is not shown as sectioned). FIGS. 7A to 7G are non-limiting, exemplary illustrations of various views of the magazine illustrated in FIGS. 1A to 6D, but without a pre-pack and with one lateral wall removed.

Figure 8:
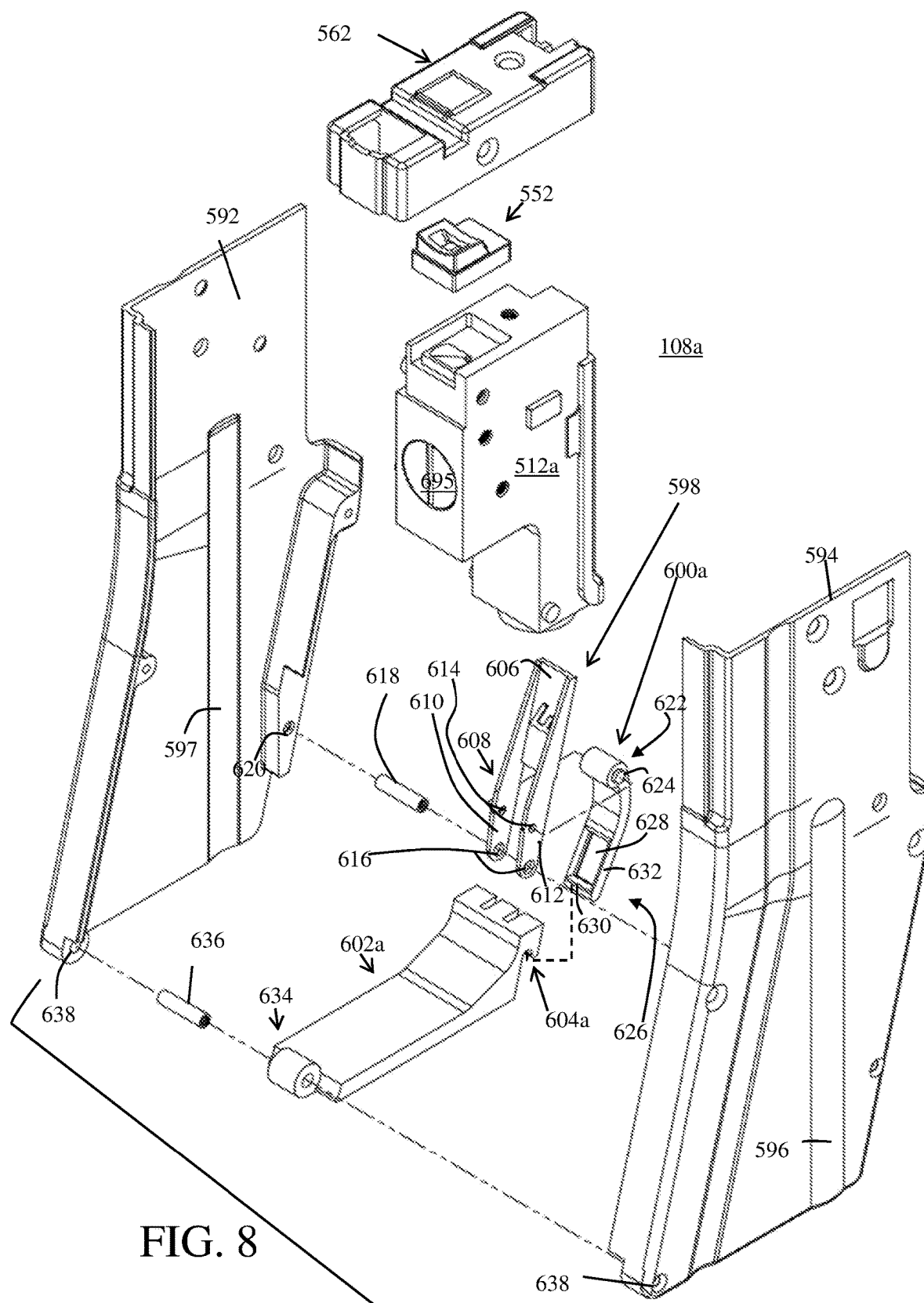
Figure 9E:
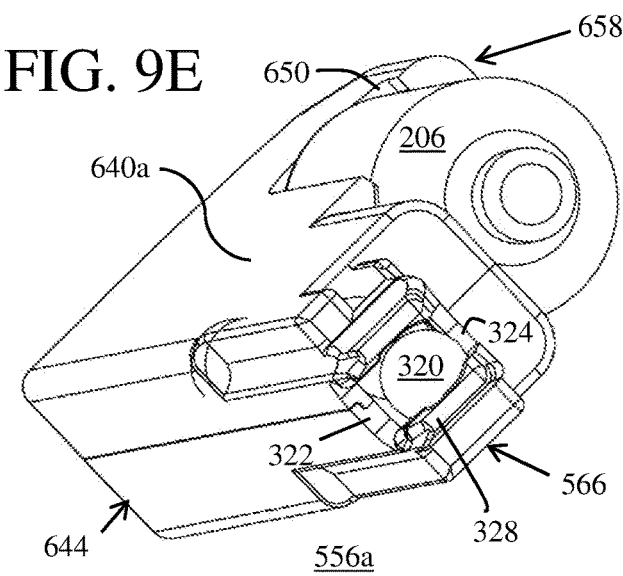
Figure 9F:
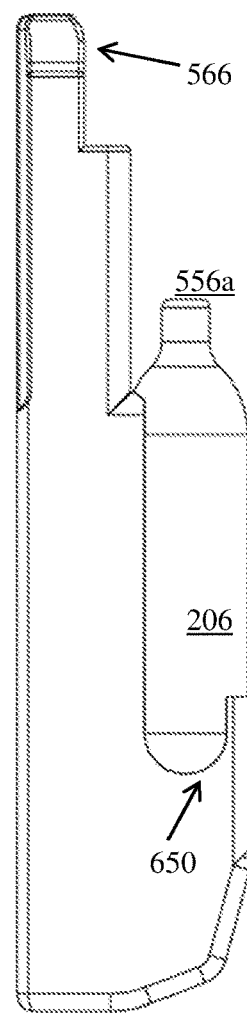
Figure 9G:
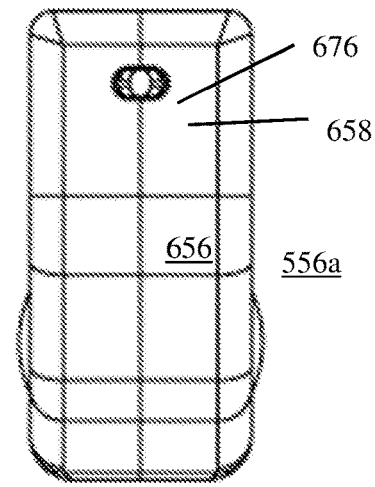
Figure 9H:
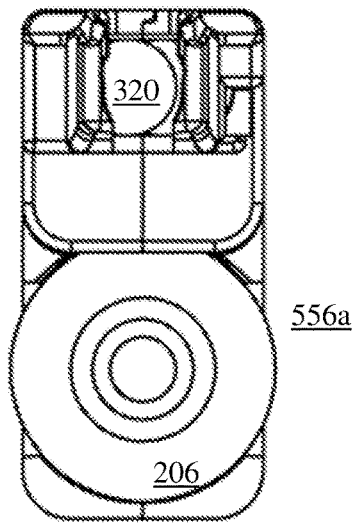
Figure 9I:
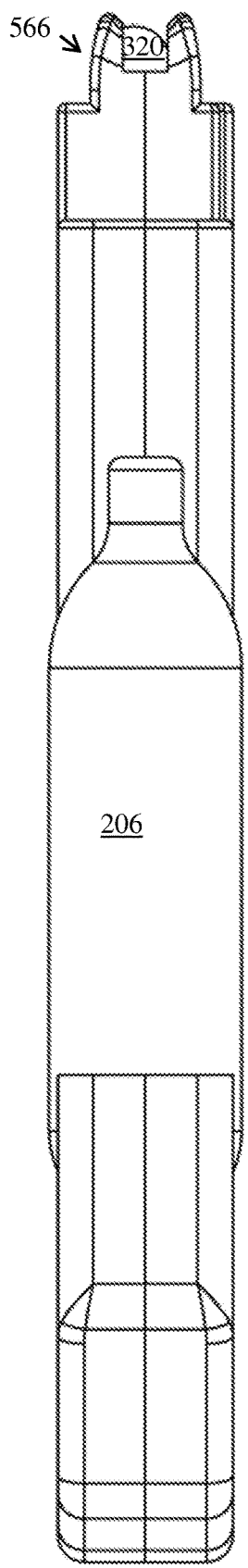
Figure 9J:
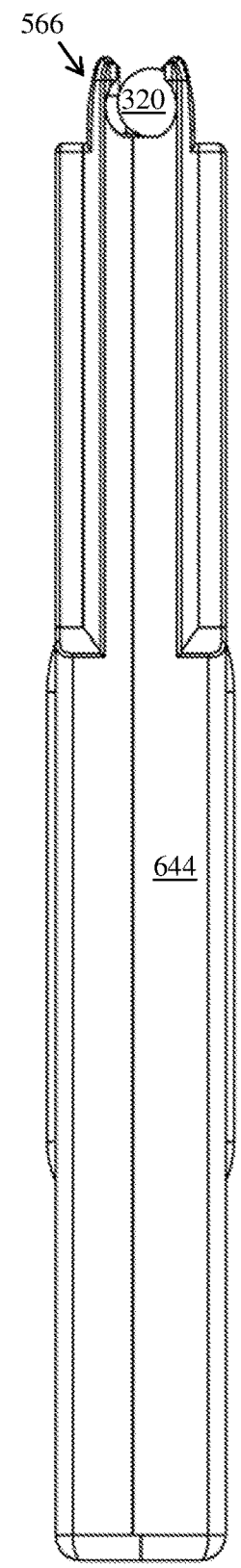

FIG. 8 is non-limiting, exemplary exploded view illustration of the magazine illustrated in FIGS. 1A to 7G, but without showing a pre-pack. The exploded view shown in FIG. 8 illustrates disassembled, separated components that show the cooperative working relationship, orientation, positioning, and exemplary manner of assembly of the various components of the magazine, with each component detailed below.

As illustrated in FIGS. 1A to 8, interior 590 of magazine 108a includes lateral walls 592 and 594 that are mirror images and include outward extending bulge (convex) 596 (and corresponding inner concaved surface or "channel" 597) to accommodate cylindrical body of canister 206. Exterior convex or bulge 596 and corresponding interior concaved portion 597 may be used as an indexing feature, which aid in proper orientation of pre-pack 556a prior to insertion thereof into magazine 108a. Interior 590 of magazine 108a further accommodates gas regulator system 512a.

Magazine enclosure assembly 584 includes a handle 598 associated with a latch member 600a, and an enclosure 602a with a keeper portion 604a that enables latch member 600a to latch onto keeper 604a to maintain enclosure 602a at closed, latched position. Handle 598 is comprised of a first end 606 (FIG. 8) that is used to move it and a second end 608 comprised of a yoke with first and second extensions 610 and 612.

First and second extensions 610 and 612 of handle 598 include a first set of openings 614 that are aligned and a second set of openings 616 that are aligned. First set of openings 614 engage latch member 600a, while second set of openings 616 pivotally engage lateral sides walls 592 and 594 of magazine 108a via a first pivot pin 618. Magazine has a first set of enclosure assembly openings 620 along lateral walls 592 and 954 that receive first pivot pin 918.

Latch member 600a is comprised of a top portion 622 that includes a set of lateral projections 624 that extend transversely, forming pegs that pivotally engage (are inserted into) first set of openings 614 of handle 598, enabling latch member 600a and handle 598 to independently rotate (pivot) with respect to one another. A lower portion 626 of latch member 600a has an opening 628 defined by a transversely extending interlock portion 630 connected with longitudinally extending support portions 632, with opening 628 receiving keeper 604a of enclosure 602a to interlock keeper 604a with interlock portion 630 of latch member 600a.

Enclosure 602a is comprised of a first end that is configured as keeper 604a, and a second end (a hinge) 634 that pivotally engages a rear end of magazine 108a by a second pivot pin (a hinge pin) 636. Magazine 108a has a second set of enclosure assembly openings 638 along lateral walls 592 and 594 thereof that receive second pivot pin 636. Enclosure 602a rotates about second pivot pin 636. In other words, enclosure 602a is a hinged door that includes a hinge pivot 636 that is inserted through a hinge barrel 634 and connected to second set of enclosure assembly openings 638 of magazine 108a.

The set up provides a rotating handle 598 as shown to allow latch 600a to lock or be released from keeper 604a. It should be noted that as shown in FIGS. 5G and 5H, initially latch 600a does not open fully just because handle 598 is at its resting, unlatched position. This provides a fail-safe feature in the event that canister 206 is accidentally released when still full of gas, which can cause it to "propel" towards the bottom of magazine 108a; with this fail-safe feature, latch 600a catches door 602a and allows gas to expel without the entire pre-pack 556a ejecting out of bottom of magazine 108a.

Figure 10:
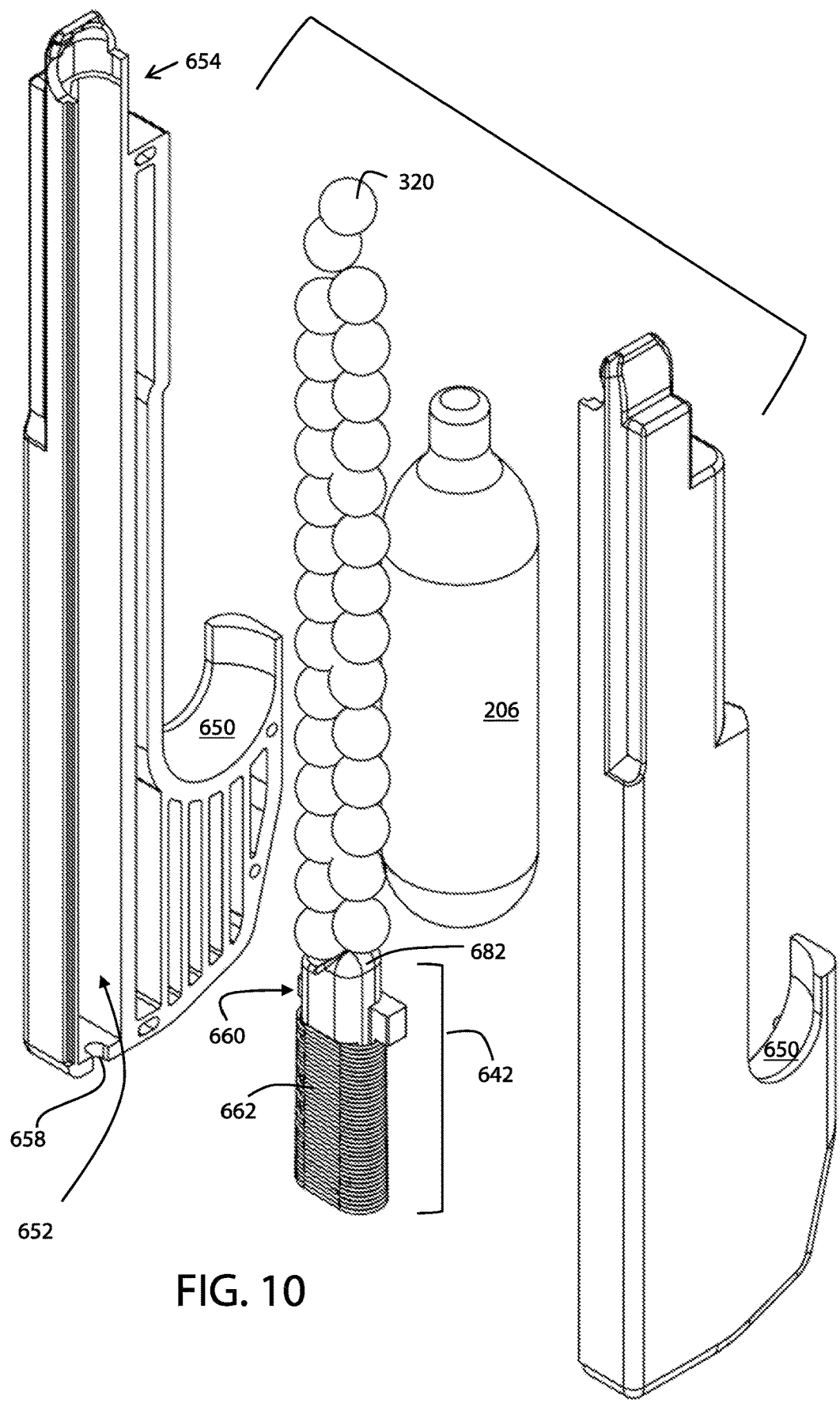
Figure 11A:
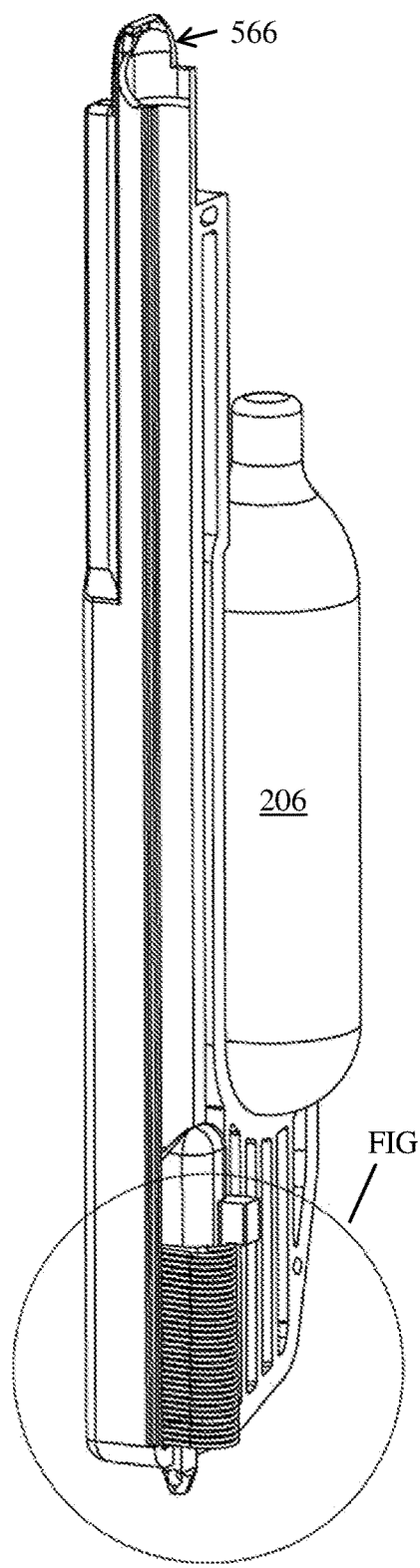
Figures 1, 11B:
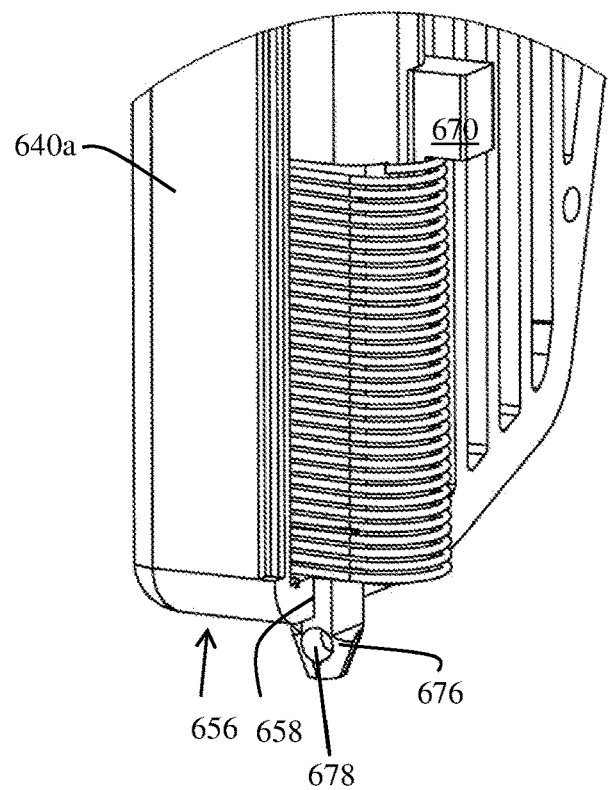
Figures 2, 11B:
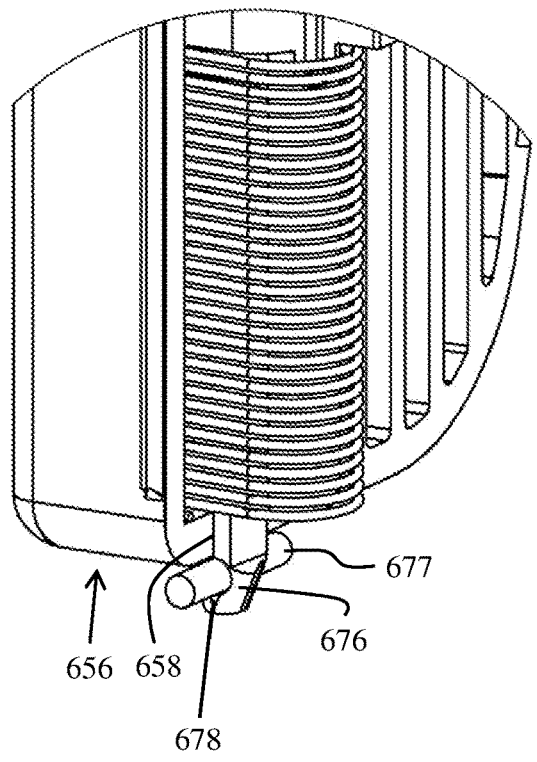
Figure 11C:
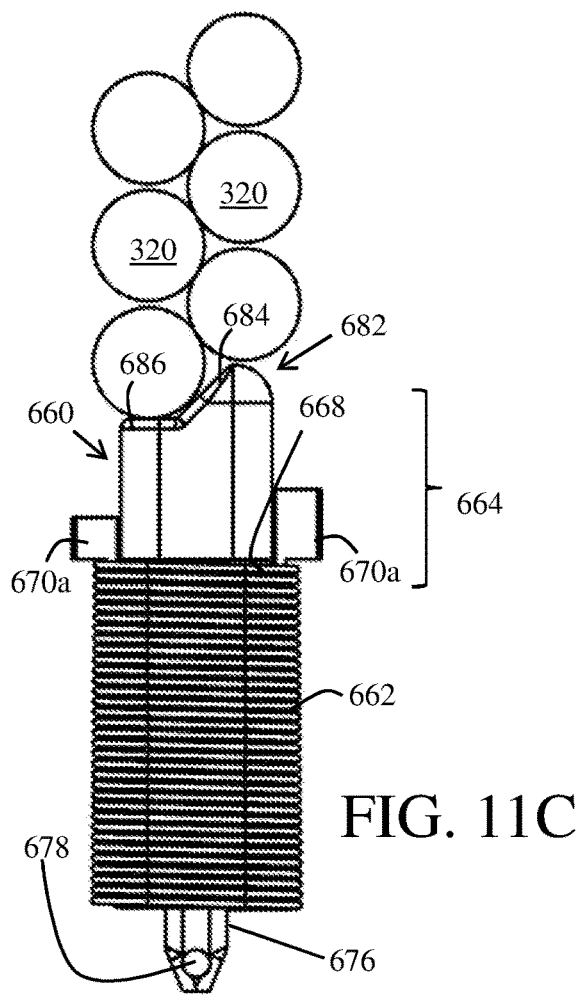
Figure 11D:
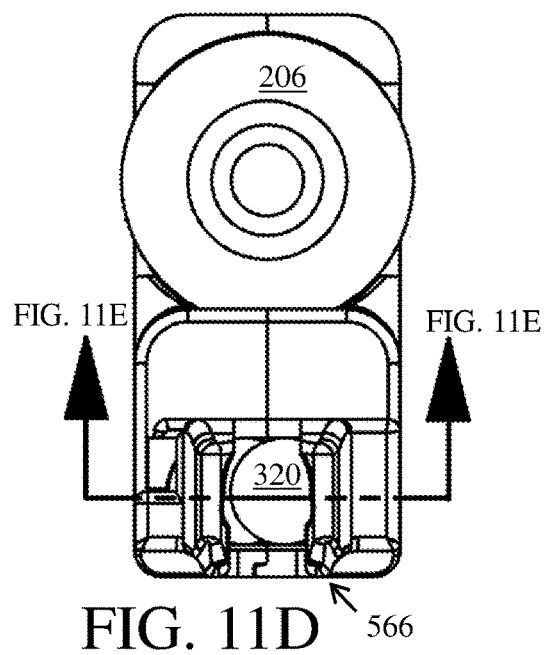
Figure 11E:
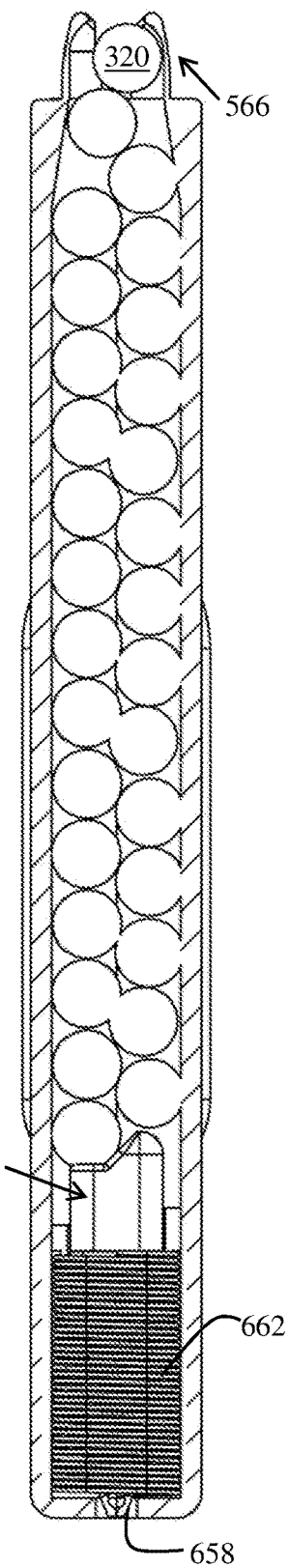
Figures 11F, 11G:
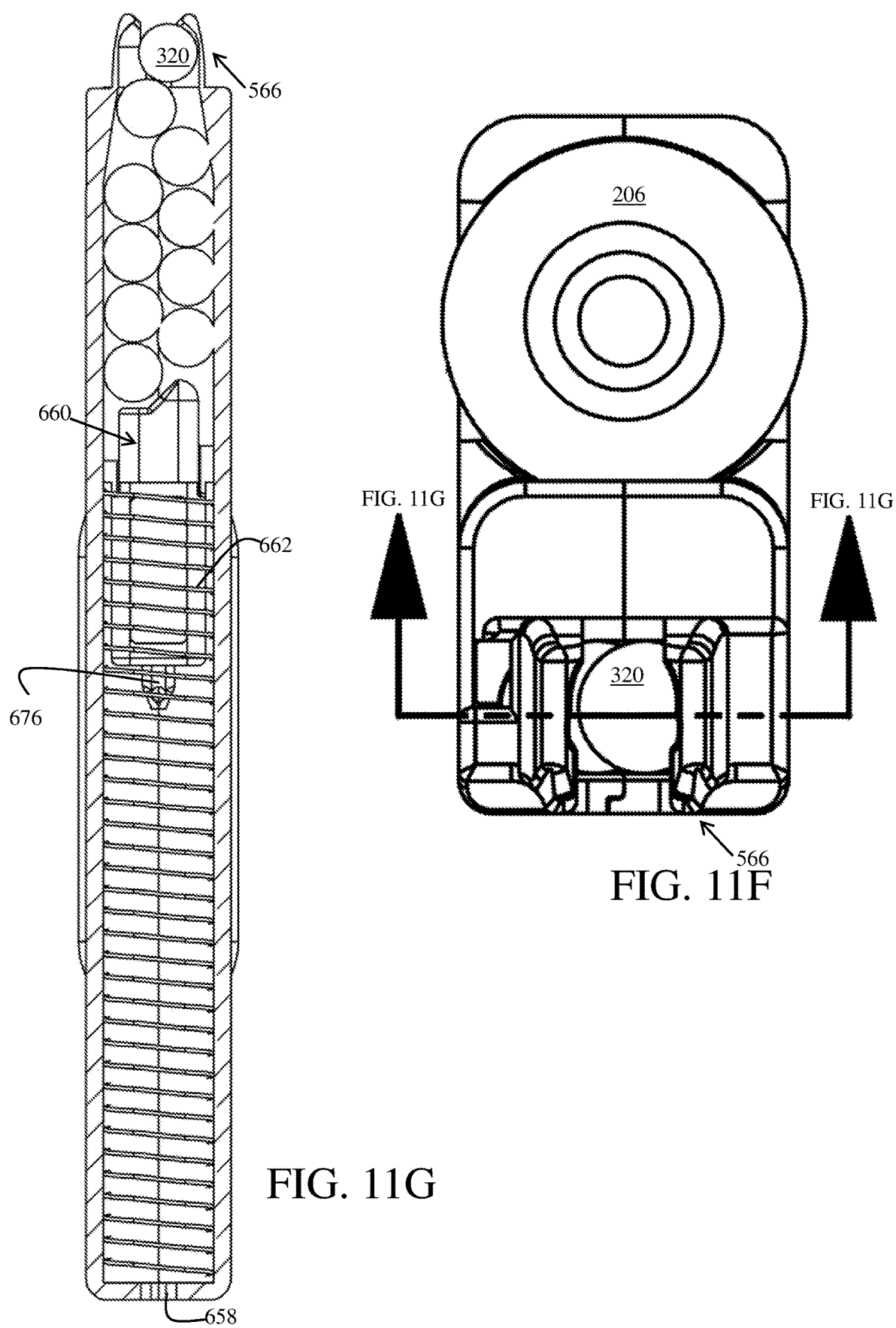
Figure 12A:
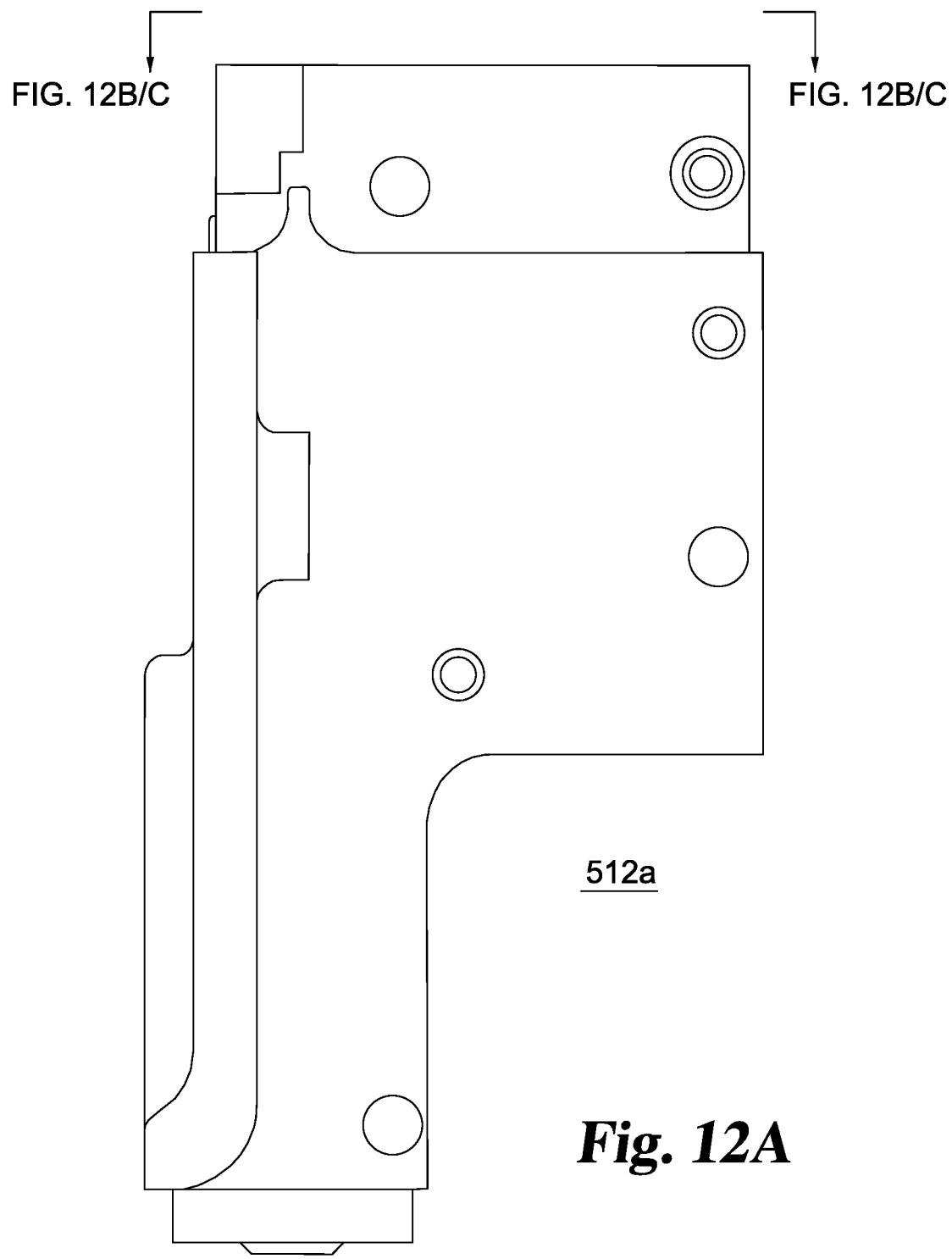
Figure 12C:
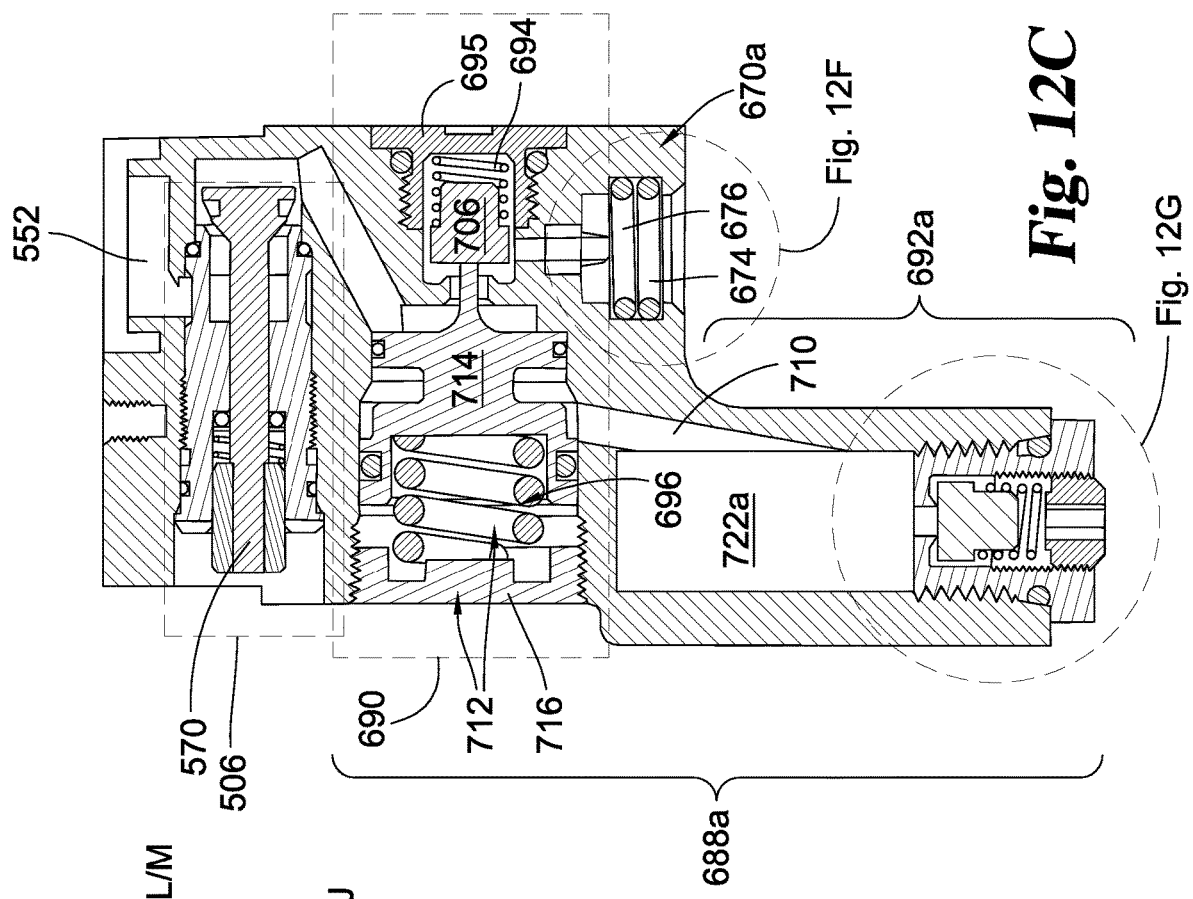
Figure 12B:
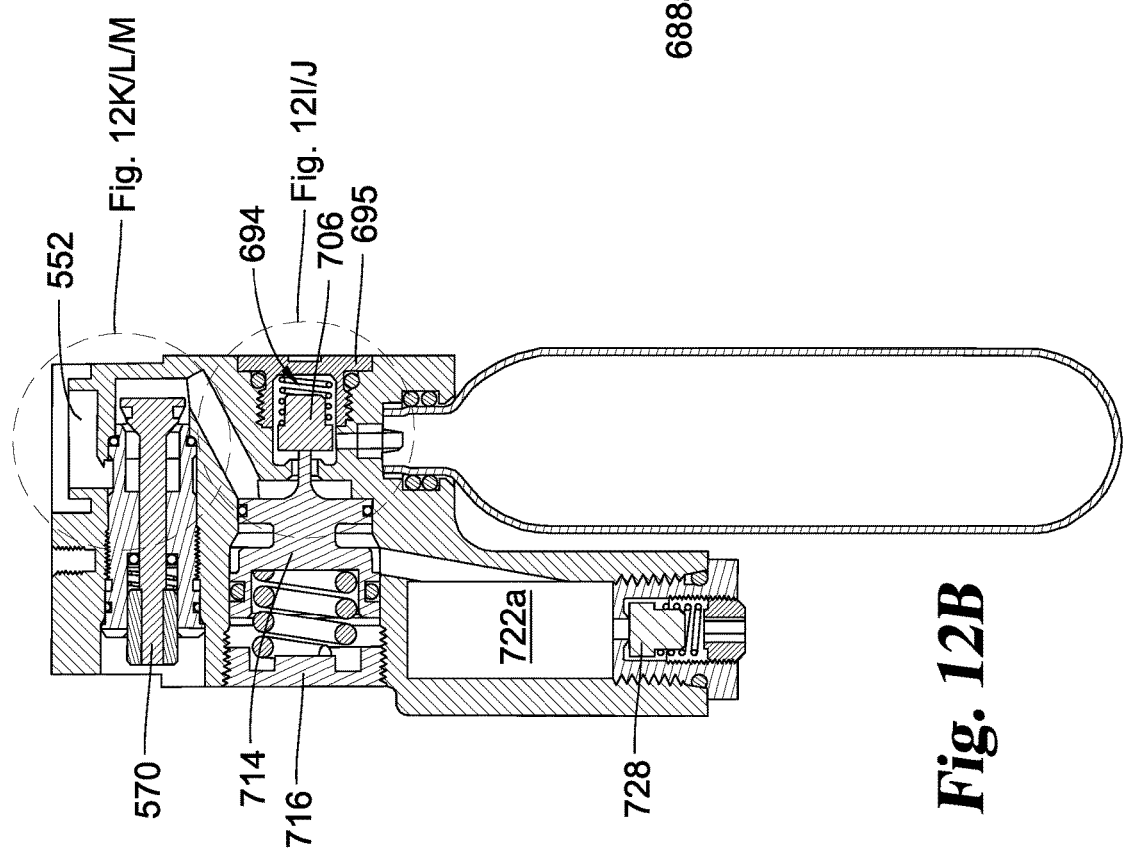
Figure 12D:
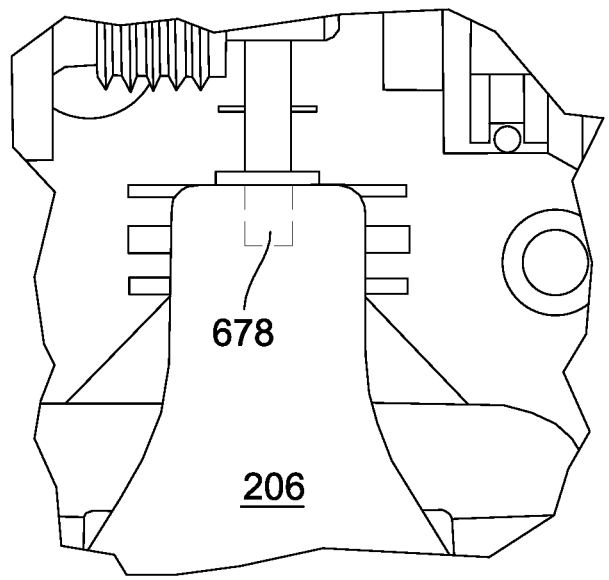
Figure 12E:
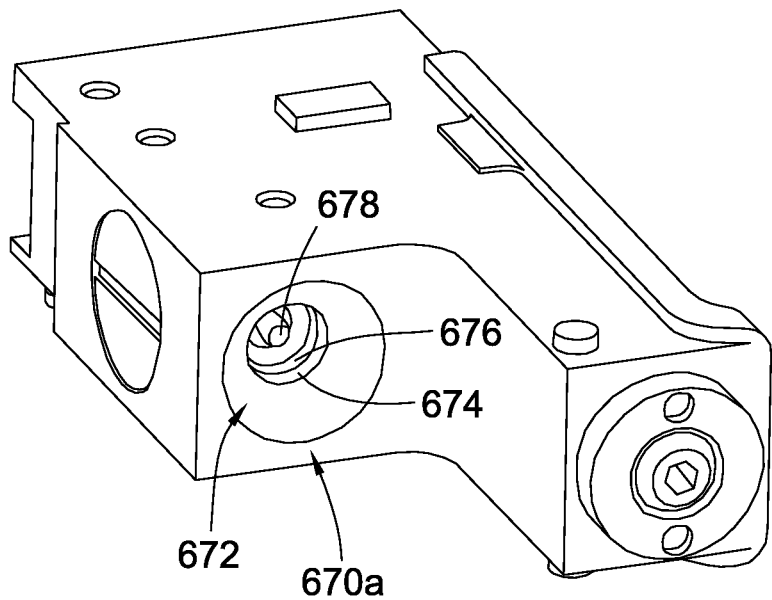
Figure 12F:
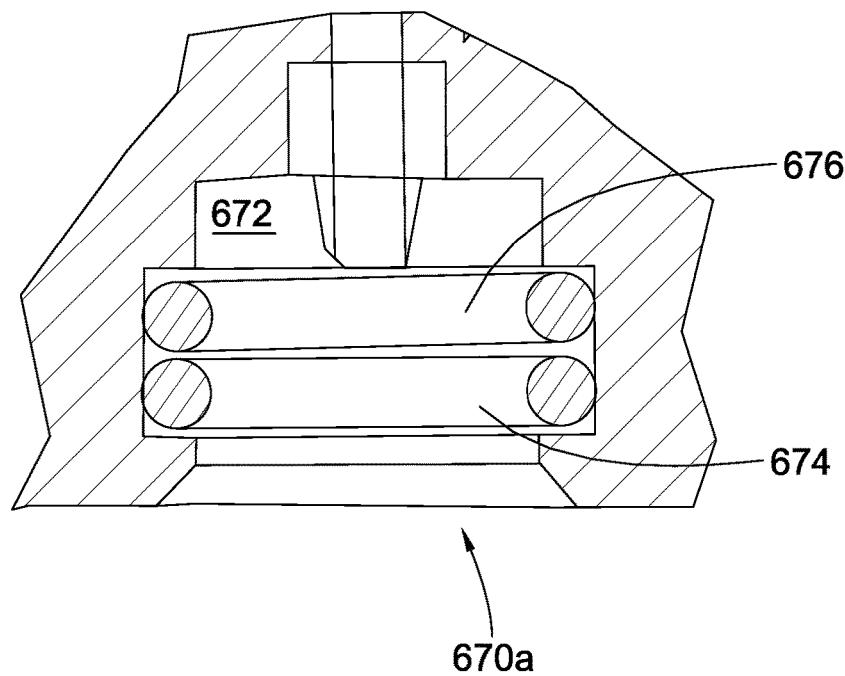
Figure 12G:
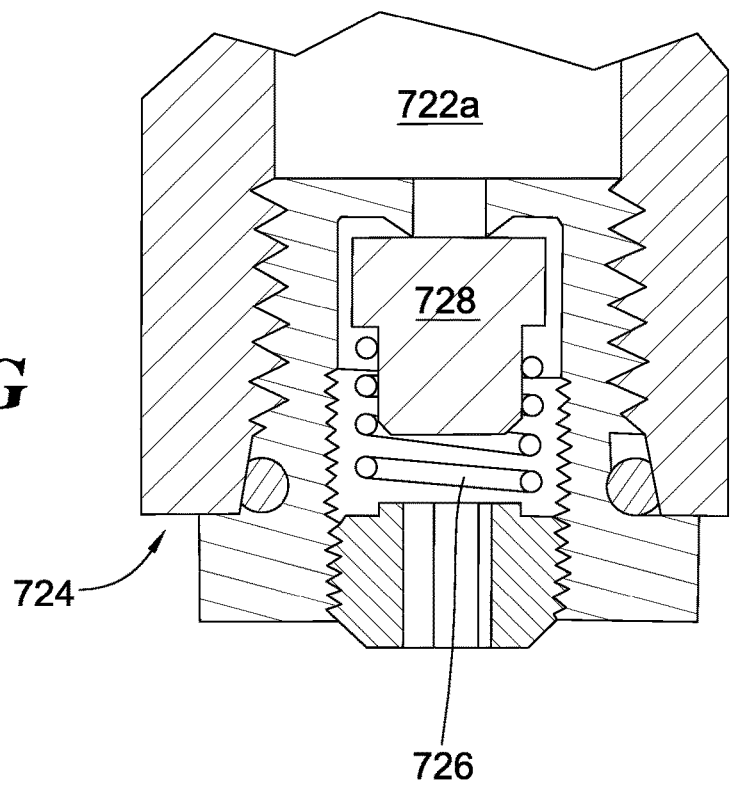
Figure 12H:
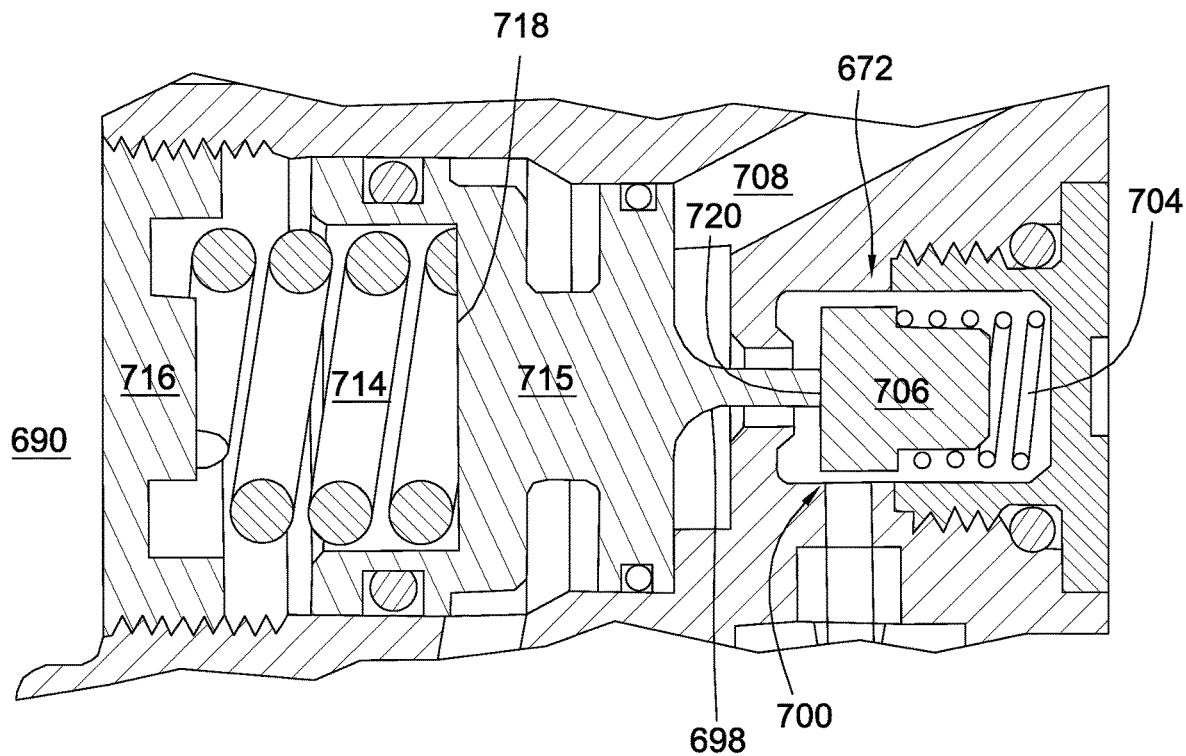
Figure 12I:
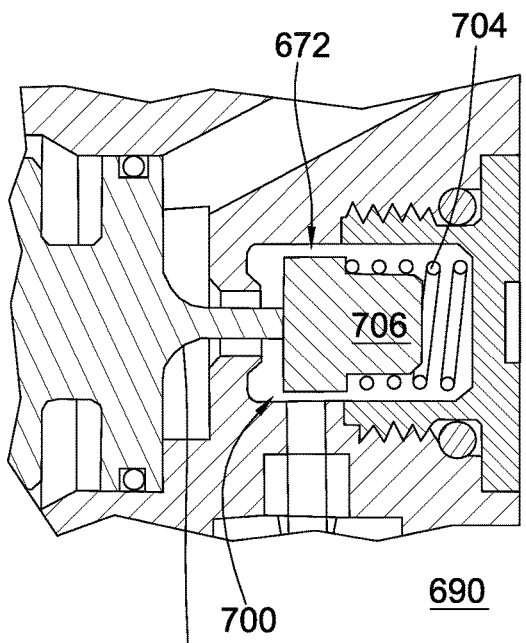
Figure 12J:
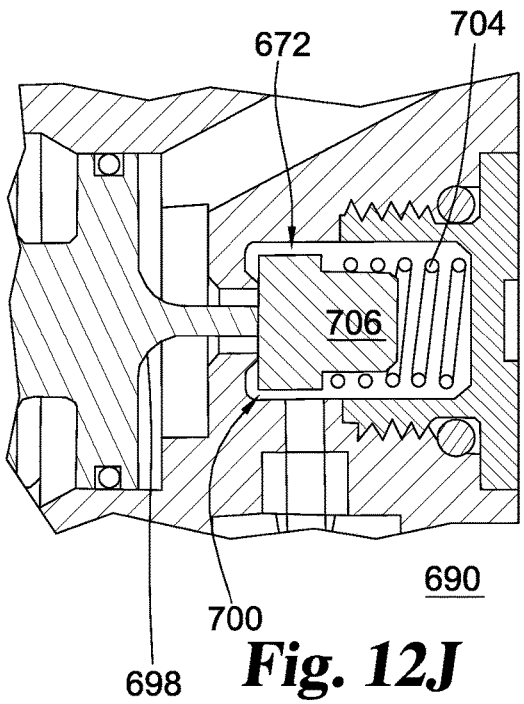

FIGS. 9A to 9J are non-limiting, exemplary illustrations of various views of a pre-pack. FIG. 10 is non-limiting, exemplary exploded view illustration of the pre-pack illustrated in FIGS. 1A to 9J. The exploded view shown in FIG. 10 illustrates disassembled, separated components that show the cooperative working relationship, orientation, positioning, and exemplary manner of assembly of the various components of the pre-pack, with each component detailed below. FIGS. 11A to 11I are non-limiting, exemplary illustrations of various detailed views of a projectile drive assembly of the pre-pack illustrated in FIGS. 1A to 10.

As further illustrated in FIGS. 1A to 11I, magazine 108a accommodates and securely houses pre-pack 556a. Pre-pack 556a is a replaceable cartridge that includes a casing (or a container) 640a, with casing 640a housing a projectile actuator assembly 642 and accommodating a gas canister 206. Casing 640a may comprise of two mirrored pieces (best shown in FIG. 10) that may be connected together by a living hinge, solvent-bonded together, mechanically clipped together, ultrasonic welded together, or other well known methods of connections. Casing 640a includes an exterior front side 644 that has a configuration that is commensurate with interior configuration of a front side 646 (FIG. 4B) of magazine 108a.

Casing 640a further includes an exterior rear side 648 part of which is configured as a cradle portion 650 of casing 640a that accommodates gas canister 206. Canister 206 may be secured to cradle portion 650 of casing 640a by a variety of mechanisms, a non-limiting example of which may include the use of adhesives such as a glue to fix canister 206 onto cradle portion 650 of casing 640a.

Casing 640a is comprised of a compartment 652 positioned along an interior of front side 644, with compartment 652 having a top end 654 comprised of feeder 566. Feeder 566 includes a loader opening 324 that enables bolt leg of bolt 526, to clear it. Bolt 526 through its forward motion moves projectile 320 at ejector opening 322 into the inner barrel chamber.

Feeder 566 also includes a restrictor opening 328 that prevents non-lethal projectiles 320 from falling out of feeder 566. In other words, restrictor opening 328 is configured as a slit, which prevents further vertical motion of non-lethal projectiles 320 out of feeder 566, prior to projectile 320 being horizontally driven by bolt 526 out of ejector opening 322. It should be noted that there is constant load acting on non-lethal projectiles 320 prompting them to move upward towards restrictor opening 328. The load originates from projectile actuator assembly 642 (detailed below).

A bottom end 656 of casing 640a has an assembly opening 658 that receives a lower portion of a follower member 660 of projectile actuator assembly 642, with assembly opening 658 facilitating the assembly of pre-pack 556a. As illustrated, compartment 652 houses non-lethal projectiles 320 and projectile actuator assembly 642.

Projectile actuator assembly 642 is comprised of follower member 660 and a biasing mechanism 662 comprised of a resilient member in a form of a spring. It should be noted that biasing mechanism 662 is active once pre-pack 556a is assembled, ready for use.

Follower member 660 includes a top distal portion 664 that engages to push and guide non-lethal projectiles 320 within compartment 652 and out from feeder 566. Follower member 660 further includes a body 666 around which biasing mechanism 662 is wrapped, with a first end 668 of biasing mechanism 662 supported by a set of transversely extending flanges 670a of top distal portion 664, and a second end 672 of biasing mechanism 662 supported by bottom end 656 of casing 640a.

Follower 660 has a bottom distal portion 674 that includes a flat surface with a protrusion 676 that extends from bottom end 674, and extends out of assembly opening (through-hole) 658 of bottom end 565 of casing 640a. Protrusion 676 includes an opening 678 that receives a pin 677 (FIG. 11B-2) that functions to capture/maintain follower 660 at its loaded position (at bottom of casing 640a, best shown in FIG. 11B), but without exertion of force onto non-lethal projectiles 320. This facilitates shipping of pre-pack 556a without non-lethal projectiles 320 experiencing a constant compressive force. It should be noted that the protrusion 676 and pin 677 may be colored (e.g., orange), informing users that pin 677 should be removed prior to insertion of pre-pack 556a into magazine 108.

Once pin 677 is removed out of opening 678 (best shown in FIG. 11E), follower 660 is pushed up due to the force of biasing mechanism 662, which moves non-lethal projectiles 320 towards feeder 566, with non-lethal projectiles remaining at the feeder 566 (and not falling or popping out) due to restrictor opening 328. After which, bottom non-lethal projectiles 320 are moved up by the force of biasing mechanism 662 as top non-lethal projectiles 320 are fed into gun chamber.

As illustrated, non-lethal projectiles 320 (about 30 rounds or more) may optionally be positioned two-wide (double stack pattern) in a vertical channel 680 and are pushed into chamber of the gun via biasing mechanism 662. Top surface 682 of follower 660 located between biasing mechanism 662 and the last non-lethal projectiles 320 in casing 640a has a geometry that preferentially pushed one projectile at a time into the chamber of the gun. The preferential geometry is comprised of offset top surfaces 684 and 686 that enable only one projectile 320 to be pushed into the chamber of the gun at any time.

As indicated above, magazine 108 further includes a gas regulator system 512a. FIGS. 12A to 12M are non-limiting, exemplary views of a gas regulator system. As illustrated in FIGS. 1A to 12M, gas regulator system 512a includes poppet valve 506 where gas is moved from poppet valve 506 and into bolt 526 as described above. Further included in gas regulator system 512a is a pressure regulator 688a.

Further included is a piercing portal 670a comprising a piercing cavity 672 that includes two sealing members 674 and 676 that seal gas canister 206 from external leakage prior to piercing of gas canister 206, and an invasive probe 678 in the form of a needle to pierce canister 206.

A first o-ring 674 seals canister 206 prior to being pierced, and as canister 206 is further driven into piercing portal 670a, a second o-ring 676 further seals canister 206. It should be noted that once gas reservoir cartridge (or canister) 206 is pierced, the gas will flow from canister 206 and hence, it is a matter of regulating flow and pressure build-up within pressure regulator 688a to make efficient use of gas.

Pressure regulator 688a includes a pressure and flow stabilizer 690 as well as a pressure limiter 692a. Pressure and flow stabilizer 690 includes an inlet chamber 694 and an outlet chamber 696, with inlet chamber 694 associated with outlet chamber 696 by a stabilizer opening 698. Inlet chamber 694 includes an ingress opening 700 associated with piercing portal 670a, and an inlet valve assembly 702 positioned between ingress opening 700 and stabilizer opening 698.

Inlet valve assembly 702 is comprised of a first biasing mechanism 704 and an inlet restrictor valve 706. Inlet restrictor valve (or flow restrictor) 706 is a hex, enabling continuous, but controlled flow of gas around inlet restrictor valve 706 and into inlet chamber 694 via ingress opening 700.

First biasing mechanism 704 biases inlet restrictor valve 706 to a closed position to close off stabilizer opening 700. First biasing mechanism 704 is a resilient member comprised of a spring with one end pressing against fastener 695 while the other end pressing against inlet restrictor valve 706.

Outlet chamber 696 is comprised of an outlet 708 that guides gas into poppet valve 506, an opening 710 that leads into pressure limiter 692a, and an adjustable stabilizer assembly 712. Adjustable stabilizer assembly 712 includes an actuator shaft 715 of inlet flow restrictor valve 706 and a second biasing mechanism 714 to adjustably move actuator shaft 715. Further included is an adjuster mechanism 716 (further detailed below). Second biasing mechanism 714 biases (forces) actuator shaft 715 to move inlet flow restrictor valve 706 to a less restrictive position away from stabilizer opening 698 to allow greater flow of gas.

A first end 718 of the actuator shaft 715 is engaged with second biasing mechanism 714, and a second end 720 of actuator shaft 715 is coupled with inlet flow restrictor valve 706. Second biasing mechanism 714 is positioned in-between, and engaged with, adjuster mechanism 716 and actuator shaft 715.

Adjuster mechanism 716 may be used to calibrate and set a desired stabilizing force required to be exerted by second biasing mechanism 714 to counter cumulative forces exerted by first biasing mechanism 704 and pressure from gas canister 206. This adjusts the position of inlet flow restrictive valve 706 to adjust flow of gas.

The compression force of first and the second biasing mechanisms 704 and 714 are dynamically, and continuously changed in relation to one another to maintain stability (and desired gas flow rate) based on the desired calibrated stabilizing force commensurate with pressurized force of gas from canister 206. In other words, biasing mechanisms 704 and 714 control the position of inlet flow restrictor valve 706 to control gas flow and hence, amount of pressure at a given time. As illustrated, adjuster mechanism 716 is a threaded plate that engages second biasing mechanism 714 and provides desired compression force to second biasing mechanism 714.

Adjuster mechanism 716 may be rotated from outside magazine 108, which would push on second biasing mechanism 714 and compress second biasing mechanism 714 to thereby apply force to actuator shaft 715. Therefore, any time second biasing mechanism 714 is stronger than the combined force from the gas pressure and the first biasing mechanism 704, inlet flow restrictor valve 706 moves to a less restrictive position away from stabilizer opening 698 to allow increased flow of gas. Adjuster mechanism may be adjusted prior to installation and assembly of magazine 108 or, alternatively, may be further adjusted by end user.

Pressure limiter 692a is comprised of a pressure chamber 722a and an outlet relief valve assembly 724 (FIG. 12G) for venting excess built-up pressure to a maximum operating pressure. Relief valve assembly 724 is comprised of a biasing member 726 (resilient member such as a spring) that biases a valve 728 to a closed position, with valve 728 moved to an open position against biasing force of resilient member 726 under the pressure of the excess gas from pressure chamber 722a. That is, valve 728 opens when pressure exceeds a certain maximum point.

It should be noted that gas regulator system 512a and in particular, pressure regulator 688a enables the use of canister 206 for several days rather than hours. In most instances, the $CO_2$ from canister 206 continuously leaks out gas after it has been pierced and directs connects with poppet valve 506. Pressure regulator 688a may extends the life and hence, the use of the same canister 206 over several days. Accordingly, pressure regulator 688a can efficiently regulates flow rate and pressure of gas from canister 206, including at poppet valve 506.

Most $CO_2$ canisters operate at a much higher PSI than the maximum operating PSI required by the gun. This means that maximum required pressure to eject a non-lethal projectile 320 is less than that which may be generated by a canister.

Pressure limiter 692a restricts (or regulates) the amount of pressure applied to projectile 320 to below a maximum level pressure of canister. Gas first moves into regulator inlet chamber 694 and into pressure limiter 692a, which operates to limit and maintain the overall gas pressure at poppet valve 506 at no more than a maximum level required to operate the gun and eject projectile 320.

Initial state of gas regulator system 512a—no gas:
If force from second biasing mechanism 714 is adjusted by adjuster mechanism 716 to be greater than first biasing mechanism 704, inlet flow restrictor valve 706 is less restrictive to flow of gas from stabilizer opening 698.

With gas canister 206 connected:
If the force from second biasing mechanism 714 is adjusted by adjuster mechanism 716 to be greater than first biasing mechanism 704 and the force generated by the pressure of the gas from canister 206, inlet flow restrictor valve 706 moves to open position. That is, second biasing mechanism 714 will exert force "F2" greater than the combined force "F1" of first biasing mechanism 704 and the force from the pressurized gas. Accordingly, inlet flow restrictor valve 706 is moved to less restrictive position to allow controlled flow of gas from inlet chamber 694 to outlet chamber 696 via the stabilizer opening 698. This further stabilizes the pressure between the inlet and outlet chamber 694 and 698 at desired pressures P1 (inlet chamber pressure) and P2 (outlet chamber pressure). The pressure "differential" between P1 and P2 sets the pressure by which gas moves to the feeding tube (first outlet) 708 to poppet valve 506, thereby controlling the amount of gas flowing into and out of poppet valve 506 and into the chamber of the gun.

When gun is not discharged:
Gas continues to build-up (as the gas continues to move from canister 206 and into pressure and flow stabilizer 690), but relief valve 728 of gas storage pressure chamber 722a regulates the pressure to maintain it at desired PSI.

When a gun is discharged:
When pulling trigger 116, secondary hammer 514 of trigger group 106 opens poppet valve 506; gas moves to the breach of the gun; this drops pressure in the pressure and flow stabilizer 690; however, at the same time, gas continues to fill the pressure and flow stabilizer 690 from canister 206 as well as the storage chamber 722a, which provides additional sufficient volume of gas to maintain desired pressure.

Substantially consistent projectile velocity:
The time for the pressure to recuperate within the pressure and flow stabilizer 690 and poppet valve 506 to maintain a substantially consistent projectile velocity is significantly shorter due to the use of a pressure limiter 692a. Without the use of pressure regulator 688a (and the pressure storage chamber 722a in particular) where canister 206 is directly connected to popper valve 506, once a projectile 320 is fired, it would take significant amount of time to recuperate gas pressure to an appropriate level. The time required to recuperate the pressure to minimal required operating pressure depends on several variables, all of which are compensated by the use of pressure storage chamber 722a. For example, if non-lethal projectiles 320 are rapidly fired, there may not be sufficient time for pressure to recuperate for the next firing of projectile 320.

Pressure storage chamber 722a of the pressure limiter 692a also enables rapid fire (ejections) of multiple non-lethal projectiles 320 in a short duration within a pressure range, enabling the gun to operate in automatic mode. The restricted volume of gas (and hence the pressure thereof) entering into poppet valve 506 and the chamber of the gun is not sufficient to propel and eject multiplicity of non-lethal projectiles 320 in a short duration. Accordingly, pressure chamber 722a also functions (as a "capacitor") to compensate with added pressure of gas to enable automatic mode of operation for the gun.

FIGS. 13 to 20I are non-limiting, exemplary illustrations of a magazine. Magazine 108b illustrated in FIGS. 13 to 20I includes similar corresponding or equivalent components, interconnections, functional, operational, and or cooperative relationships as the magazine 108a that is shown in FIGS. 1A to 12M, and described above. Therefore, for the sake of brevity, clarity, convenience, and to avoid duplication, the general description of FIGS. 13 to 20I will not repeat every corresponding or equivalent component, interconnections, functional, operational, and or cooperative relationships that has already been described above in relation to magazine 108a that is shown in FIGS. 1A to 12M but instead, are incorporated by reference herein.

Figure 13:
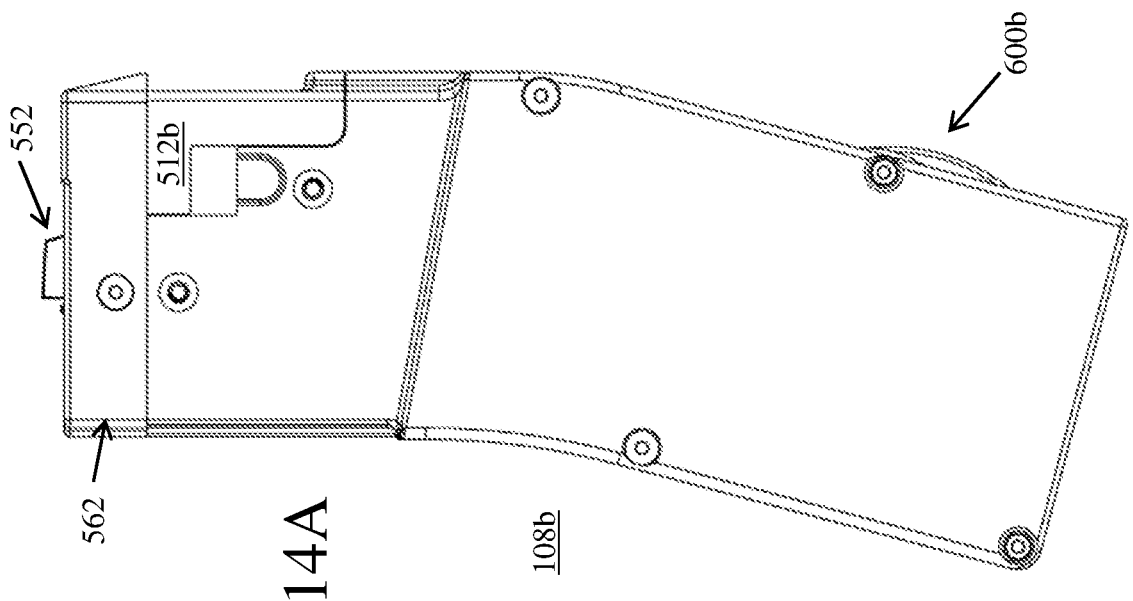
FIGS. 13 to 21D are non-limiting, exemplary illustrations of another embodiment of a magazine and its components.
Figure 14A:
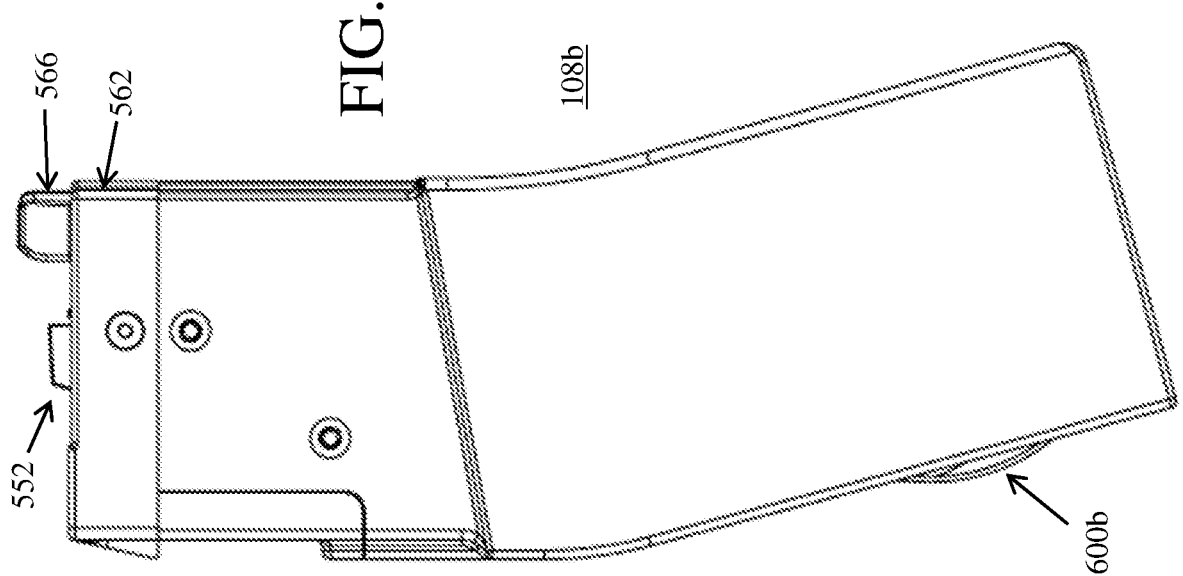
Figure 14C:
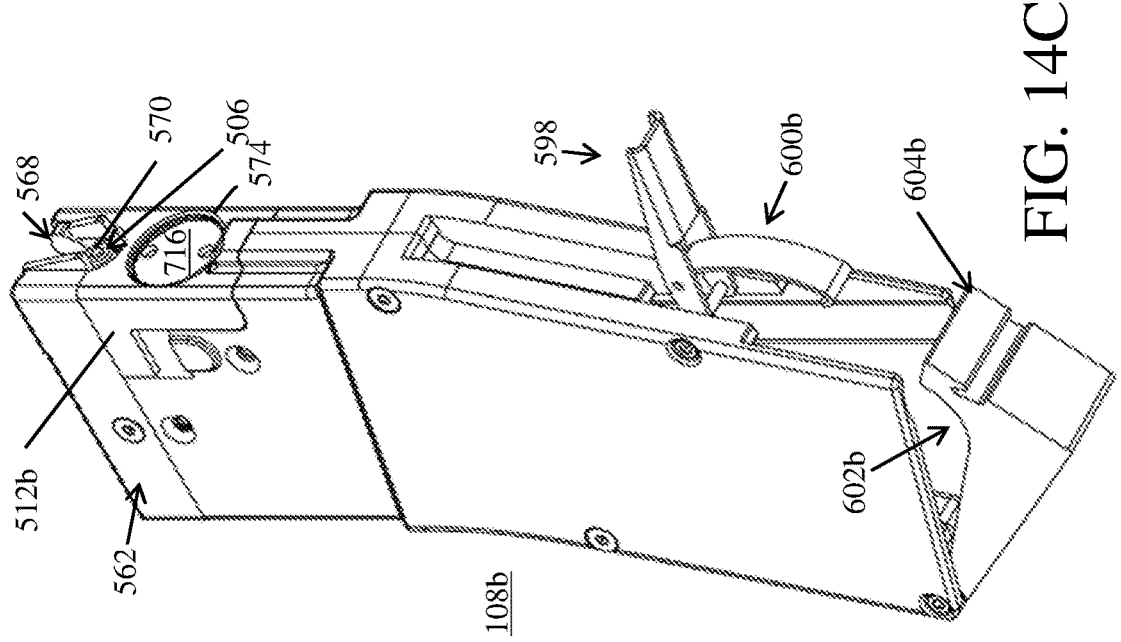
Figure 14B:
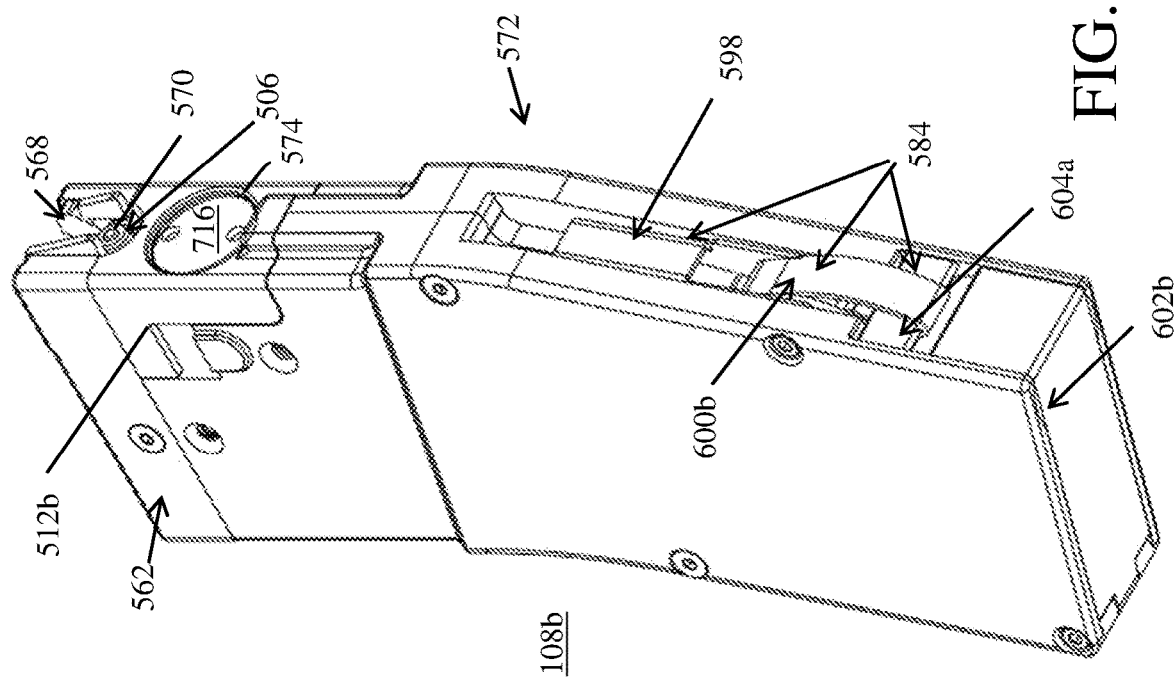
Figure 15A:
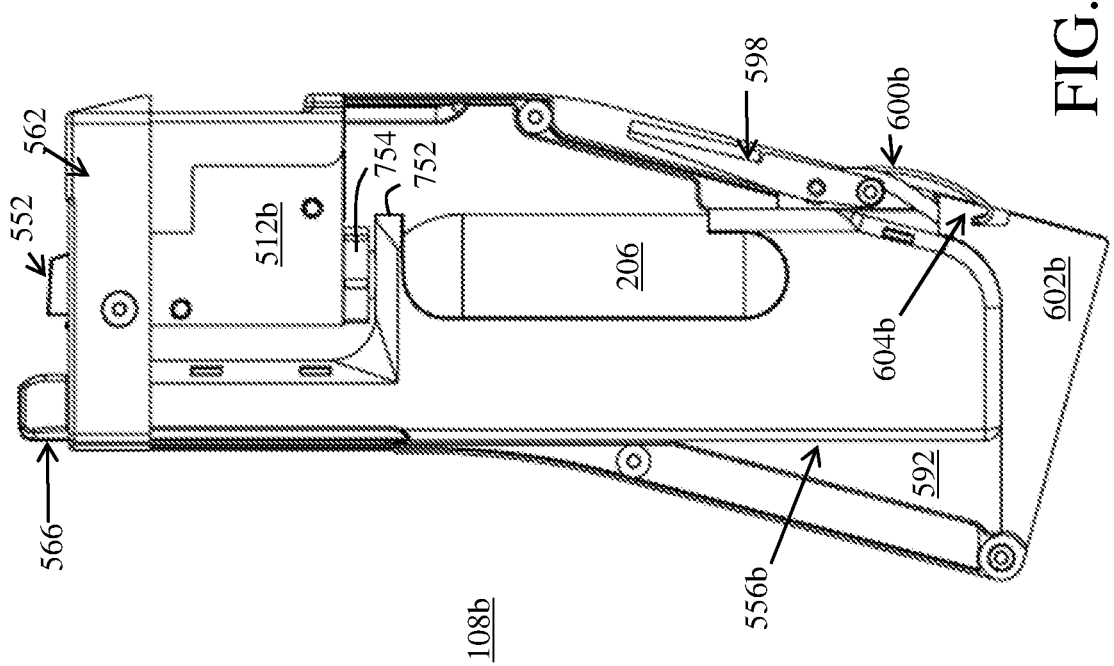
Figure 14D:
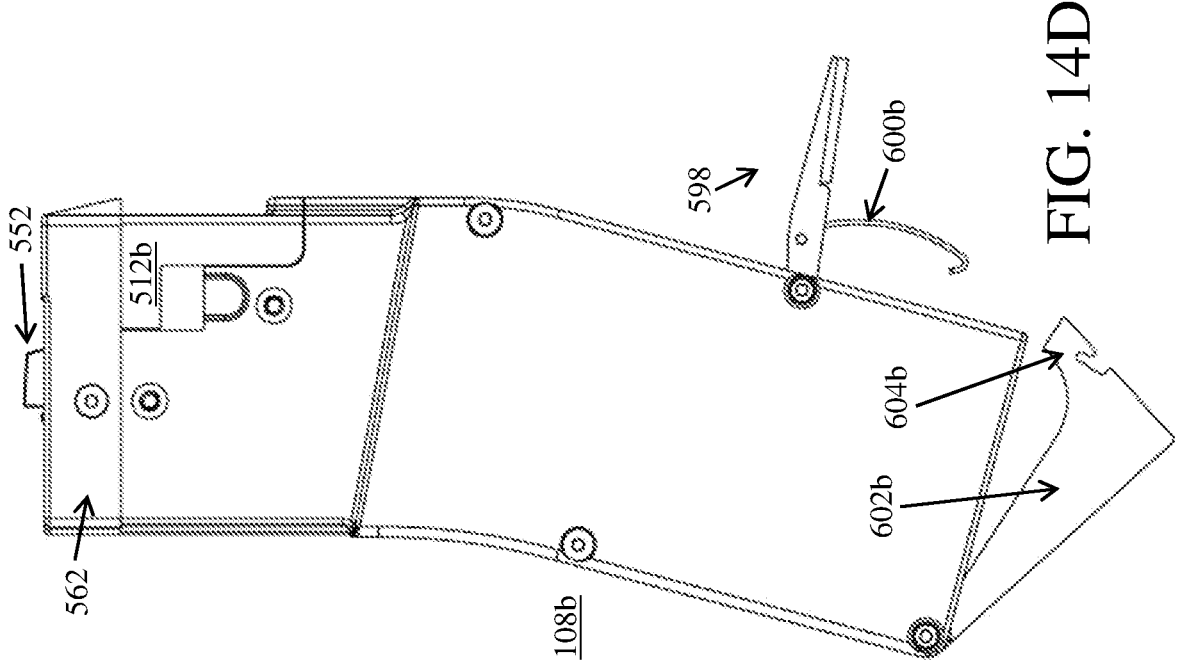
Figures 15B, 15C:
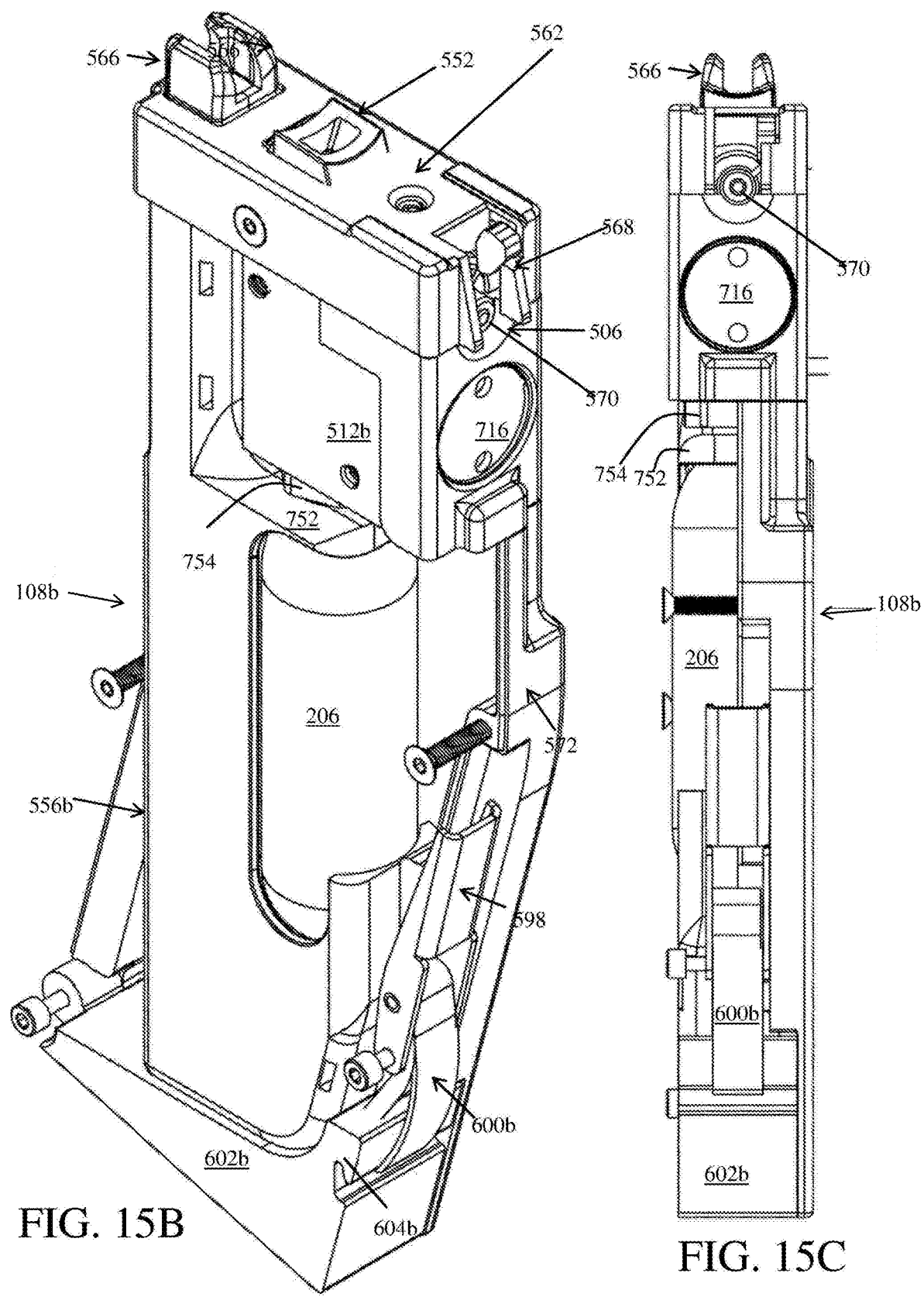
Figure 16A:
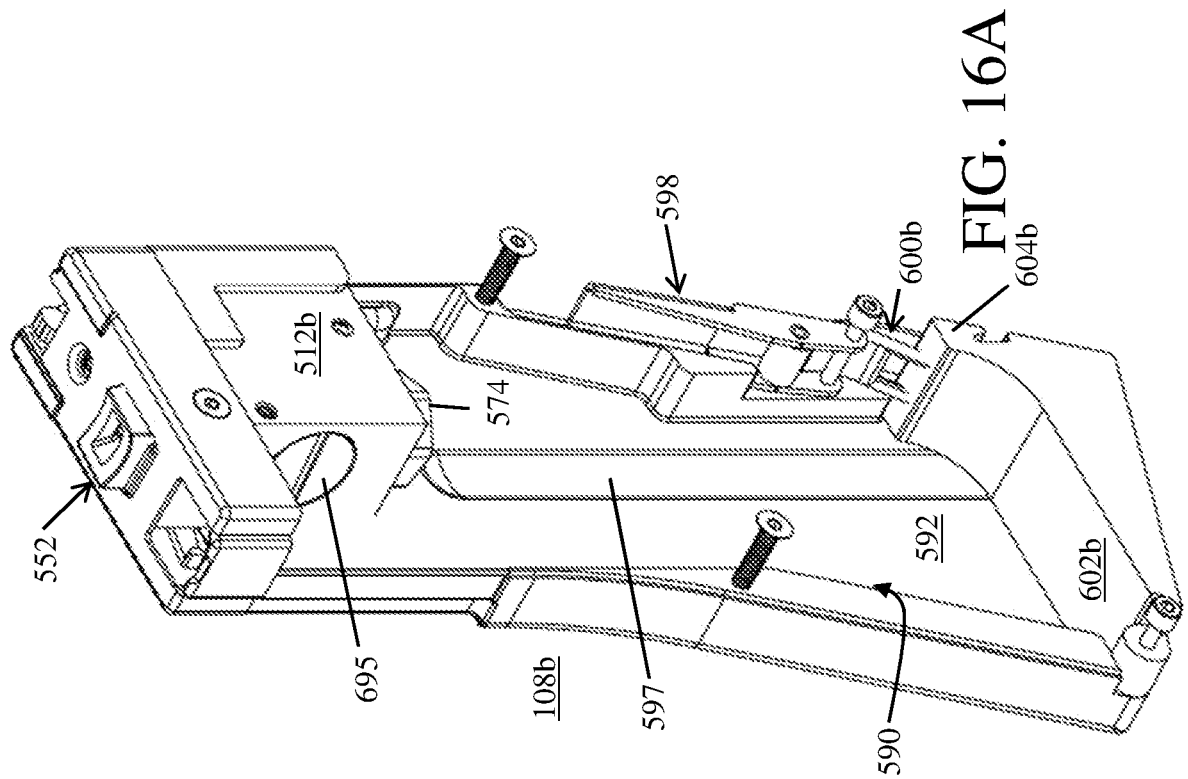
Figure 15D:
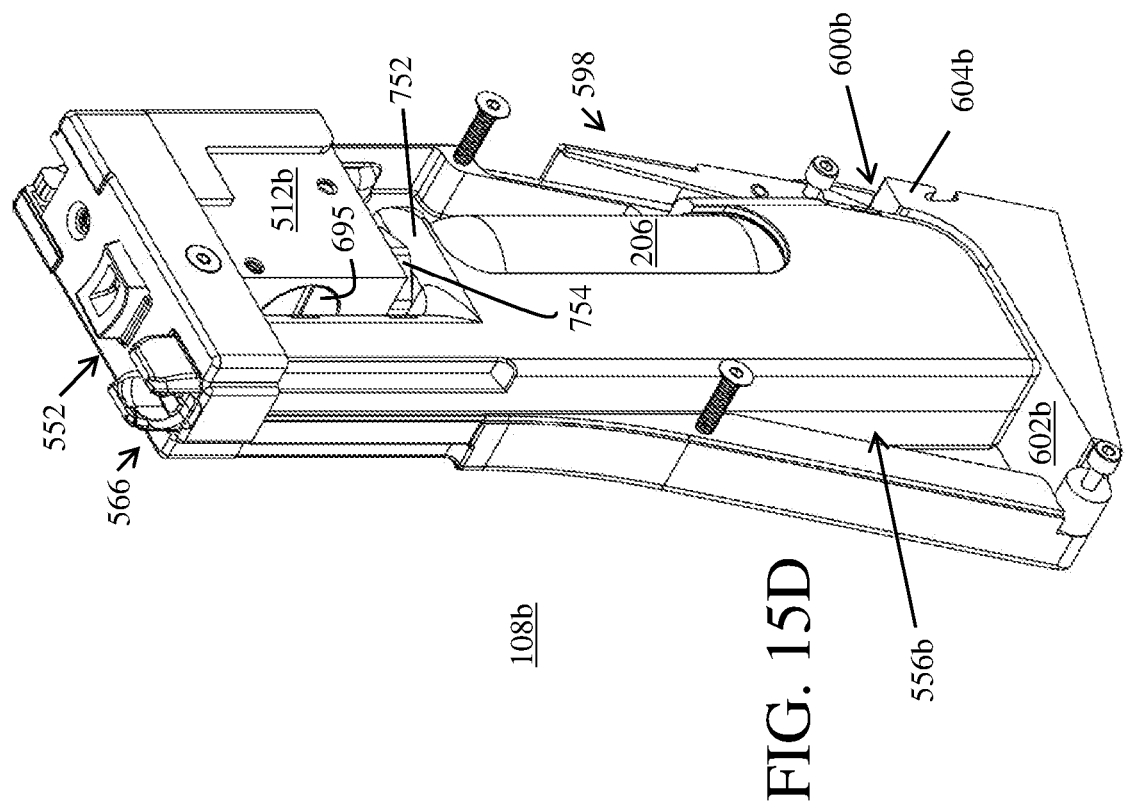
Figure 16B:
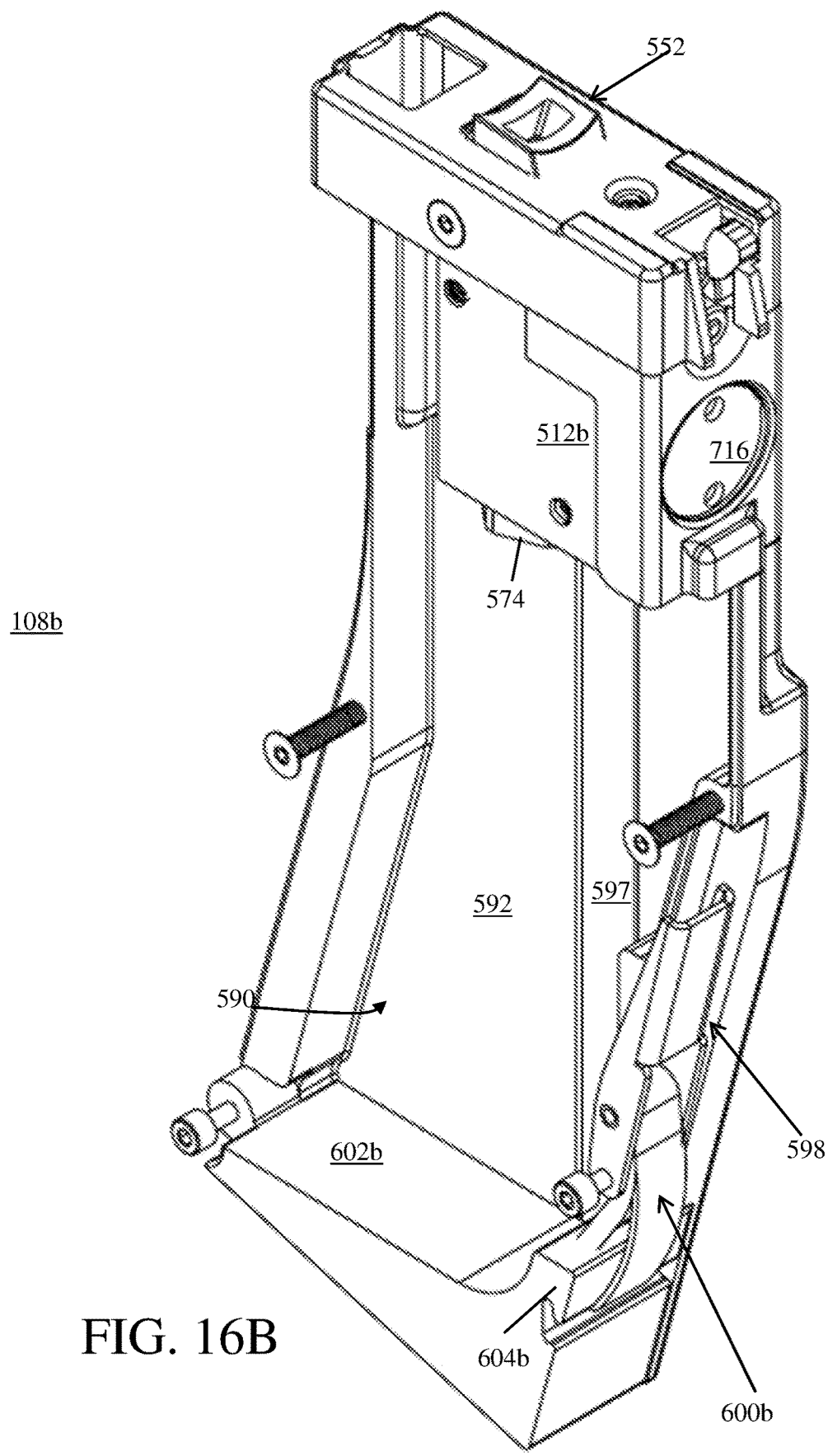
Figure 16G:
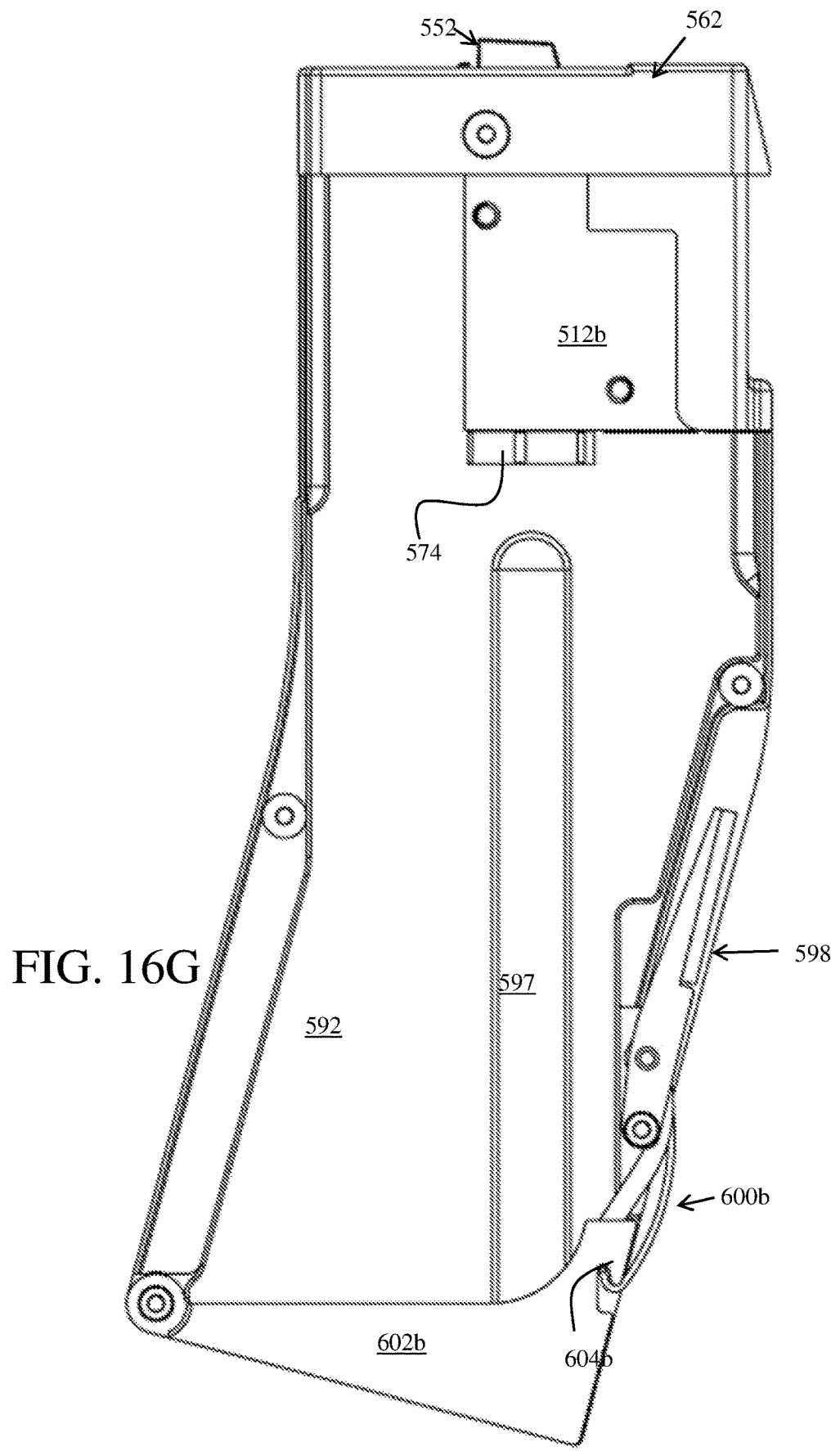

FIG. 13 is a non-limiting, exemplary illustration of a magazine. FIGS. 14A to 14D are non-limiting, exemplary illustrations of the magazine illustrated in FIG. 13, but with no pre-pack. FIGS. 15A to 15D are non-limiting, exemplary illustrations of the magazine illustrated in FIGS. 13 to 14D with a pre-pack, but with one wall removed. FIGS. 16A to 16G are non-limiting, exemplary illustrations of the magazine illustrated in FIGS. 13 to 15D without a pre-pack, but with wall removed.

Figure 17:
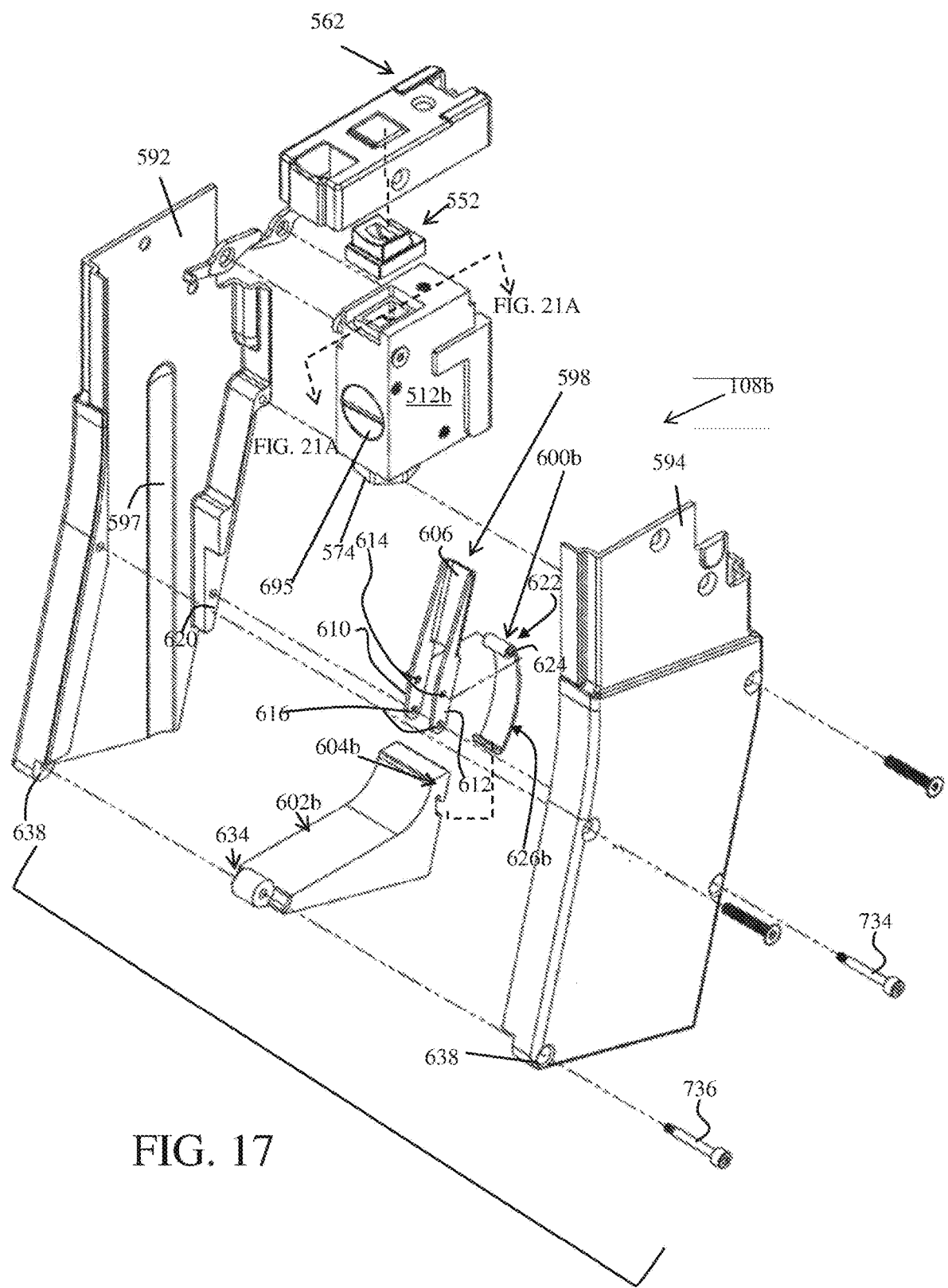
Figure 18E:
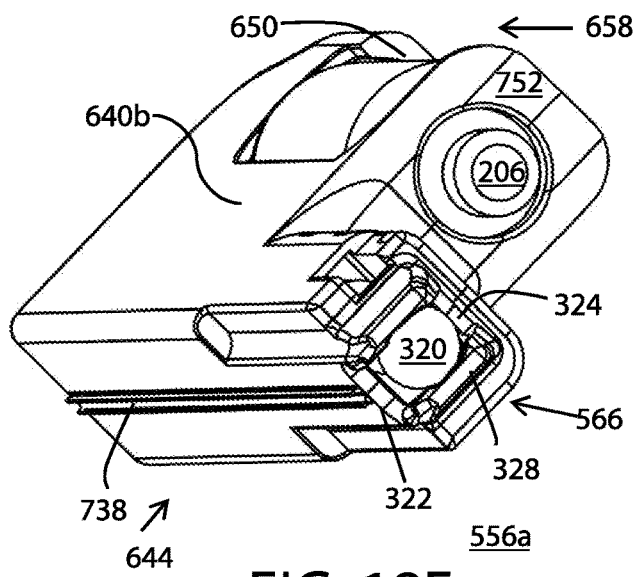
Figure 18G:
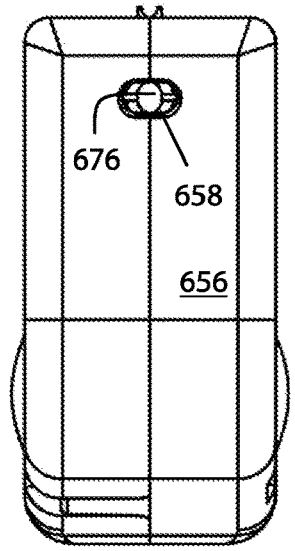
Figure 18F:
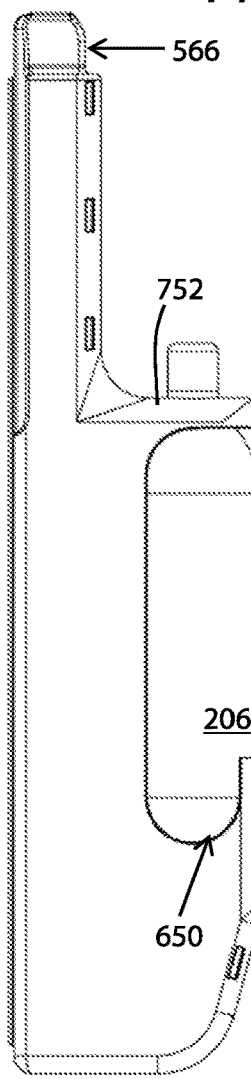
Figure 18H:
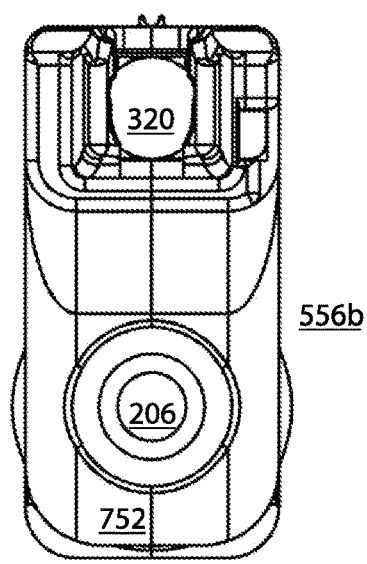

FIG. 17 is non-limiting, exemplary exploded view illustration of the magazine illustrated in FIGS. 13 to 16G, but without showing a pre-pack. The exploded view shown in FIG. 17 illustrates disassembled, separated components that show the cooperative working relationship, orientation, positioning, and exemplary manner of assembly of the various components of the magazine.

As illustrated in FIGS. 13 to 17, in this non-limiting, exemplary embodiment, magazine 108b also includes walls 592 and 594 but with no exterior bulge 596. Instead, walls 592 and 594 have exterior surfaces that are substantially flat while maintaining interior concaved portions ("channel") 597 for indexing or keying for proper guidance and insertion of pre-pack 556a. Accordingly, indexing is from outside and inside (convex 596 and concave 597) for magazine 108a, but is only from inside (concave 597) for magazine 108b. Therefore, removal of exterior bulge 596 has made magazine 108b more aesthetically realistic while still maintaining functionality of indexing or keying for proper insertion of pre-pack 556a.

As further illustrated (best shown in FIG. 17), in this non-limiting, exemplary embodiment of magazine 108b, latch member 600b, enclosure 602b, and keeper 604b have simpler designs. The enclosure 602b is a bit thicker, having a bottom outer surface that may include a "bumper" material for protection of magazine housing. The thickened closure 602b increases the overall weight balance of magazine 108b to more closely match the overall weight balance of conventional magazines of guns that are used with ammunition. Pivot pins 618 and 636 of magazine 108a have been replaced by shoulder screws 734 and 736 (where the unthreaded portions thereof function as "pivot pins"), which reduce the number of parts used while maintaining pivot functionality of the various components.

Figure 19:
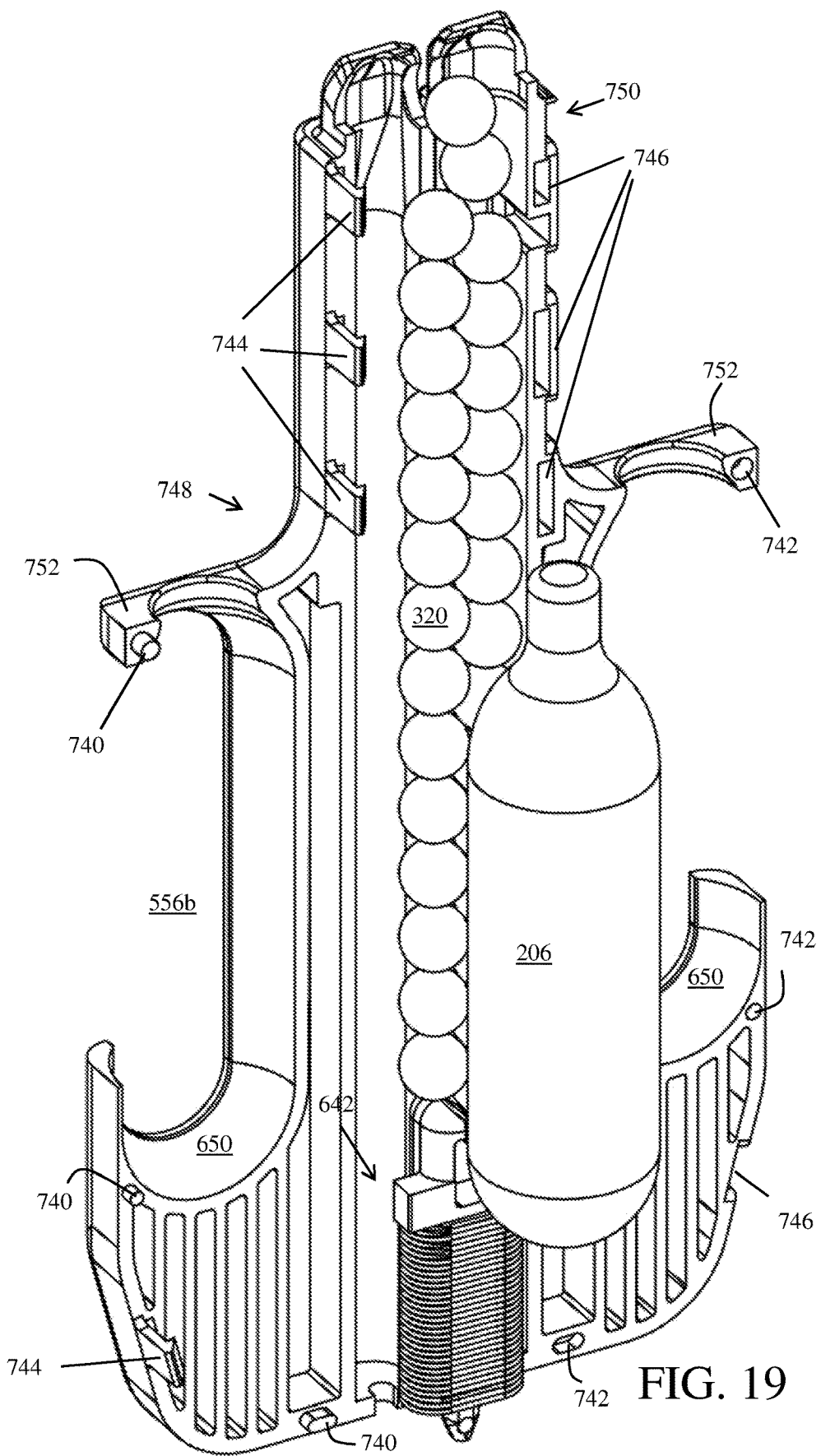
Figures 20A, 20B:
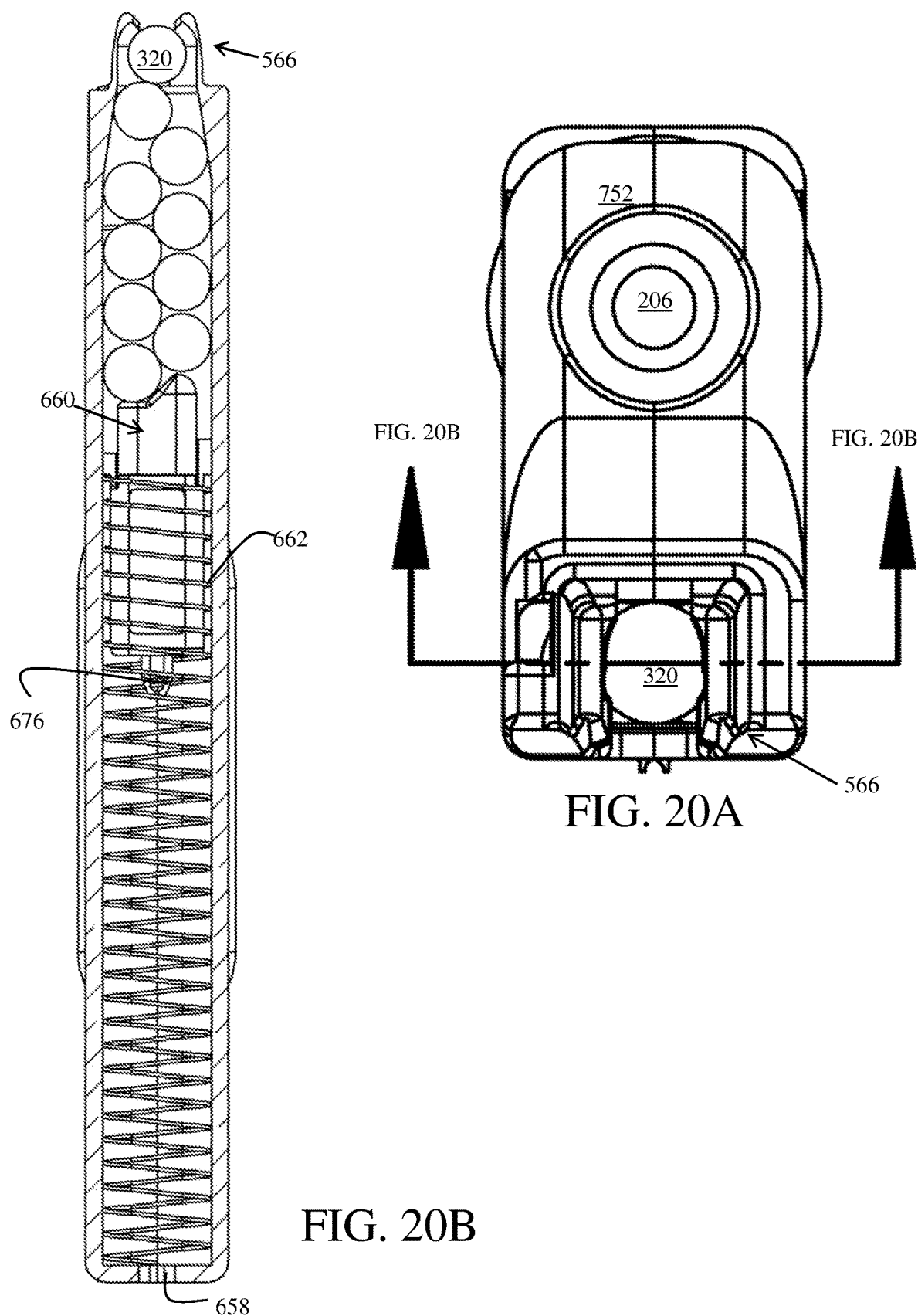

FIG. 18A to 18J are non-limiting, exemplary illustrations of a pre-pack illustrated in FIGS. 13 to 17. FIG. 19 is non-limiting, exemplary illustration of the pre-pack illustrated in FIGS. 13 to 18J, but with the pre-pack open by living-hinge, illustrating its interior. FIGS. 20A and 20B are non-limiting, exemplary illustrations of a pre-pack illustrated in FIGS. 13 to 19, with FIG. 20B illustrating a sectional view taken from FIG. 20A.

As illustrated in FIGS. 13 to 20B, in this non-limiting, exemplary embodiment, pre-pack 556b is comprised of casing 640b comprised of two identical pieces 748 and 750 (best shown in FIG. 19) that are connected together by a living-hinge 738. As with casing 640a, two pieces 748 and 750 of casing 640b may also be connected in several different manners, non-limiting examples of which may include mechanical clips, sonic weld, solvent bonds, or other means of securing assembly. Casing 640b includes a first set of complementary interlocking features such as a set of projections 740 and recesses or opening 742 and a second set of complementary interlocking features such clips 744 and retainer openings 746 that enable first piece 748 to fold onto second piece 750 (similar to closing a book), with first and second pieces 748 and 750 snapping together to form pre-pack 556b.

As further illustrated in FIGS. 13 to 20B, in this non-limiting, exemplary embodiment, pre-pack 556b also includes a collar 752 for securing canister 206 onto cradle portion 650 of casing 640b. The use of collar 752 to hold canister 206 eliminates the need for use of adhesive to fix canister 206 to cradle portion 650 of casing 640b of pre-pack 556b, eliminating a manufacturing step. It should be noted that collar 752 maintains canister 206 in place within casing 640b, which necessitates damaging the injection molded parts in order to remove the canister 206, thus preventing re-use of pre-pack 556b, which is preferred.

FIGS. 21A to 21D are non-limiting, exemplary illustration of an embodiment of a gas regulator system in accordance with another embodiment. Gas regulator system 512b illustrated in FIGS. 13 to 21D includes similar corresponding or equivalent components, interconnections, functional, operational, and or cooperative relationships as the gas regulator system 512a that is shown in FIGS. 1A to 12M, and described above. Therefore, for the sake of brevity, clarity, convenience, and to avoid duplication, the general description of FIGS. 13 to 21D will not repeat every corresponding or equivalent component, interconnections, functional, operational, and or cooperative relationships that has already been described above in relation to gas regulator system 512a that is shown in FIGS. 1A to 12M but instead, are incorporated by reference herein.

Figure 21A:
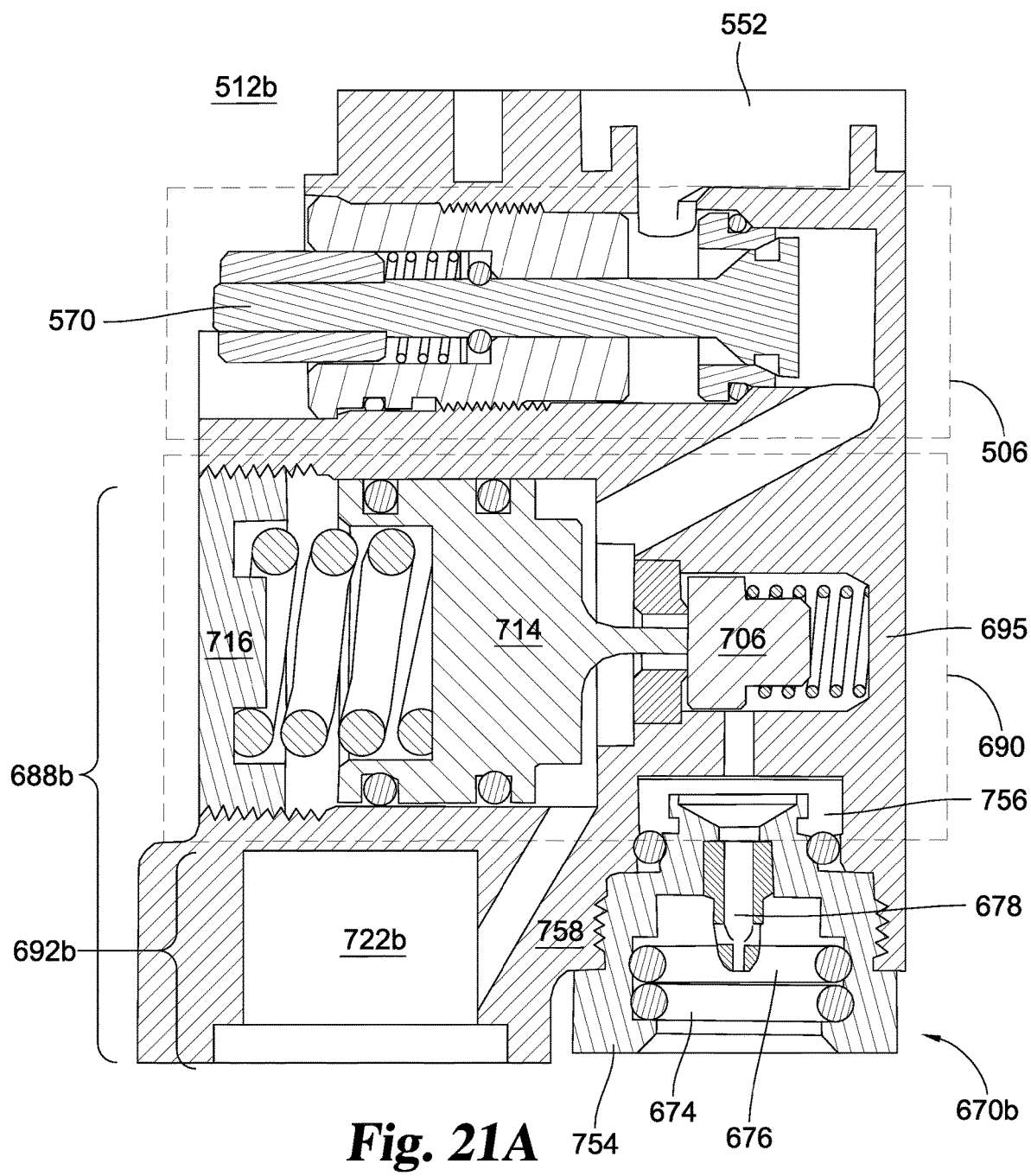
Figure 21B:
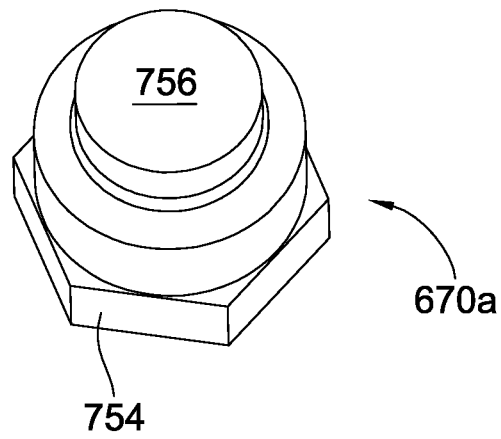
Figure 21C:
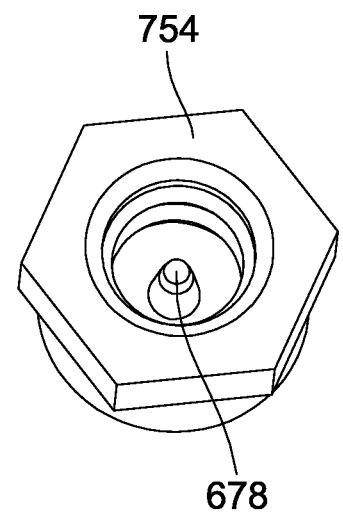
Figure 21D:
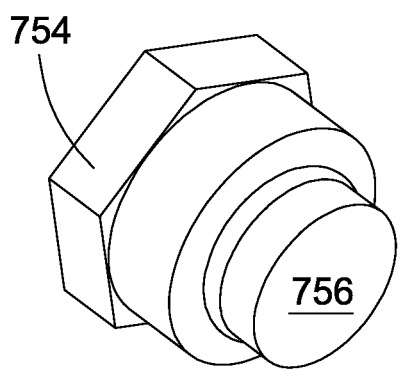
Figure 22C:
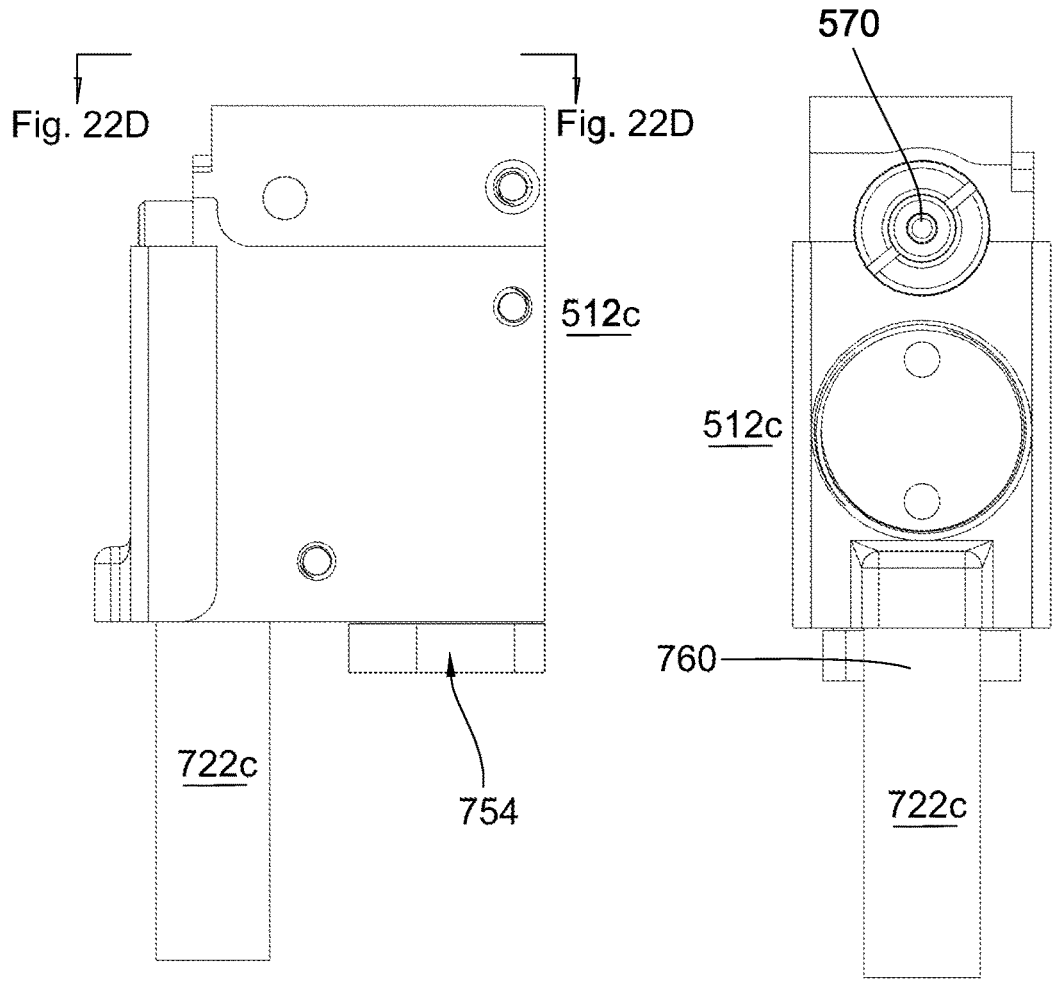
FIGS. 22A to 23B are non-limiting, exemplary illustrations of additional embodiments of a gas regulator system and their respective components.
Figure 22C:
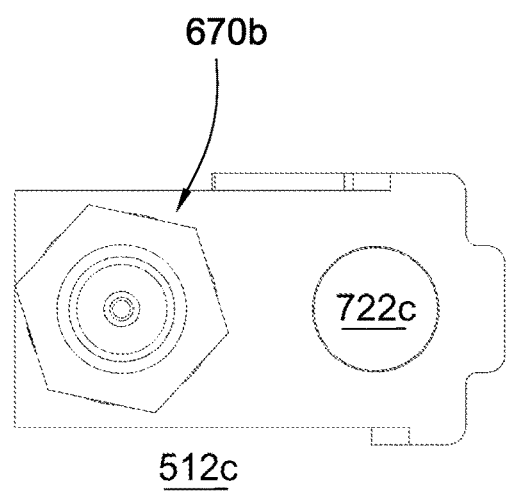
Figure 22D:
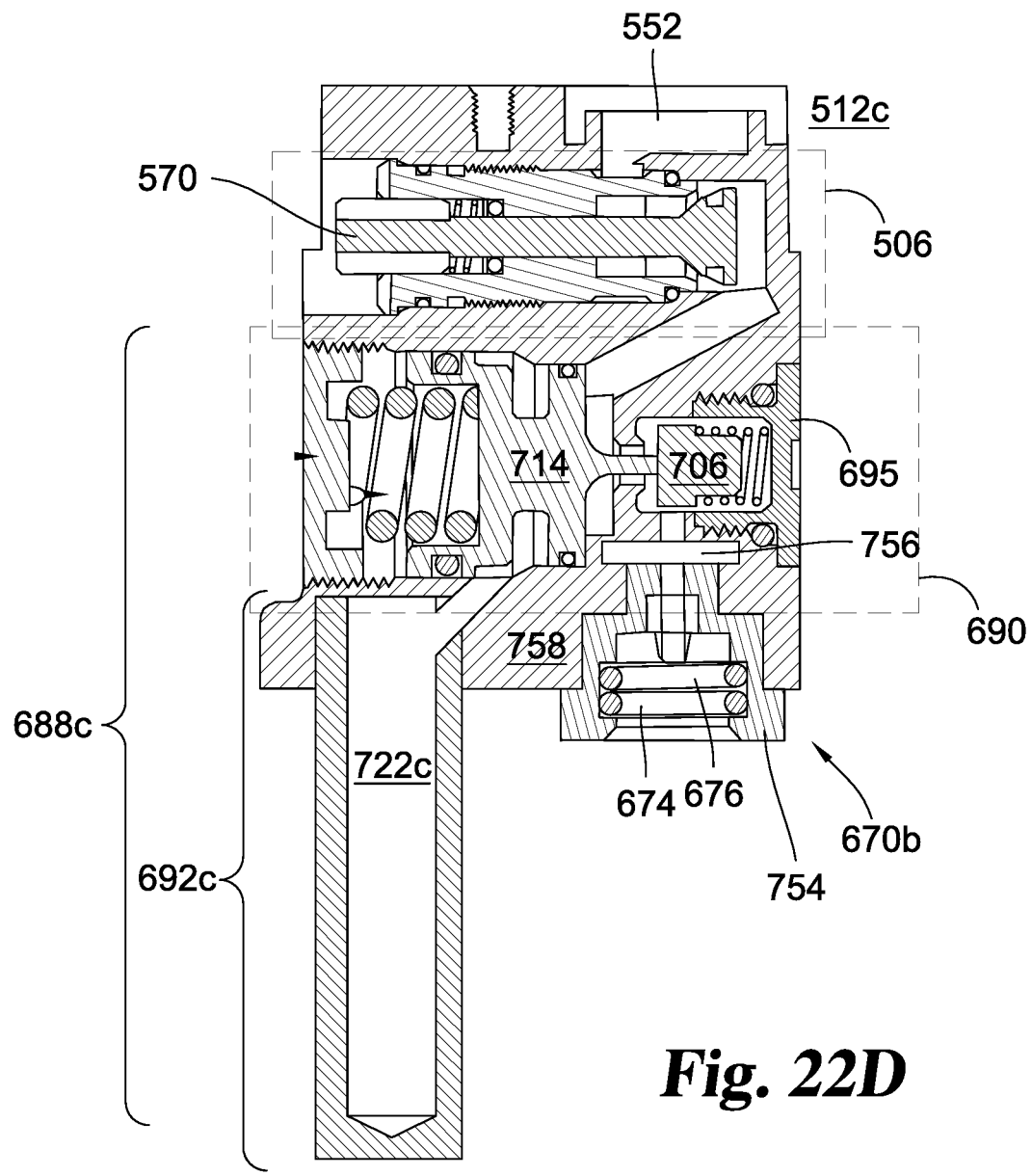

As illustrated in FIGS. 13 to 21D, gas regulator system 512b has a smaller form-factor with a piercing portal 670b that may be unfastened and removed for cleaning of debris. Accordingly, piercing portal 670b is fixed onto a hex-fastener 754 where the entire portal 670b may be removed for cleaning and or replacement (if need be). As best illustrated in FIGS. 21B to 21D, in this non-limiting, exemplary instance, piecing portal 670b includes piercing probe 678 as well as a mesh 756 (for protection against debris) assembled onto an inner diameter threaded hex fastener 754.

Further, gas regulator system 512b includes pressure regulator 688b comprised of a pressure limiter 692b with a reduced size pressure chamber 722b without a relief valve that is machined directly into a body 758 of gas regulator system 512b. Accordingly, in this non-limiting, exemplary instance, relief valve of the pressure chamber has been eliminated.

FIGS. 22A to 22D are non-limiting, exemplary illustration of another embodiment of a gas regulator system. Gas regulator system 512c illustrated in FIGS. 22A to 22D includes similar corresponding or equivalent components, interconnections, functional, operational, and or cooperative relationships as gas regulator system 512a and 512b that is shown in FIGS. 1A to 21D, and described above. Therefore, for the sake of brevity, clarity, convenience, and to avoid duplication, the general description of FIGS. 22A to 22D will not repeat every corresponding or equivalent component, interconnections, functional, operational, and or cooperative relationships that has already been described above in relation to gas regulator system 512a and 512b that are shown in FIGS. 1A to 21D but instead, are incorporated by reference herein.

As illustrated, in this non-limiting, exemplary embodiment, gas regulator system 512c includes pressure regulator 688c comprised of a pressure limiter 692c having an elongated pressure chamber 722c that may be threaded 760 (FIGS. 22A to 22C) or machined (FIG. 22D) into body 758 of gas regulator system 512c. Further, as with gas regulator system 512b, relief valve of pressure chamber 722c has been eliminated.

Figure 23A:
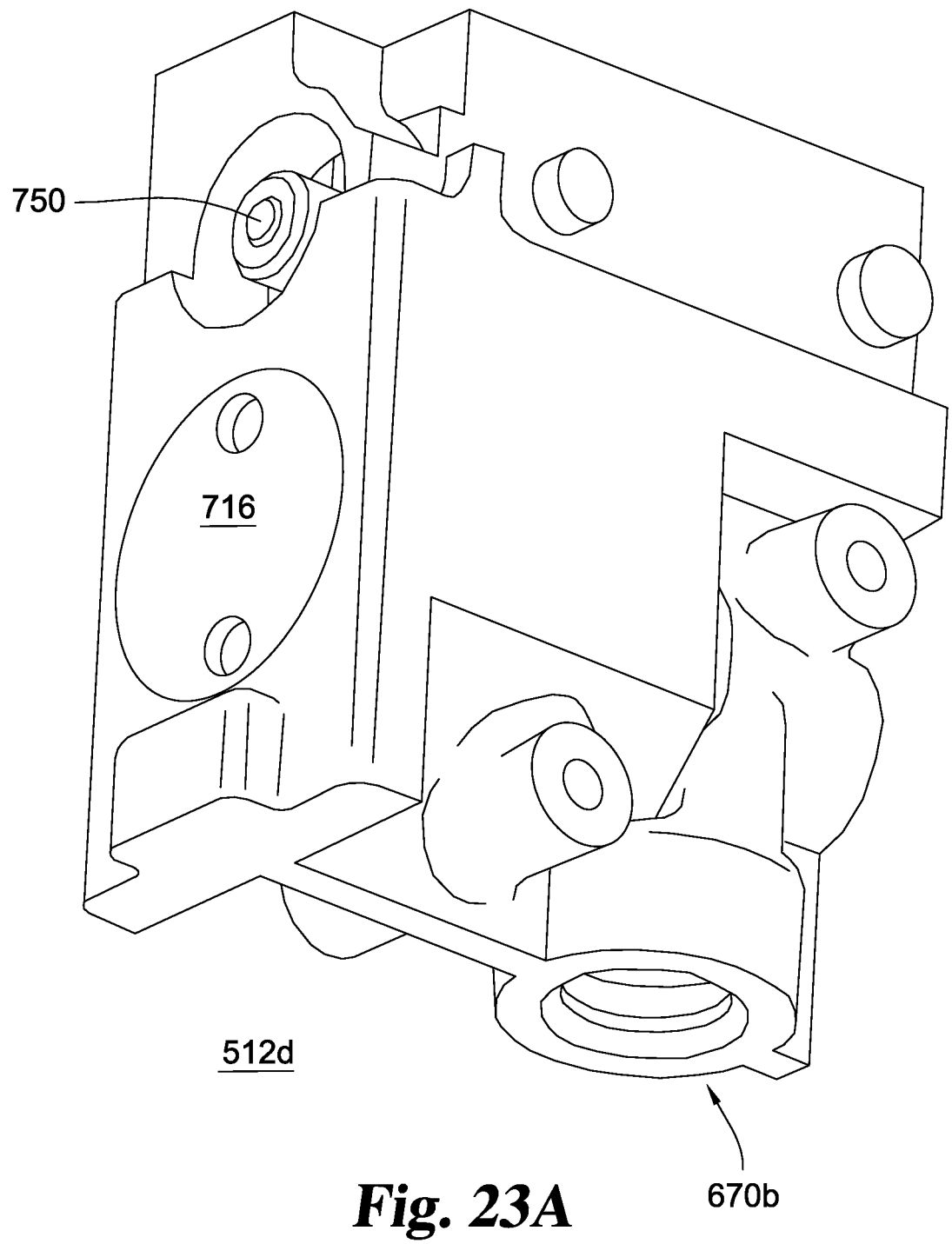
Figure 23B:
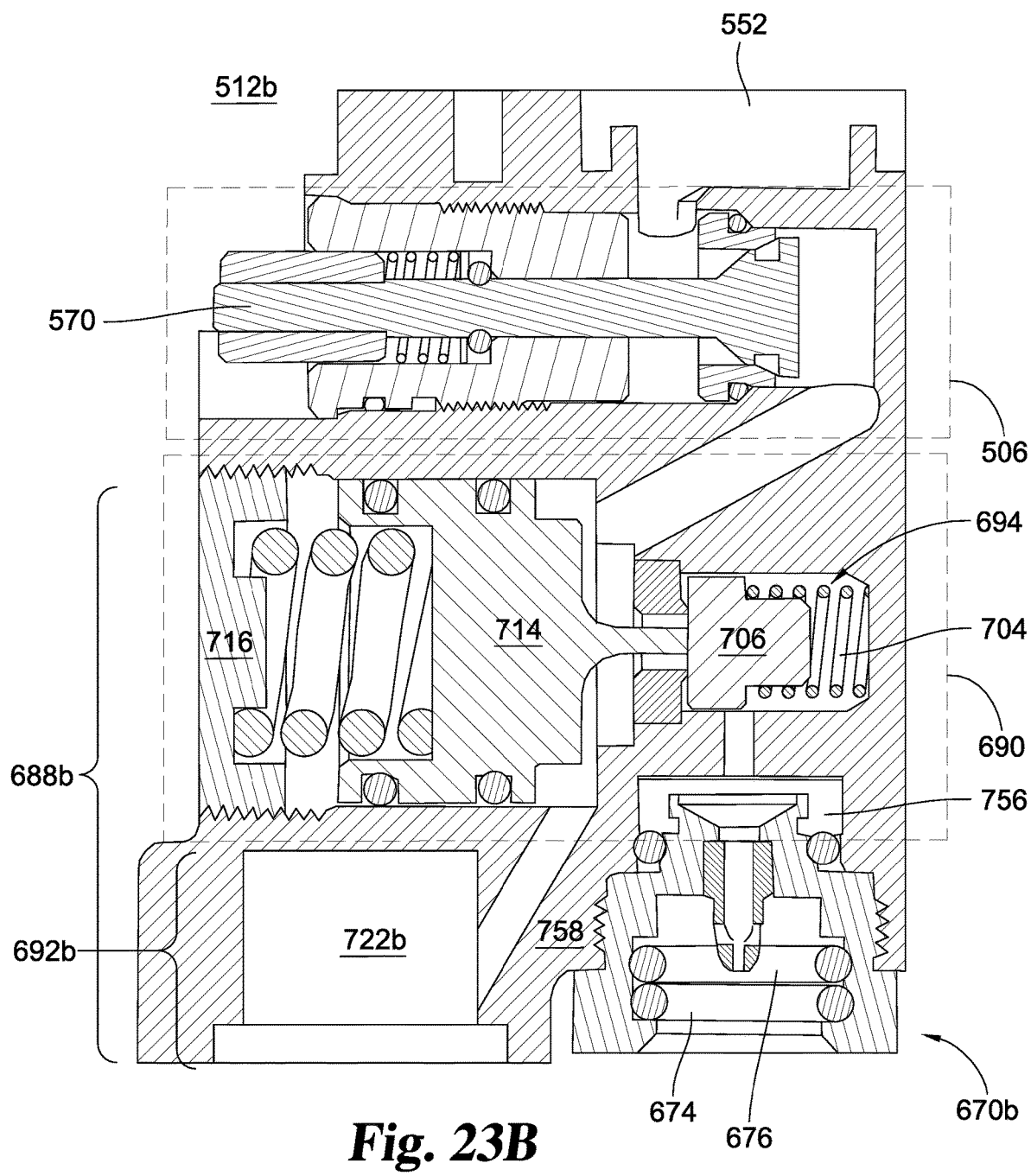

FIGS. 23A and 23B are non-limiting, exemplary illustration of a gas regulator system. Gas regulator system 512d illustrated in FIGS. 23A and 23B includes similar corresponding or equivalent components, interconnections, functional, operational, and or cooperative relationships as gas regulator system 512a, 512b, and 512c that are shown in FIGS. 1A to 22D, and described above. Therefore, for the sake of brevity, clarity, convenience, and to avoid duplication, the general description of FIGS. 23A and 23B will not repeat every corresponding or equivalent component, interconnections, functional, operational, and or cooperative relationships that has already been described above in relation to gas regulator system 512a, 512b, 512c that are shown in FIGS. 1A to 22D but instead, are incorporated by reference herein.

As illustrated, gas regulator system 512d is very similar to that of gas regulator 512b with the exception that body 758 of gas regulator system 512d is cast and then machined to include all cavities required to accommodate various components. In addition, fastener 695 would no longer be needed since body 758 is machined to include a blind-hole cavity as inlet chamber 694. It should be noted that in this non-limiting, exemplary embodiment, piercing portal 670d may also be an integral part of body 758 rather than assembled onto a hex fastener and be removable.

FIGS. 24A to 26E-2 are non-limiting, exemplary illustrations of a magazine. Magazine 108c illustrated in FIGS. 24A to 26E-2 includes similar corresponding or equivalent components, interconnections, functional, operational, and or cooperative relationships as the magazine 108a that is shown in FIGS. 1A to 23B, and described above. Therefore, for the sake of brevity, clarity, convenience, and to avoid duplication, the general description of FIGS. 24A to 26E-2 will not repeat every corresponding or equivalent component, interconnections, functional, operational, and or cooperative relationships that has already been described above in relation to magazines 108a and 108b that are shown in FIGS. 1A to 23B but instead, are incorporated by reference herein.

In this non-limiting, exemplary instance, non-lethal gas-operated gun 100 also includes a magazine 108c that holds and supplies non-lethal projectiles 320 fed to chamber of non-lethal gas-operated gun 100. Magazine 108c includes an automatic projectile feeder mechanism, supplying rounds to non-lethal gas-operated gun 100 through the action of reciprocal bolt carrier group 504.

Figure 24A:
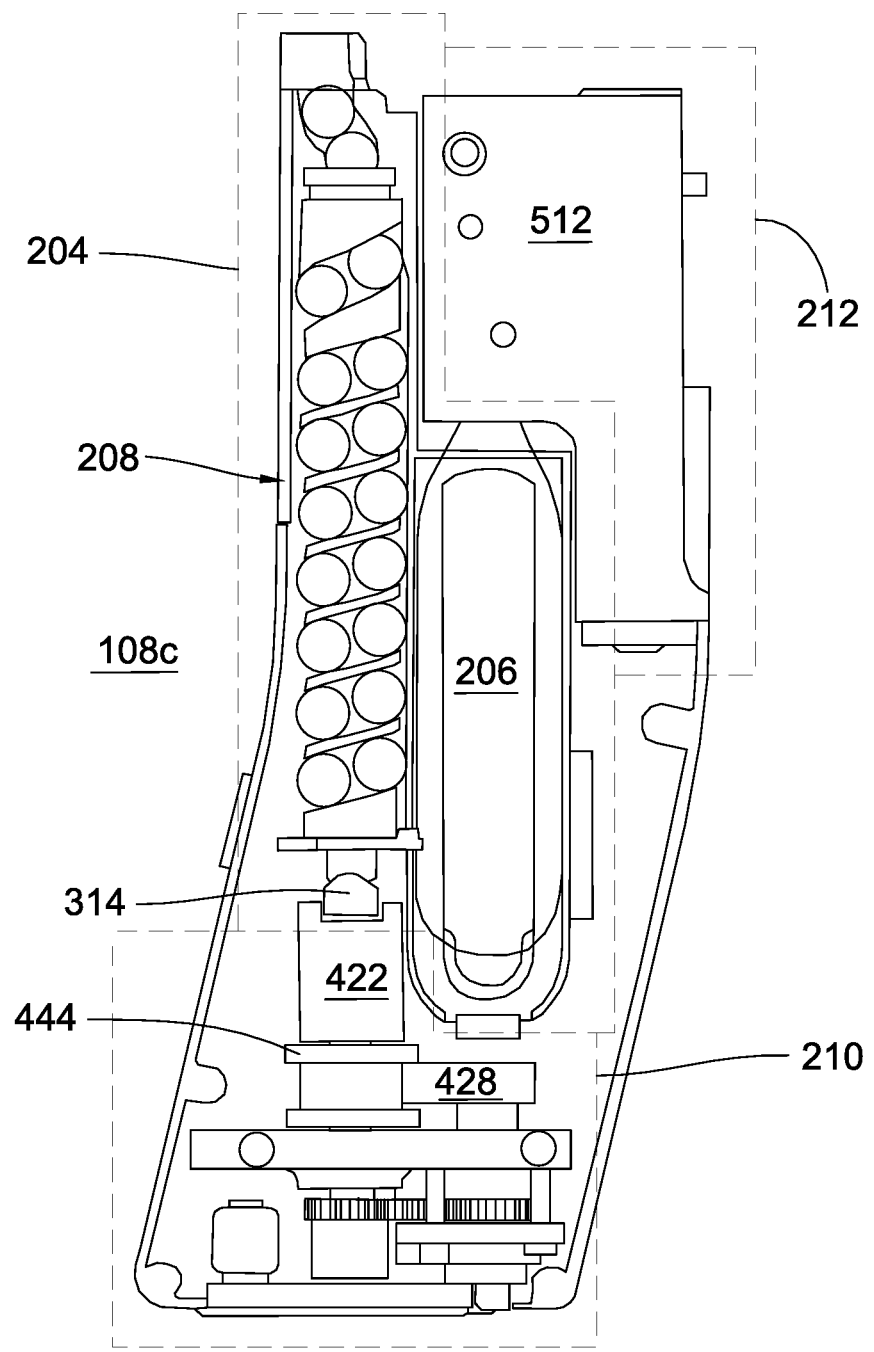

As best illustrated in FIGS. 24A to 24C, automatic projectile feeder mechanism includes a replaceable cartridge (or pre-pack bounded by dashed line 204) that is comprised of a gas canister 206 and a projectile actuator module 208. Further included is a drive mechanism (bounded by dashed line 210) that delivers rotational motion to the projectile actuator module 208, as well as a linear translation to the gas canister 206, mating canister 206 with a gas regulator system 512 (bounded by dashed line 212).

Figures 1, 2, 2A:
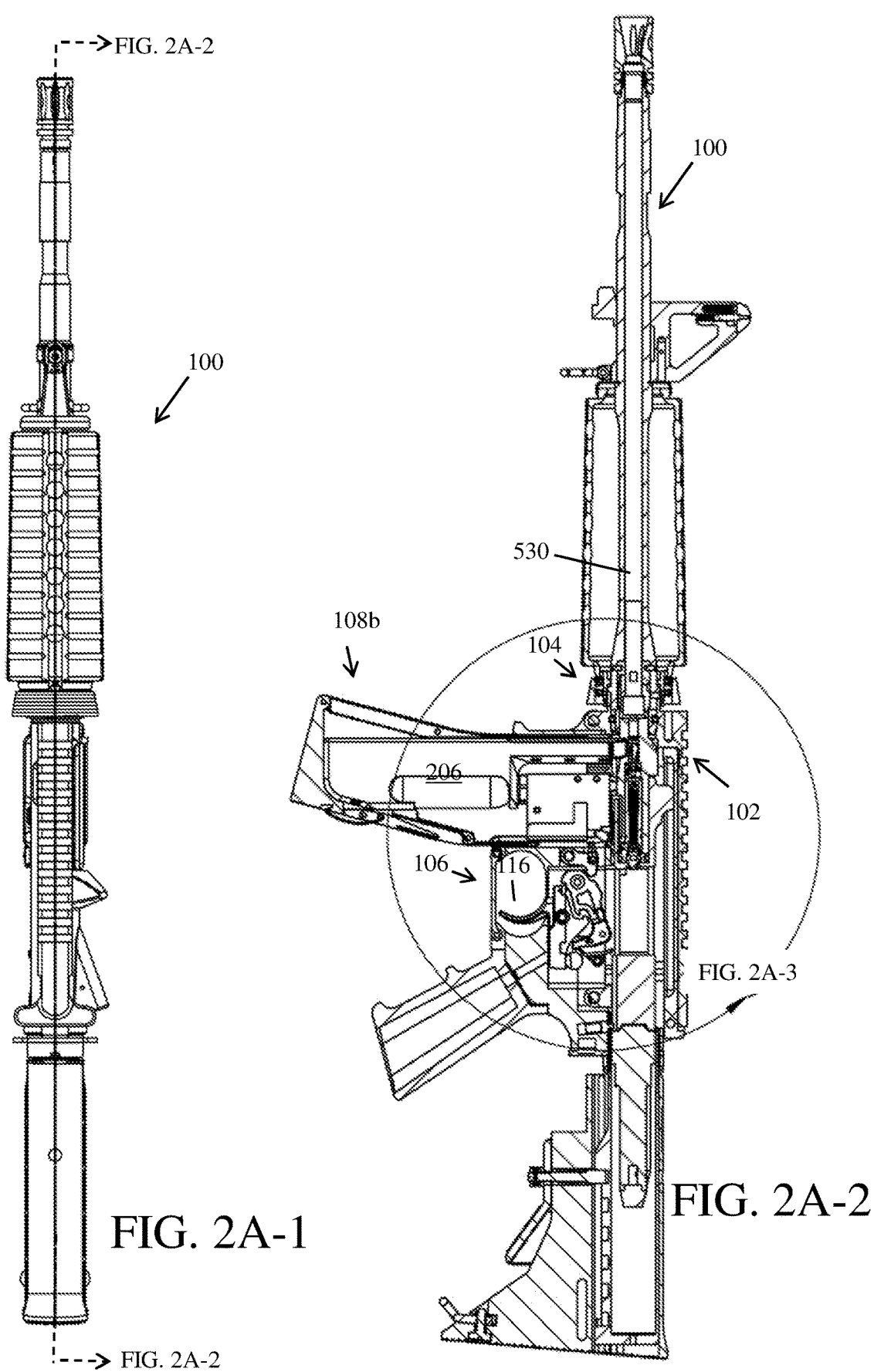
Figures 2, 2A, 3:
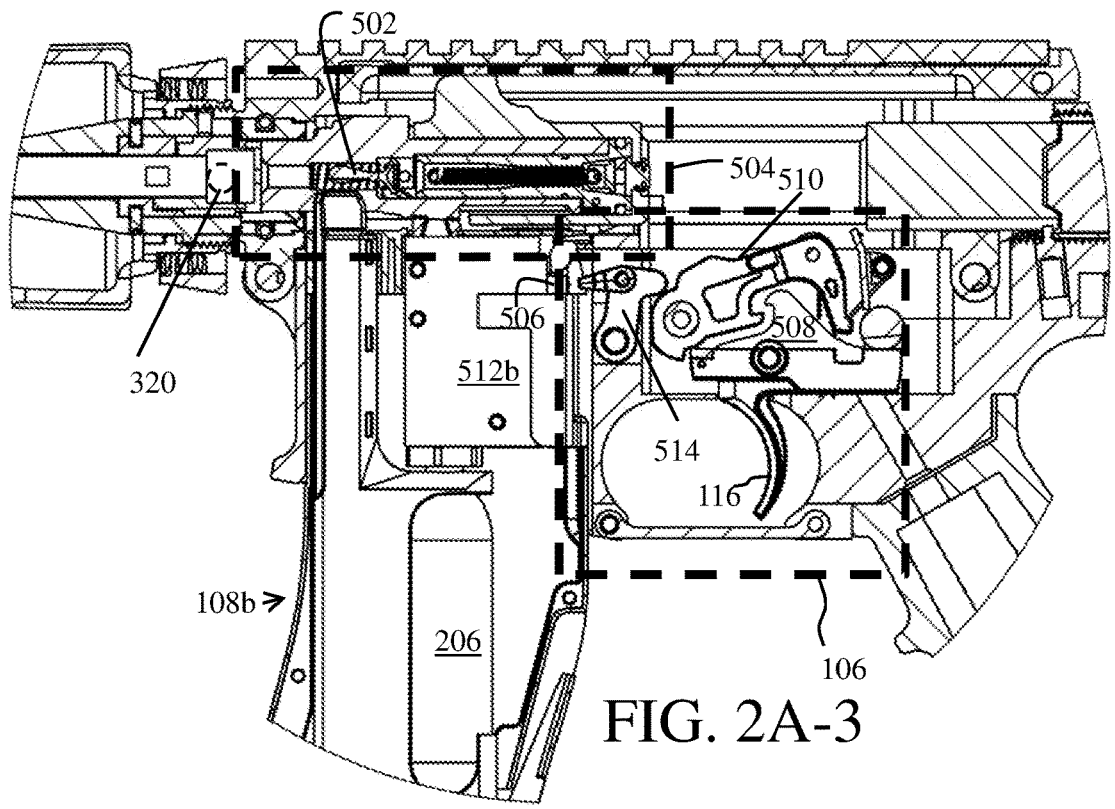
Figures 2, 2A, 3, 4:
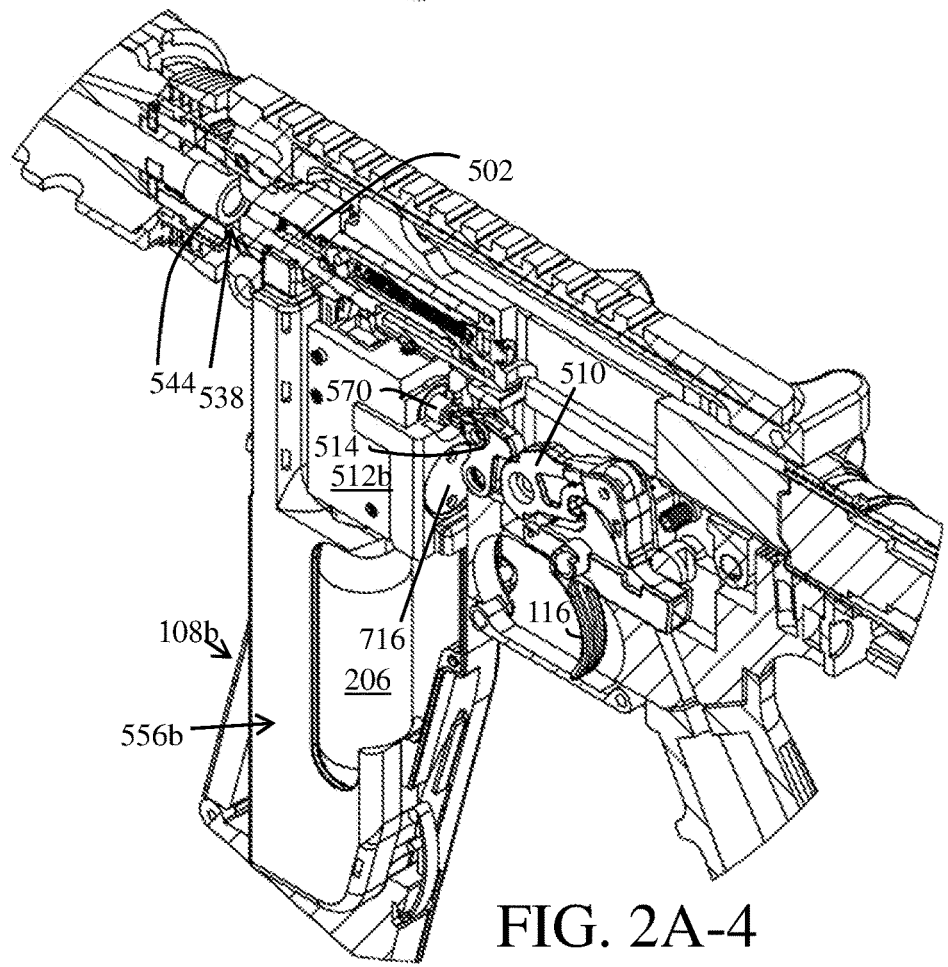
FIGS. 4A to 12M are non-limiting, exemplary illustrations of a magazine and its components.
Figures 1, 2, 2B:
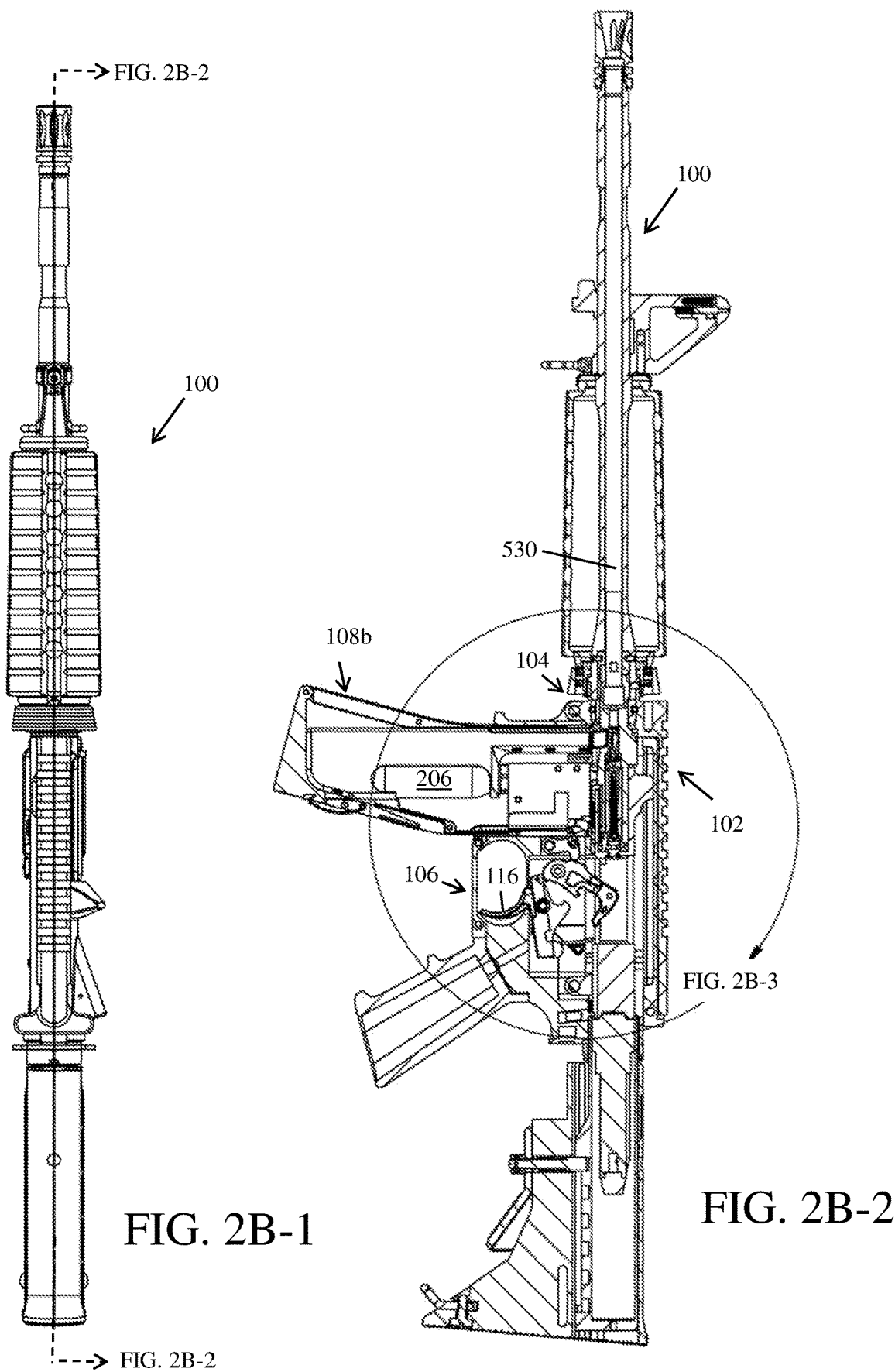
Figures 2, 2B, 3:
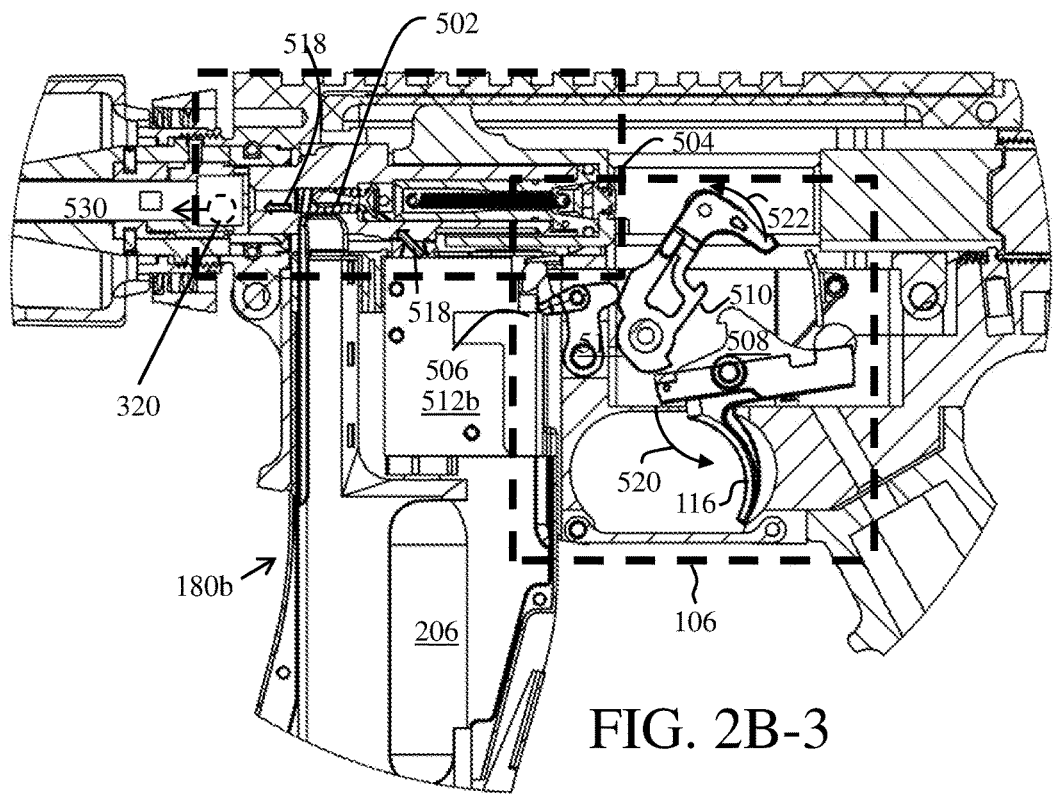
Figures 2, 2B, 3, 4:
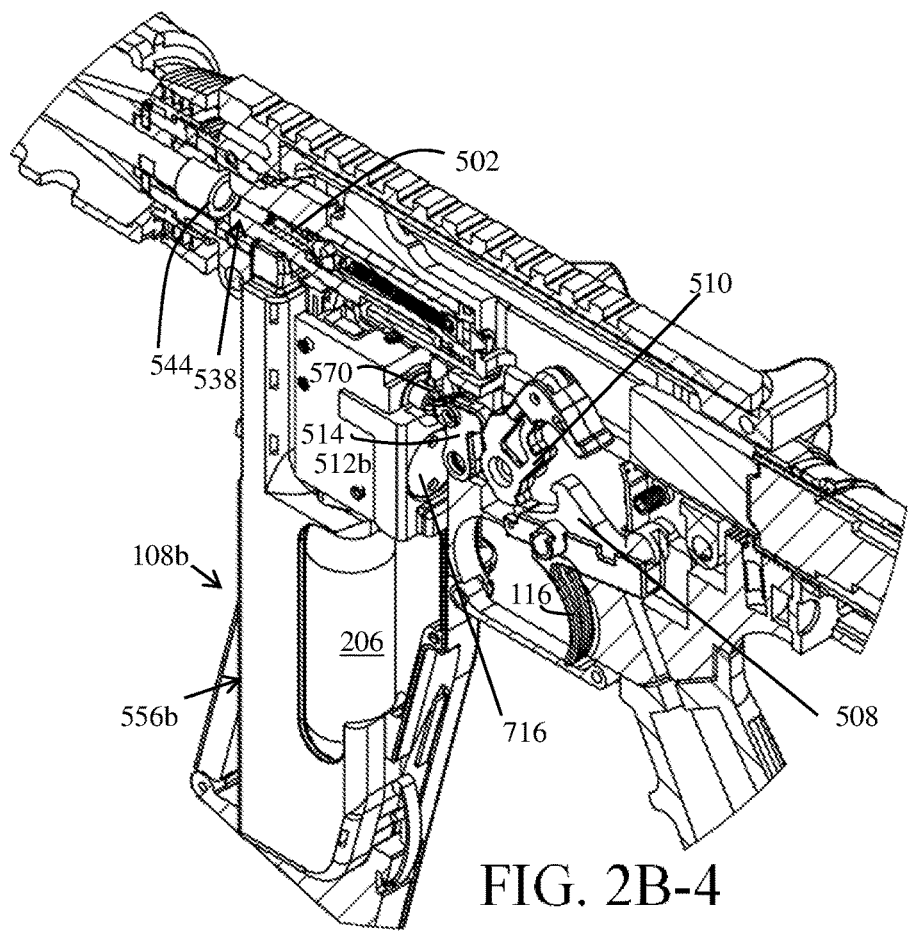
Figures 1, 2, 2C:
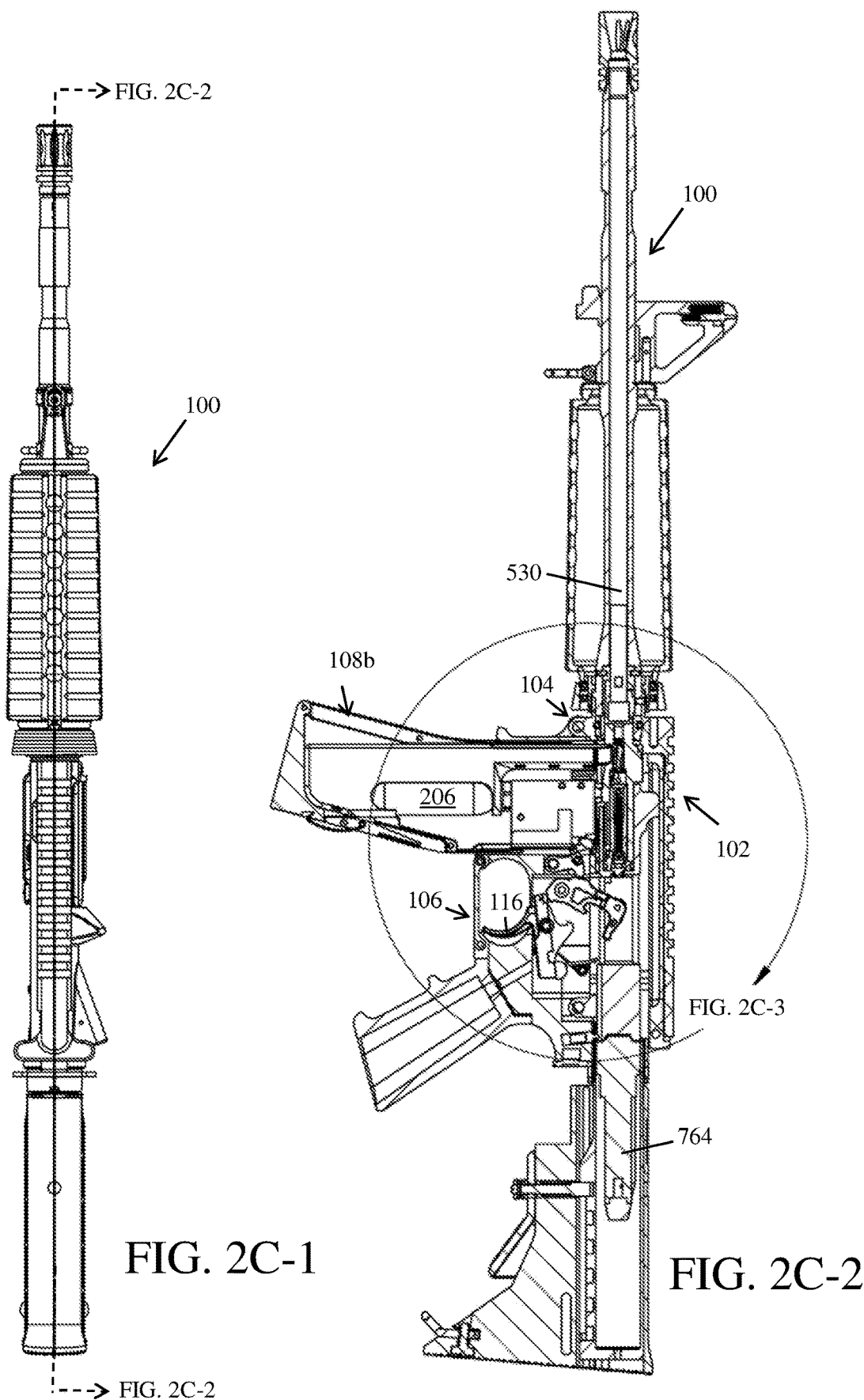
Figures 1, 2, 2D:
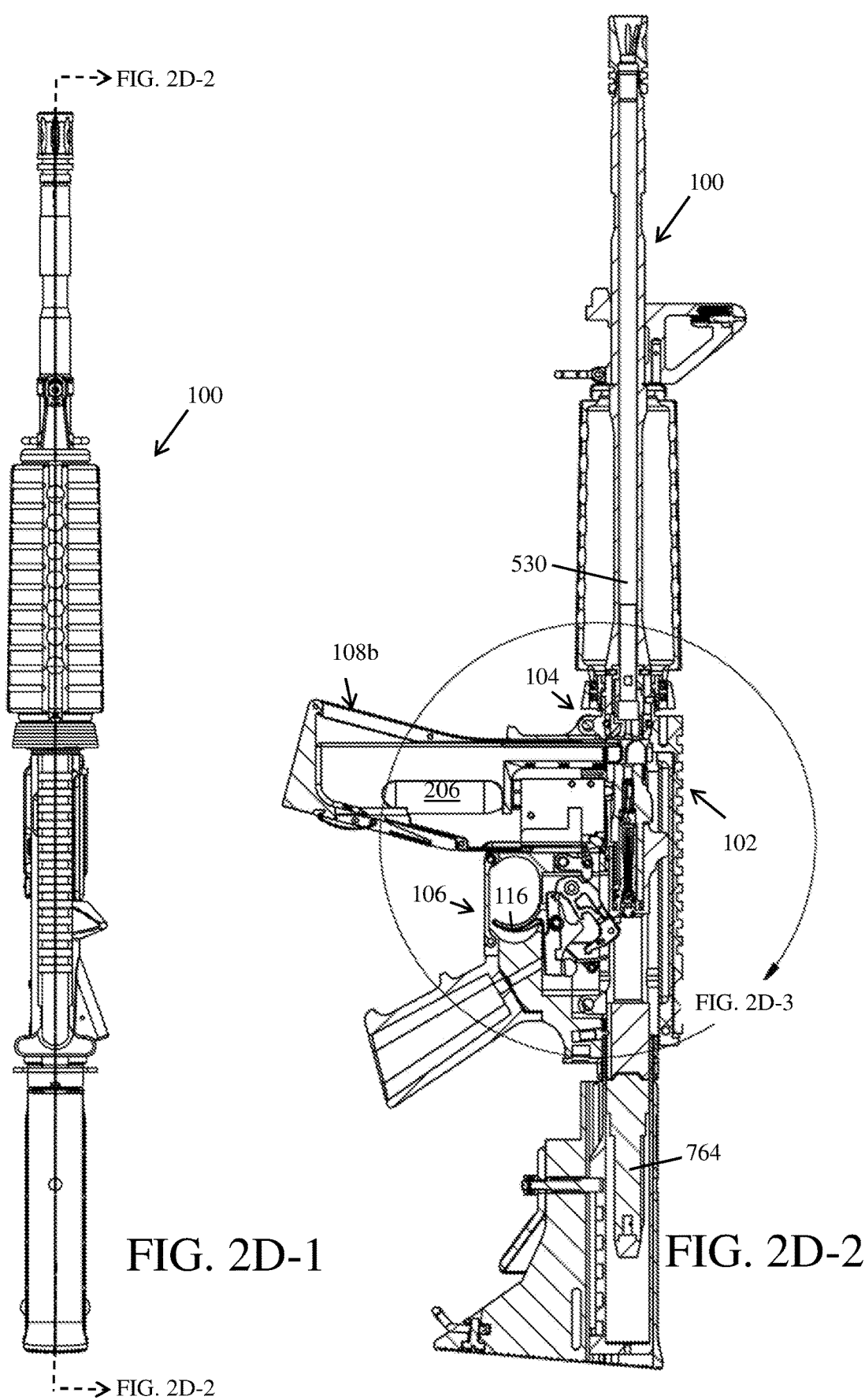
Figures 2, 2D, 3:
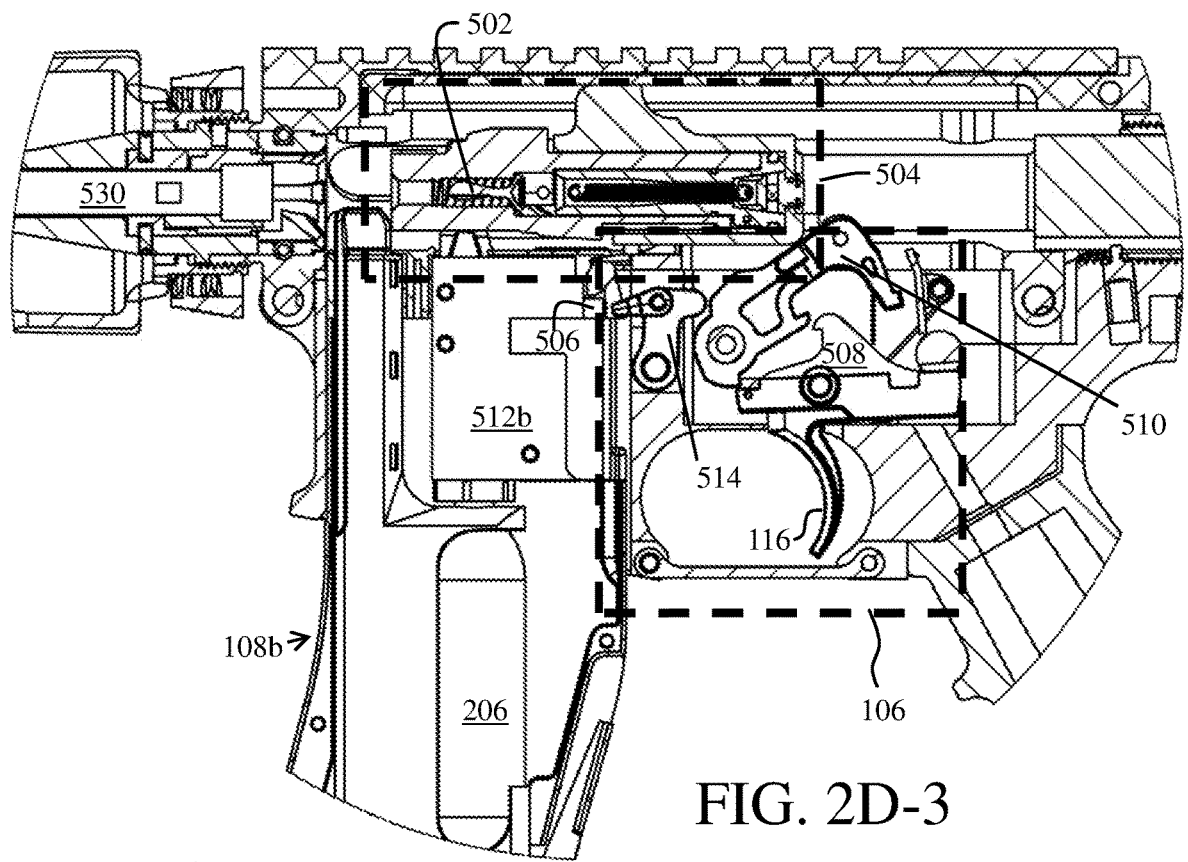
Figures 2, 2D, 3, 4:
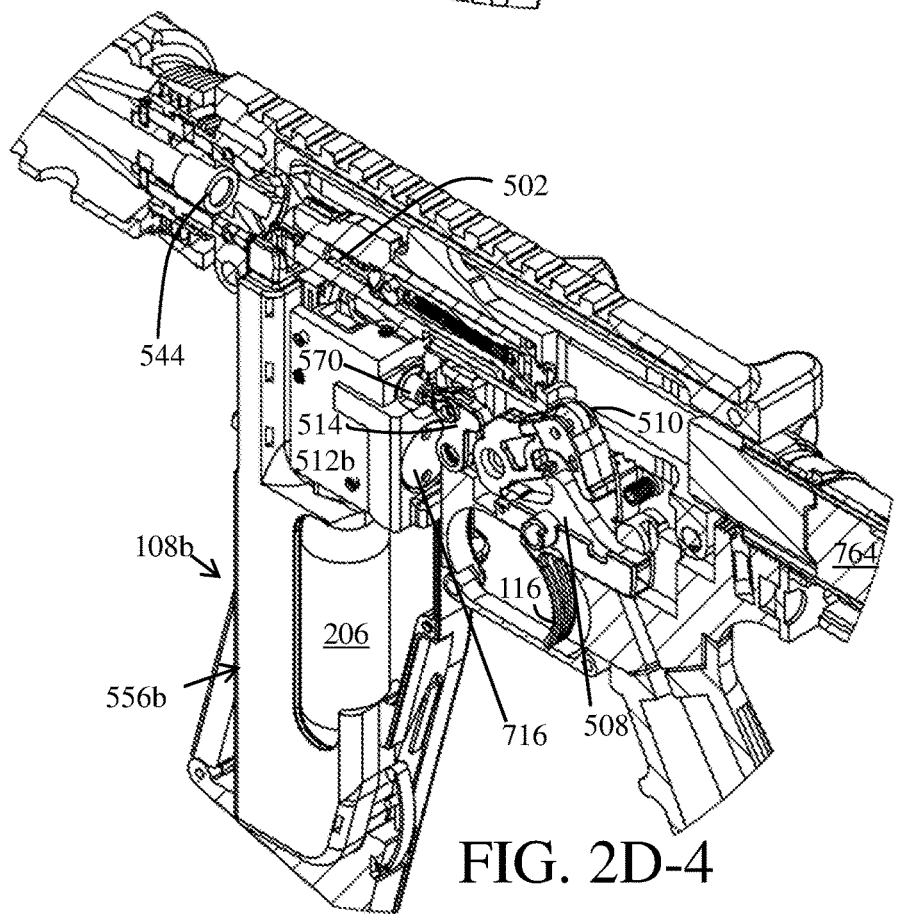
Figures 1, 2, 2E:
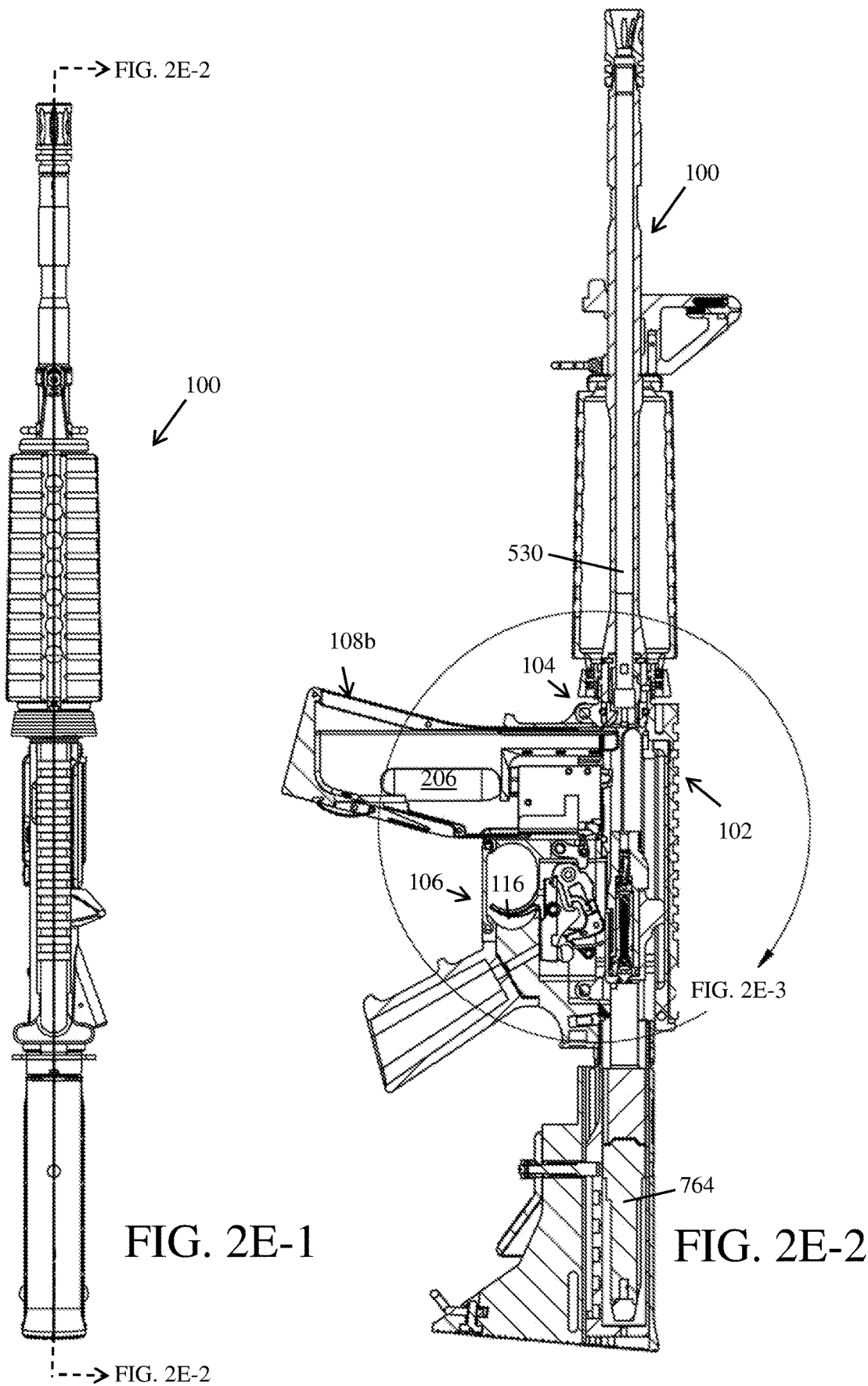
Figures 2, 2E, 3:
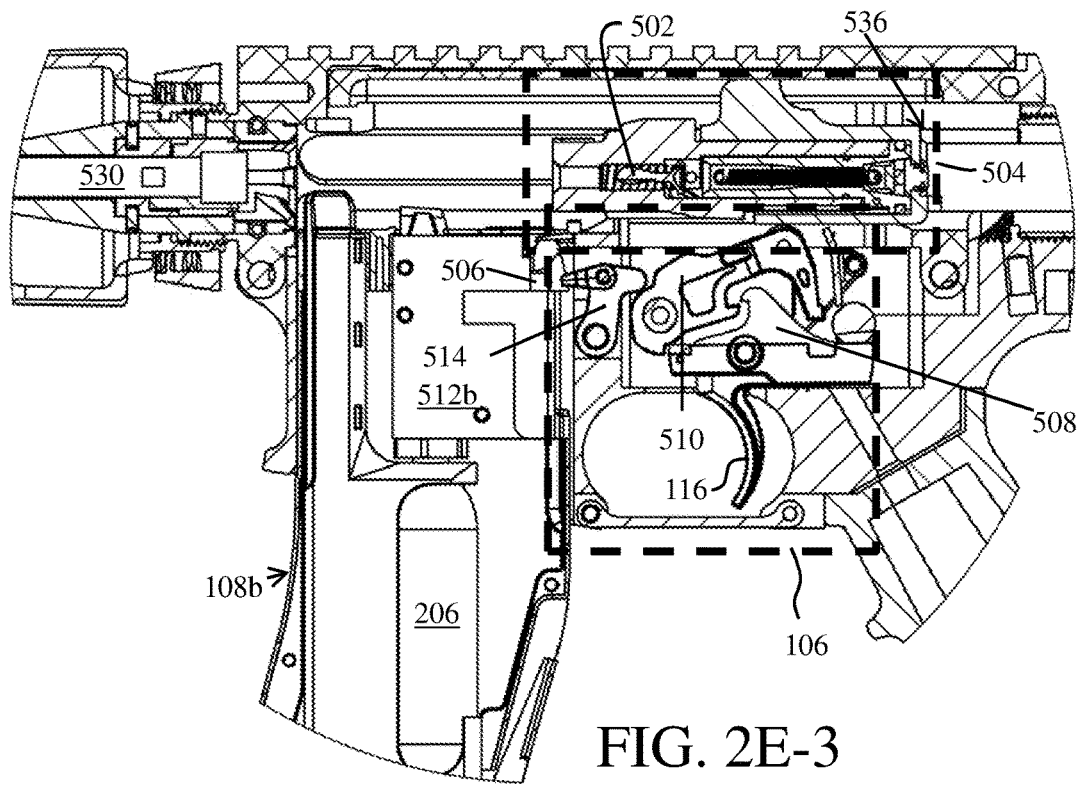
Figures 2, 2E, 3, 4:
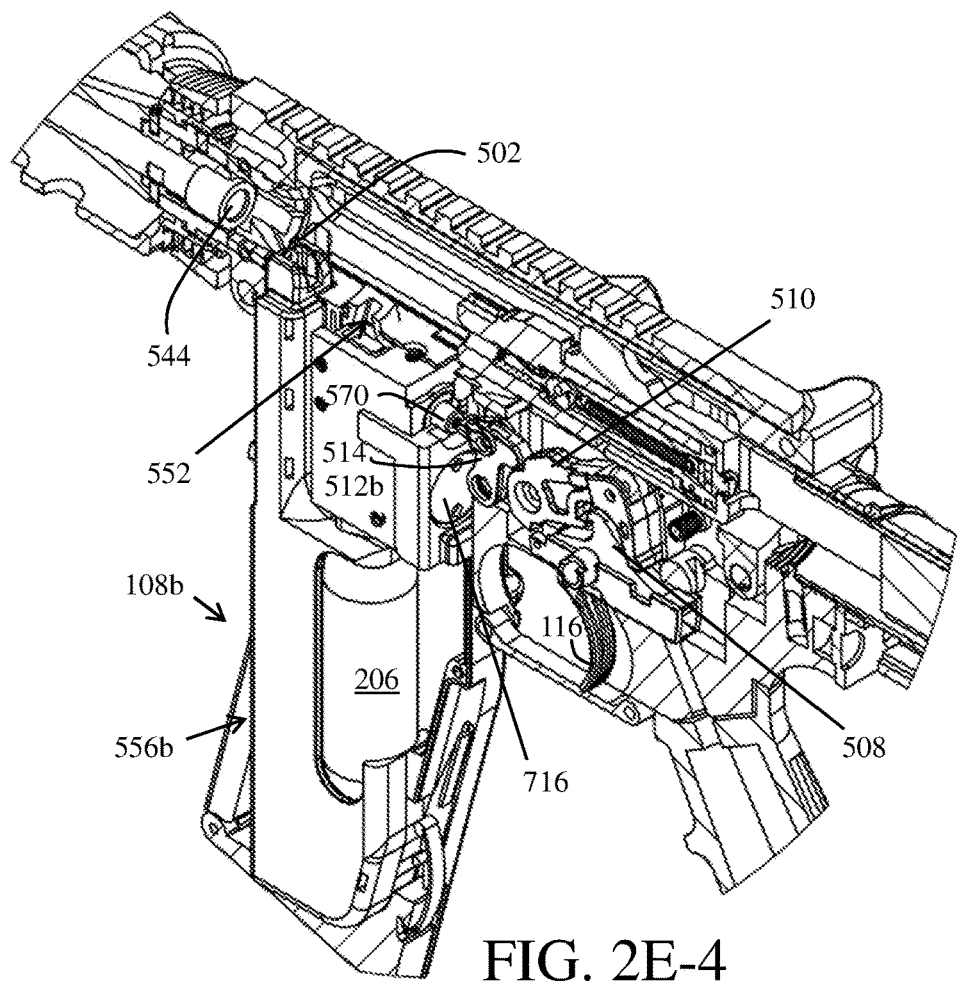
Figure 3A:
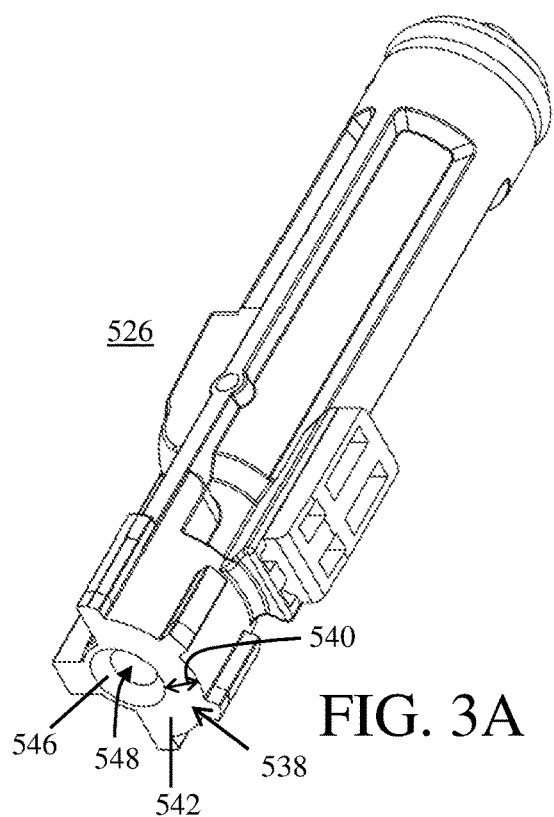
Figure 3B:
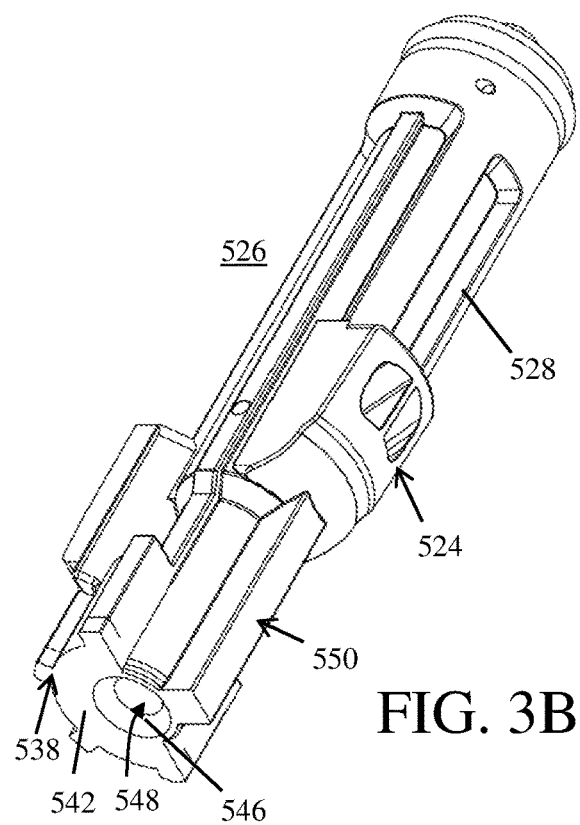
Figure 3C:
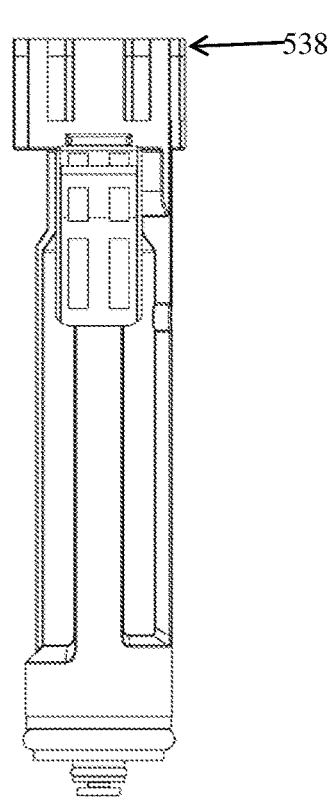
Figure 3D:
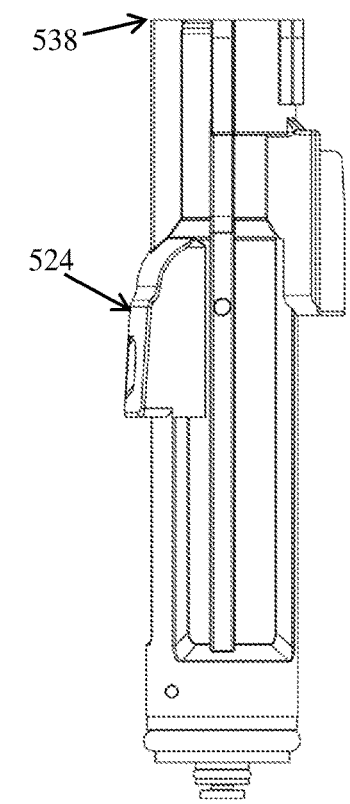
Figure 3E:
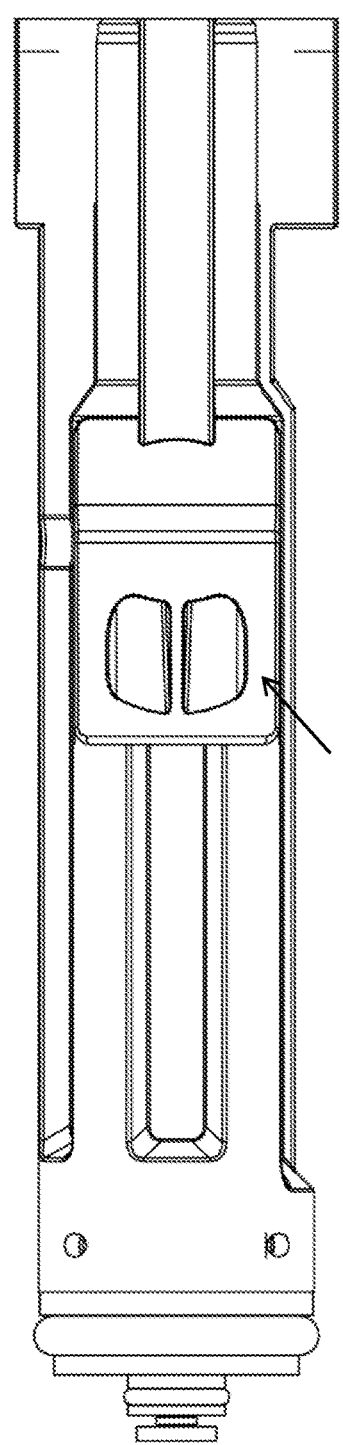
Figure 3F:
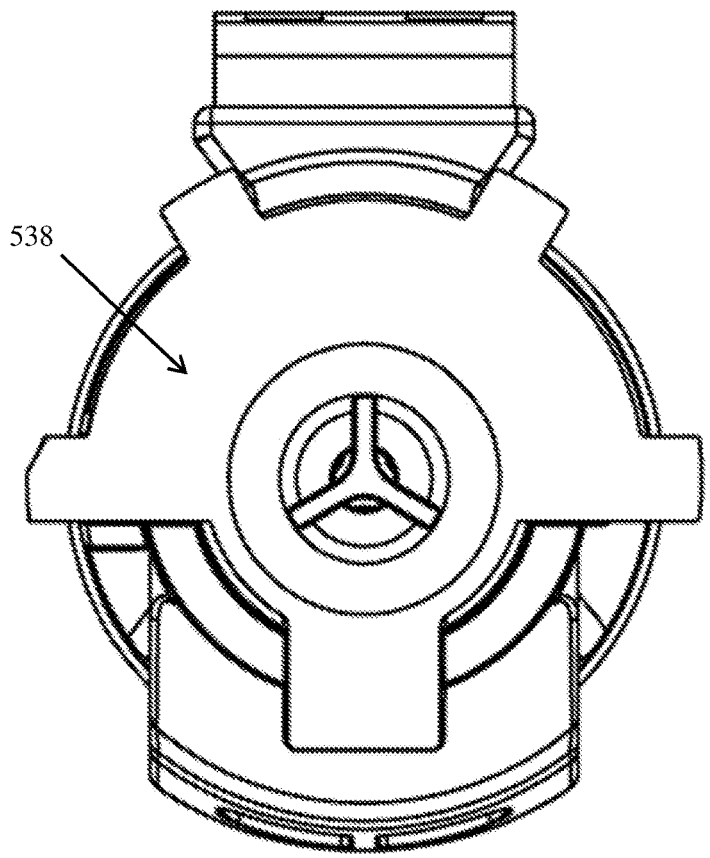
Figure 3G:
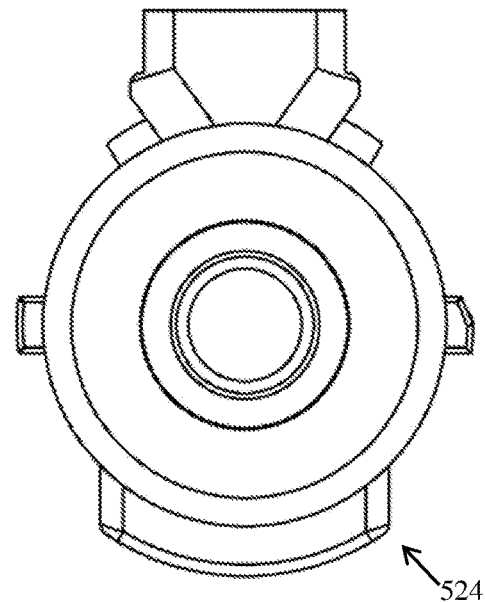
Figure 25B:
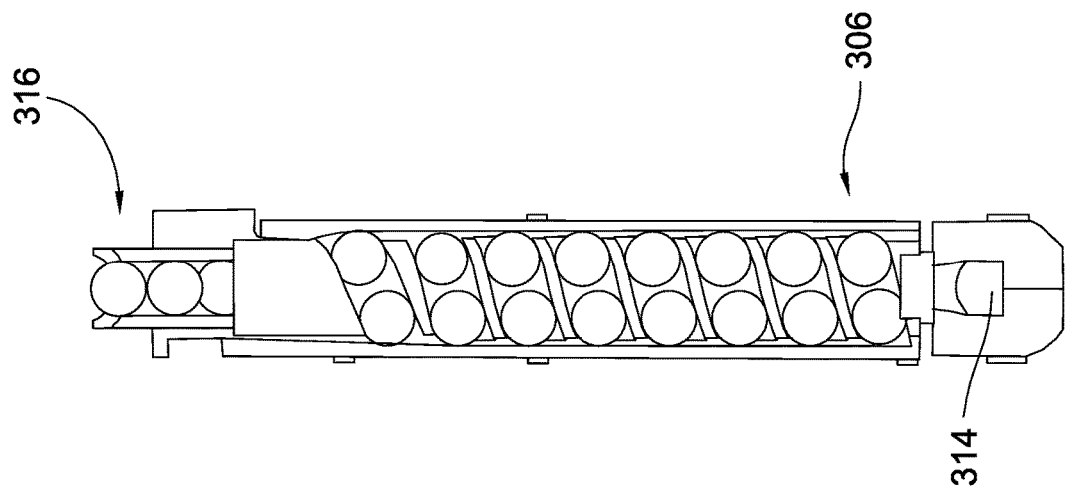
Figure 25A:
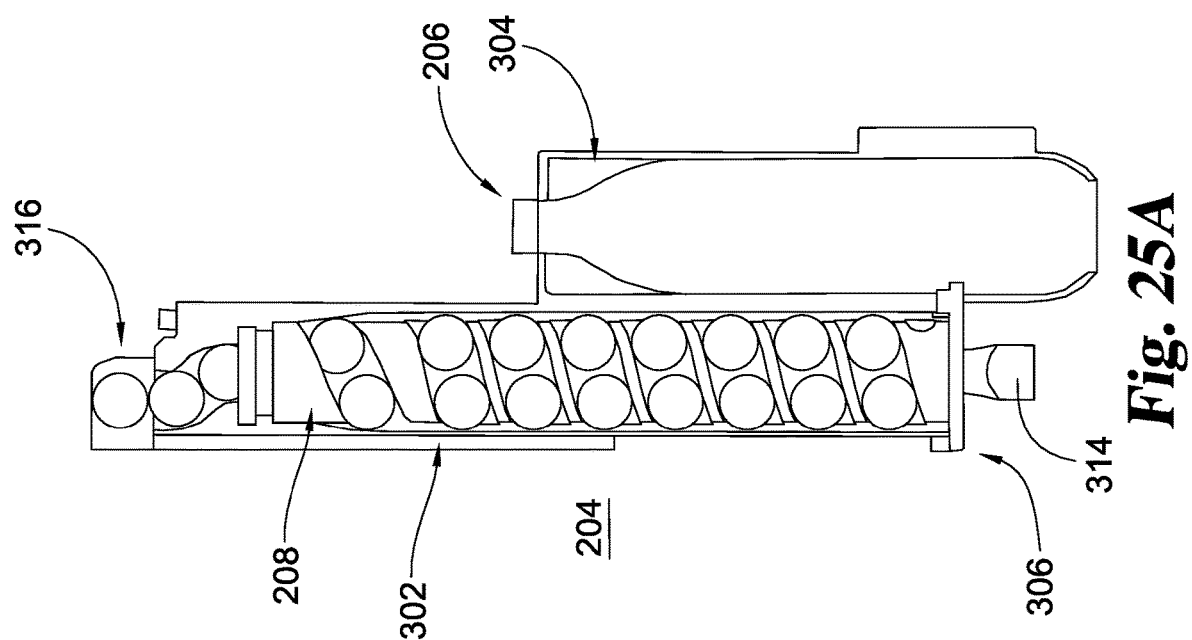
Figure 25D:
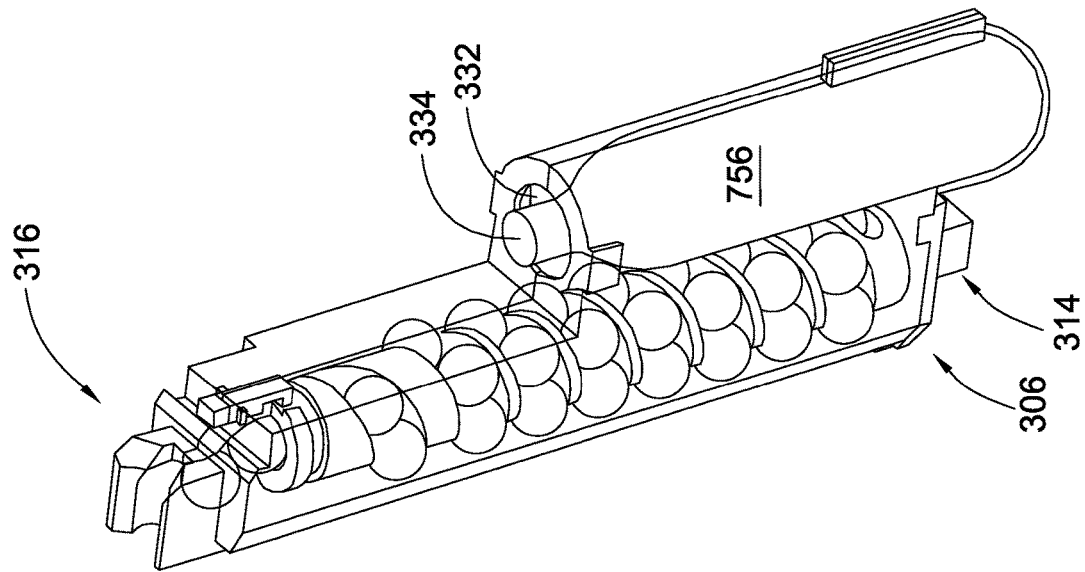
Figure 25C:
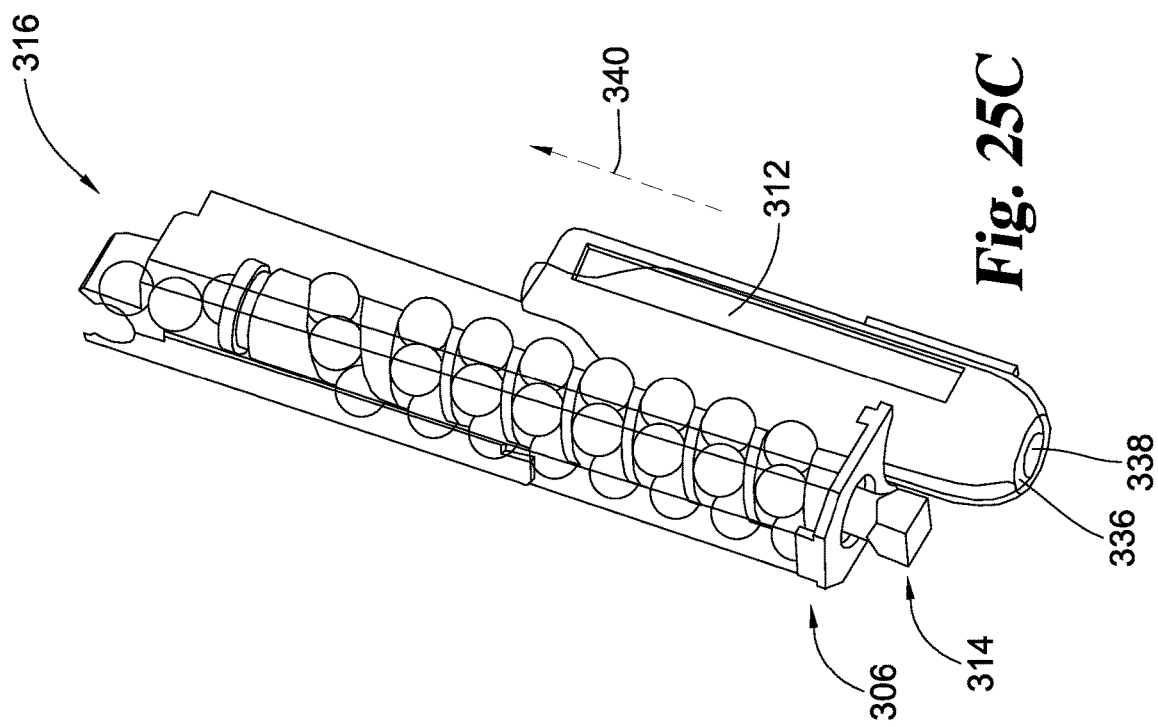
Figure 25E:
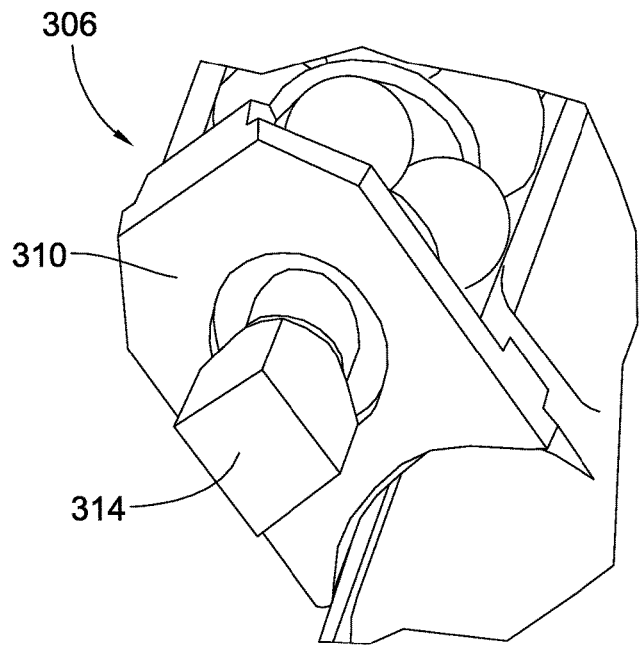
Figure 25F:
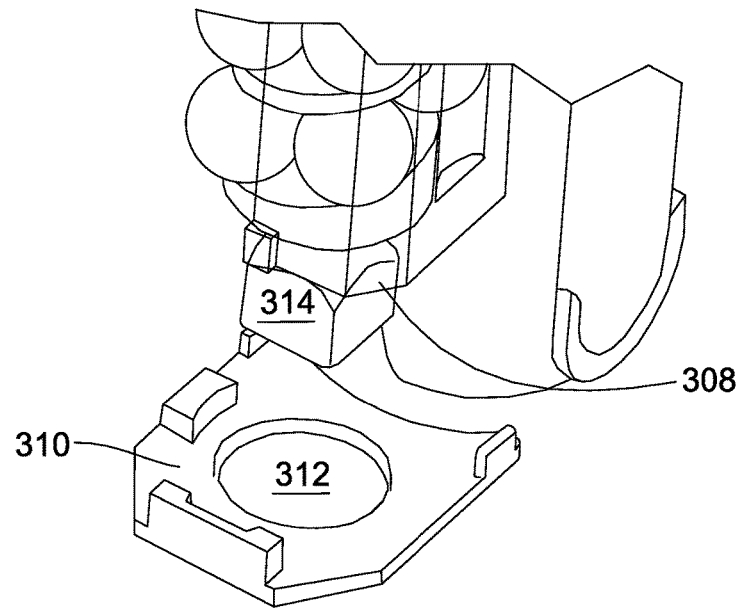
Figure 25G:
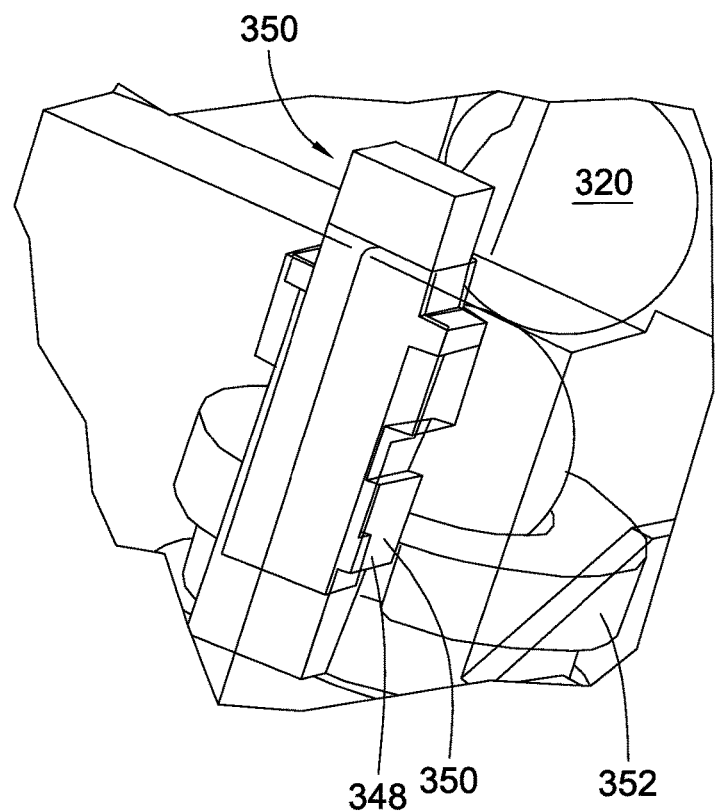
Figure 25H:
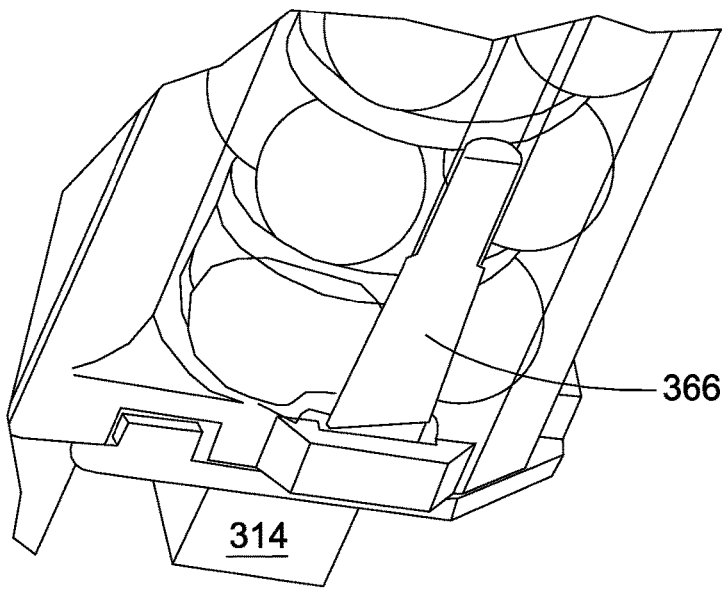
Figure 25I:
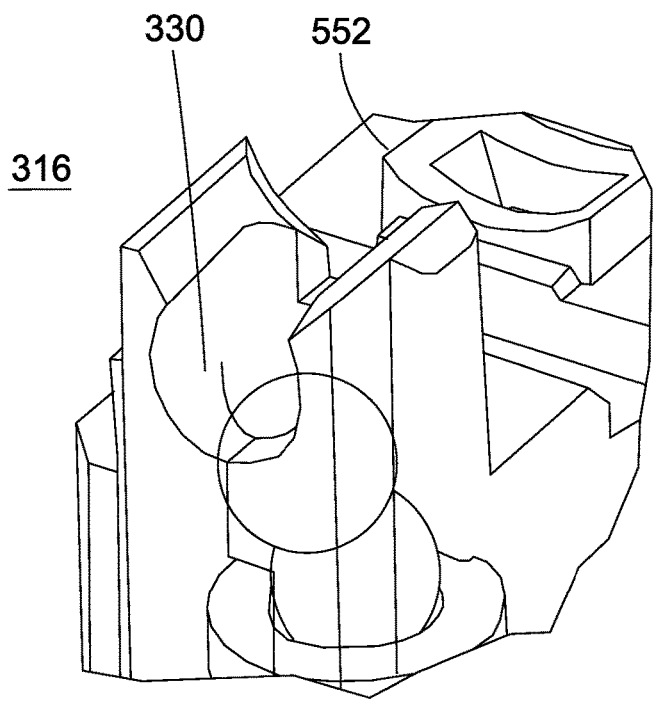
Figures 1, 25J:
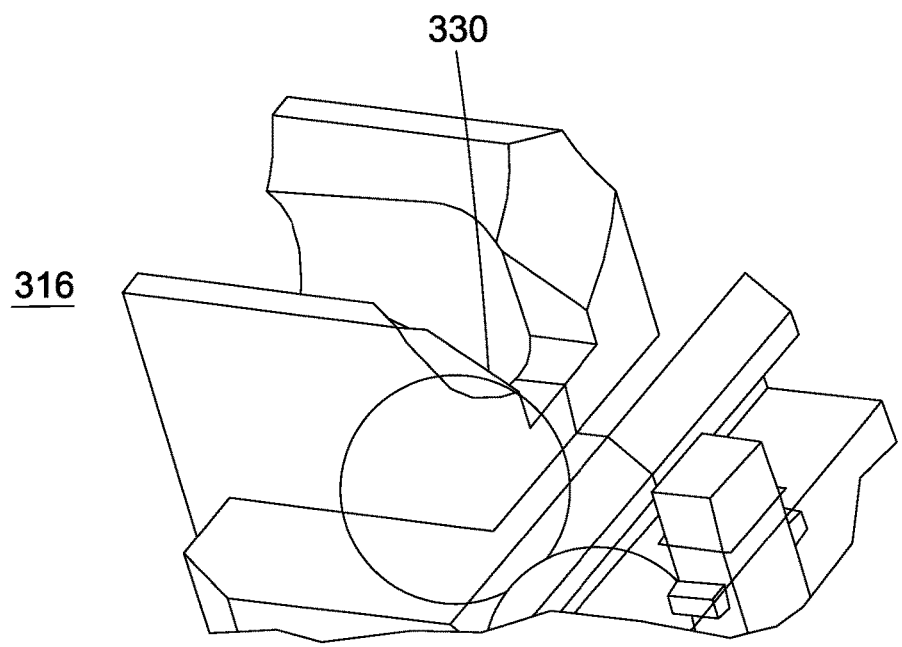
Figure 25M:
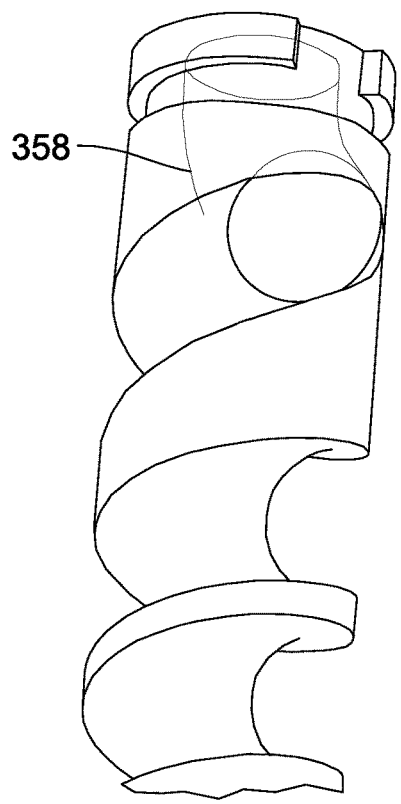
Figure 25N:
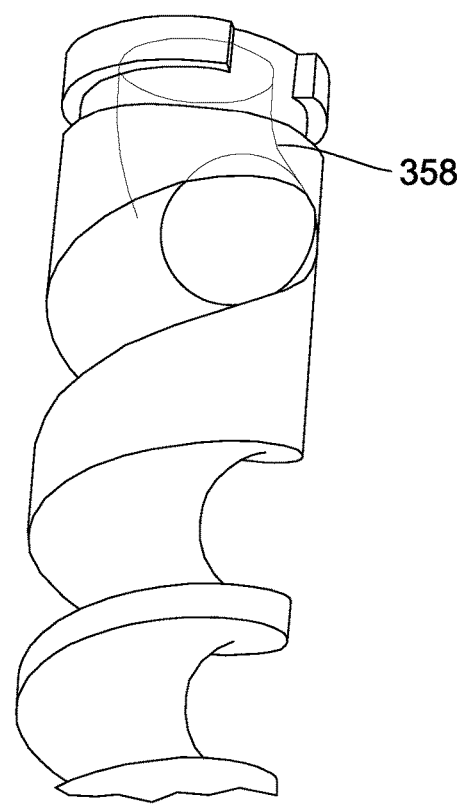
Figure 25O:
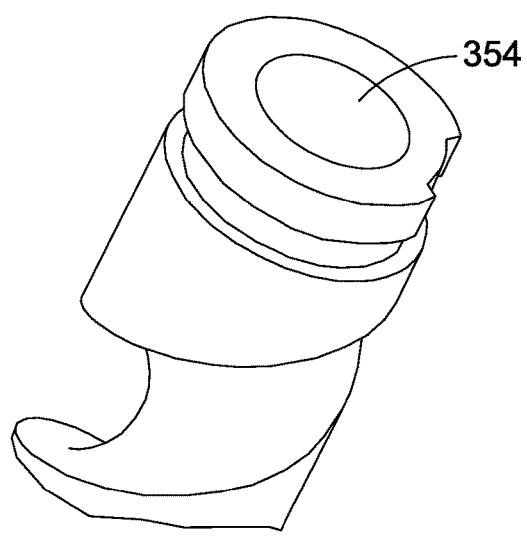
Figures 1, 25P:
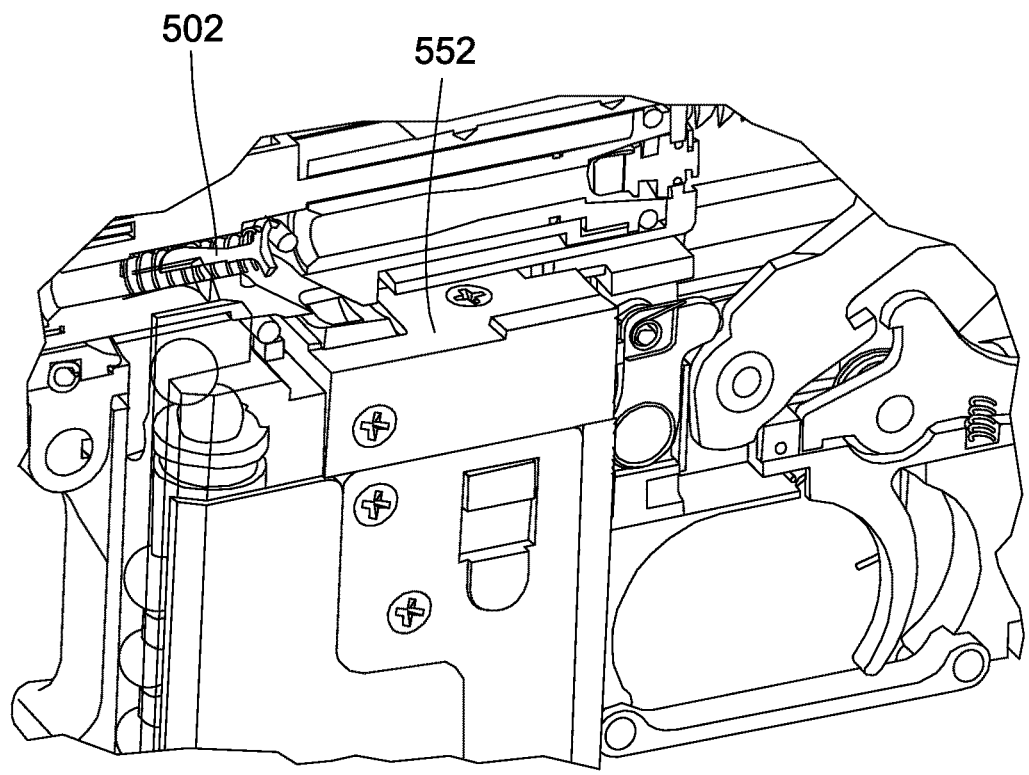
Figures 2, 25P:
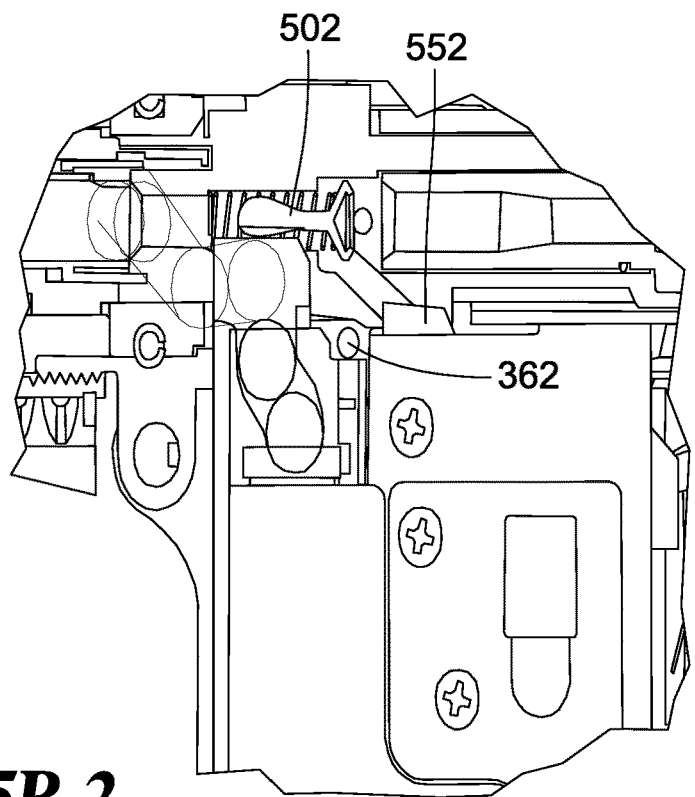
Figures 3, 25P:
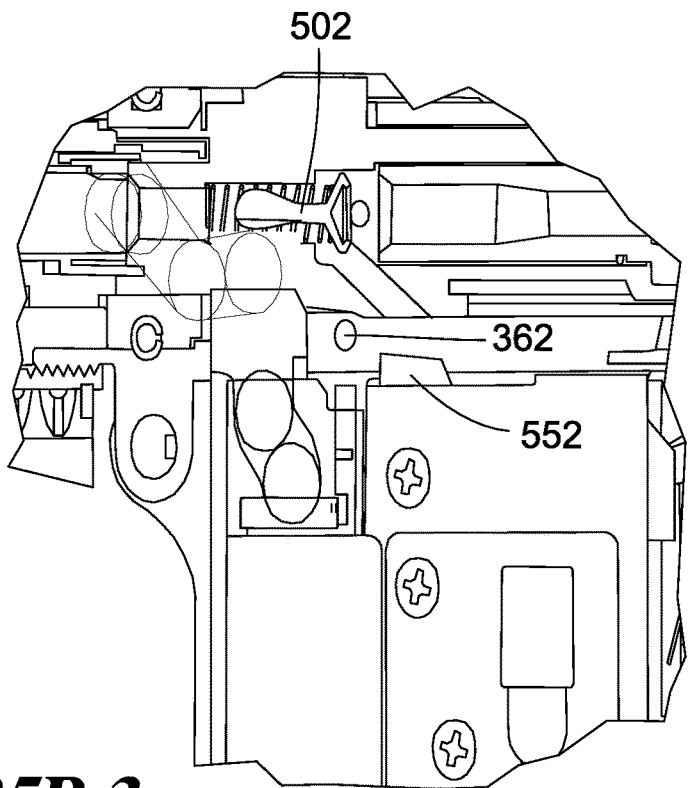
Figures 4, 25P:
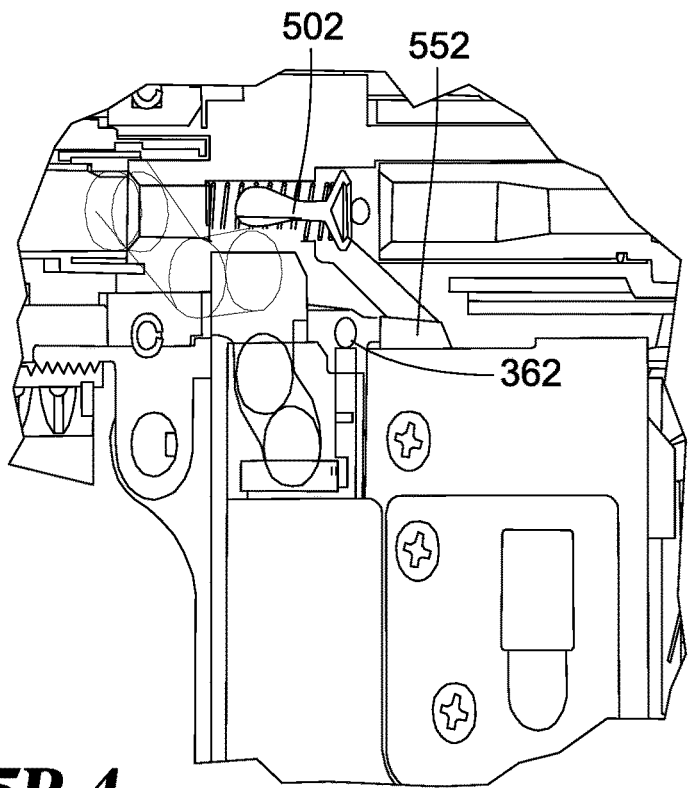
Figures 5, 25P:
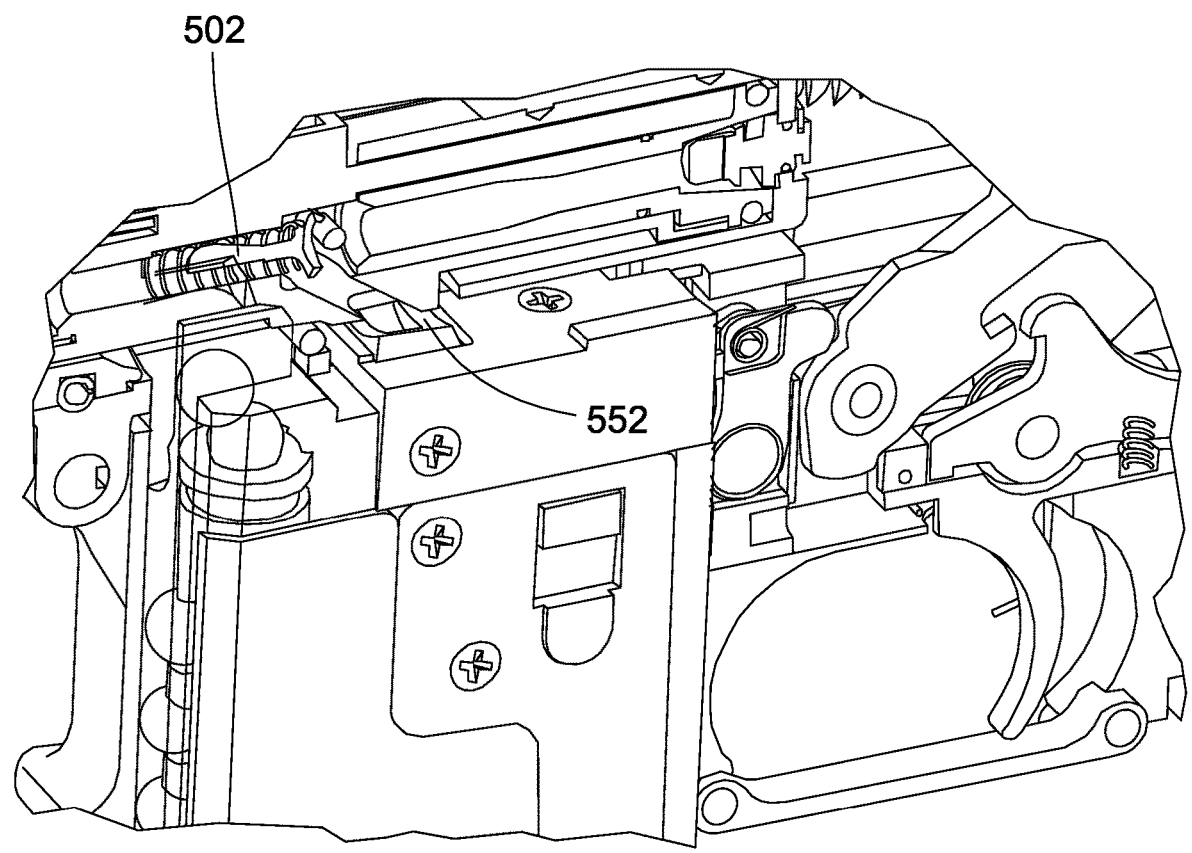
Figures 7, 25P:
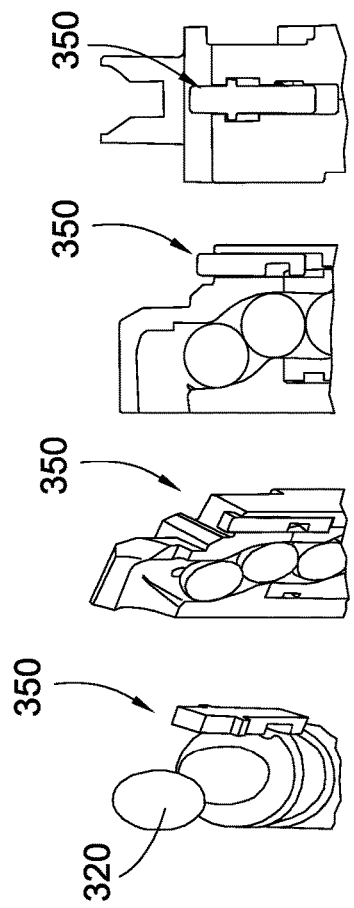
Figures 8, 25P:
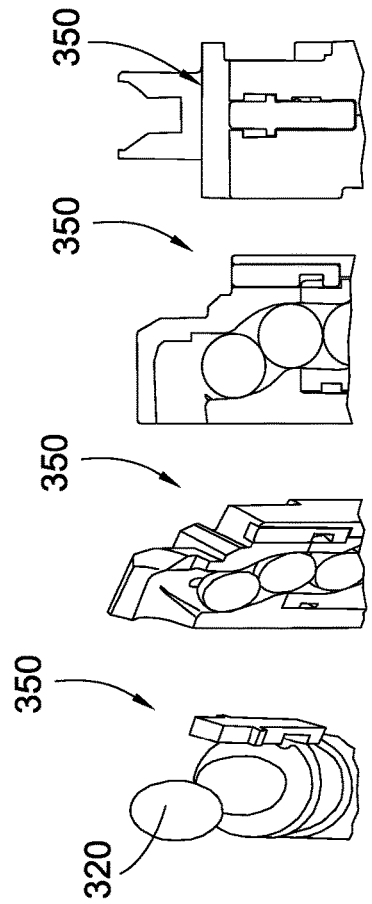
Figures 6, 25P:
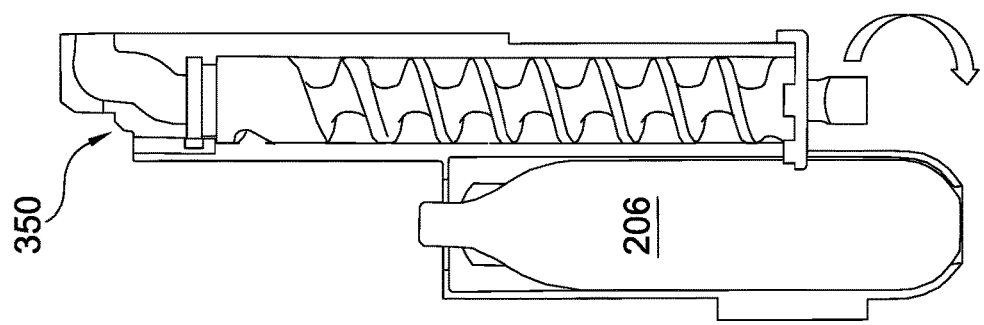
Figures 3, 25Q:
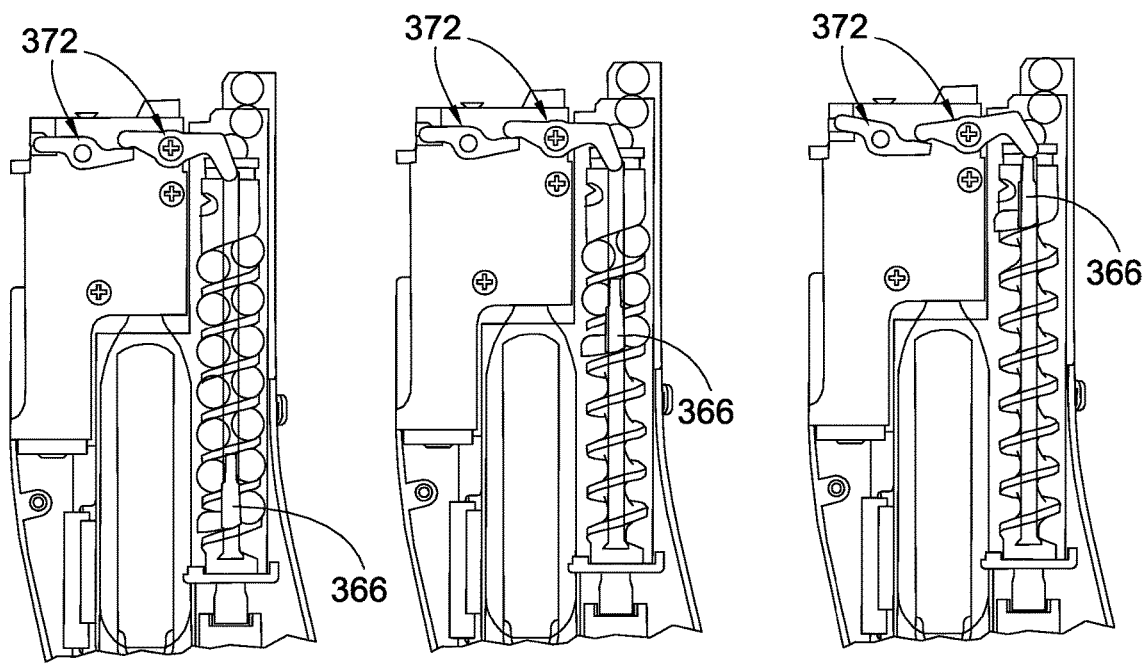
Figures 4, 25Q:
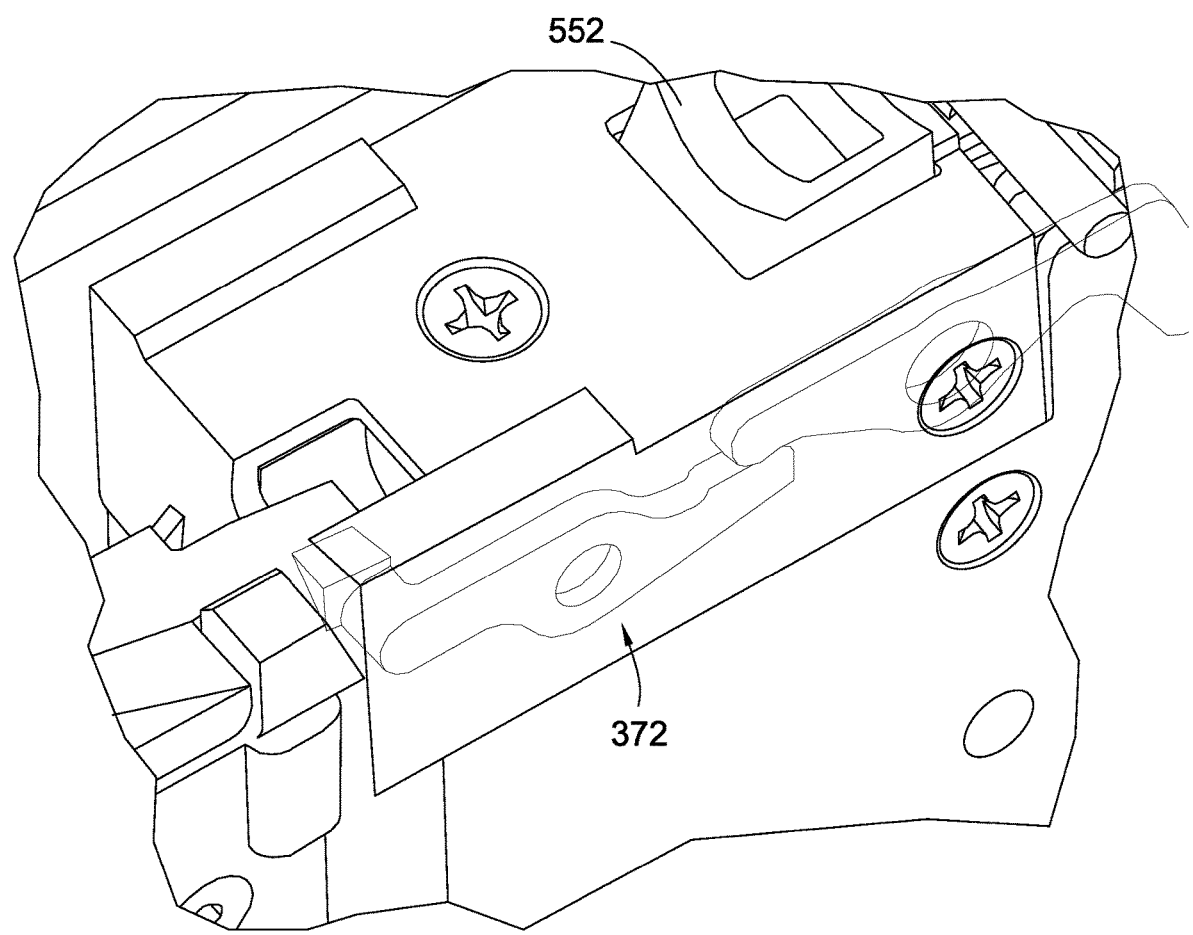
Figure 26A:
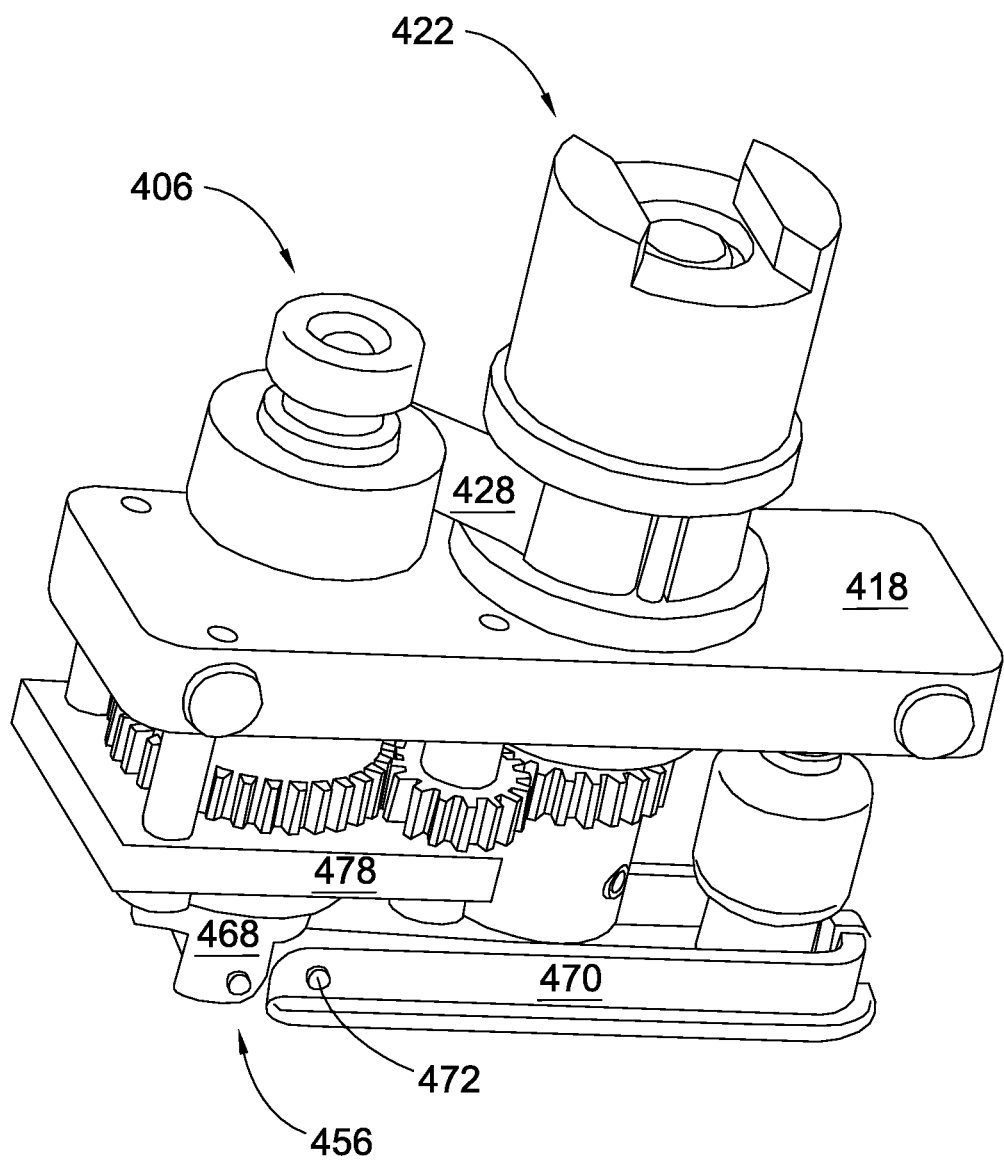
Figure 26B:
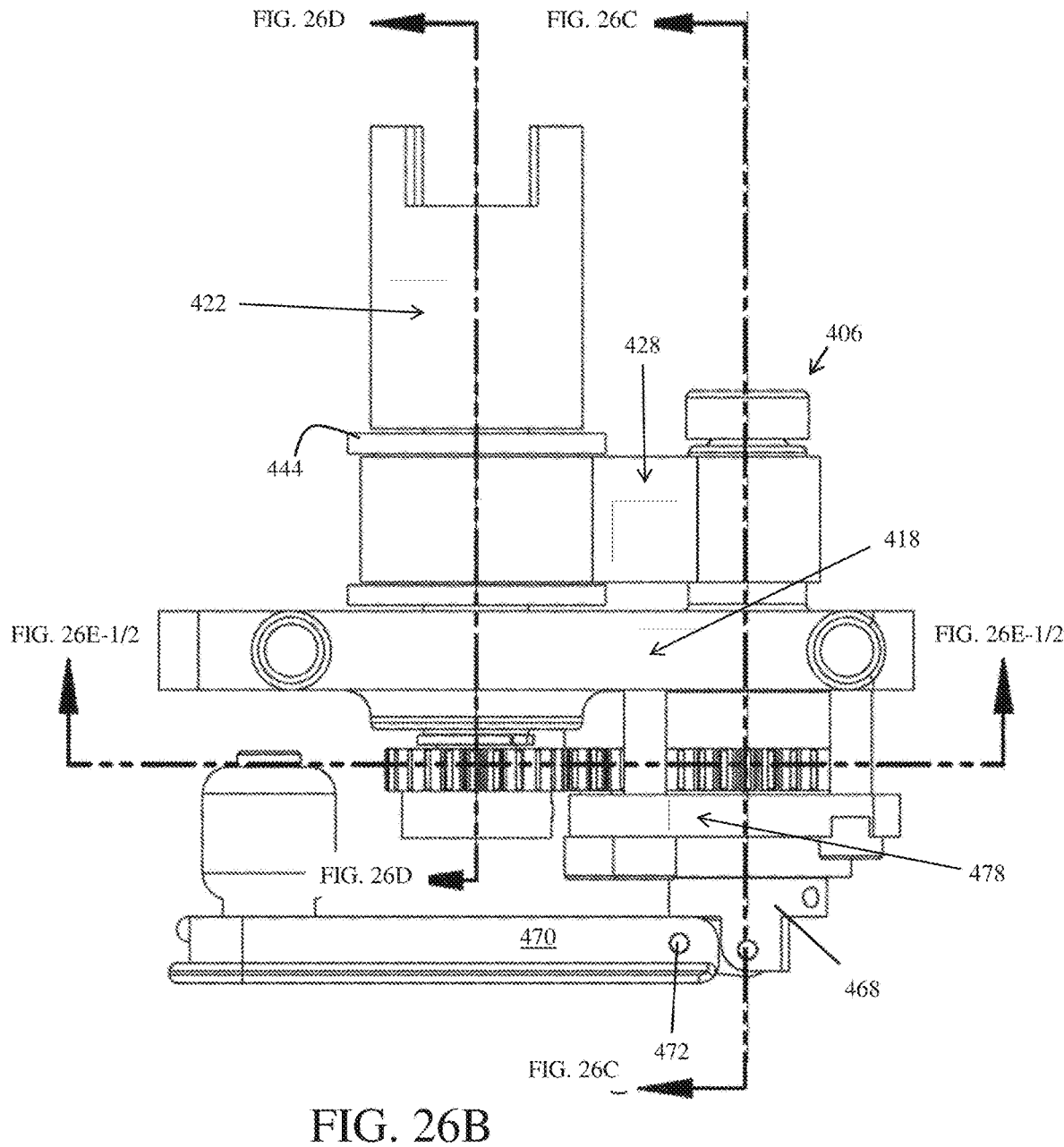
Figure 26C:
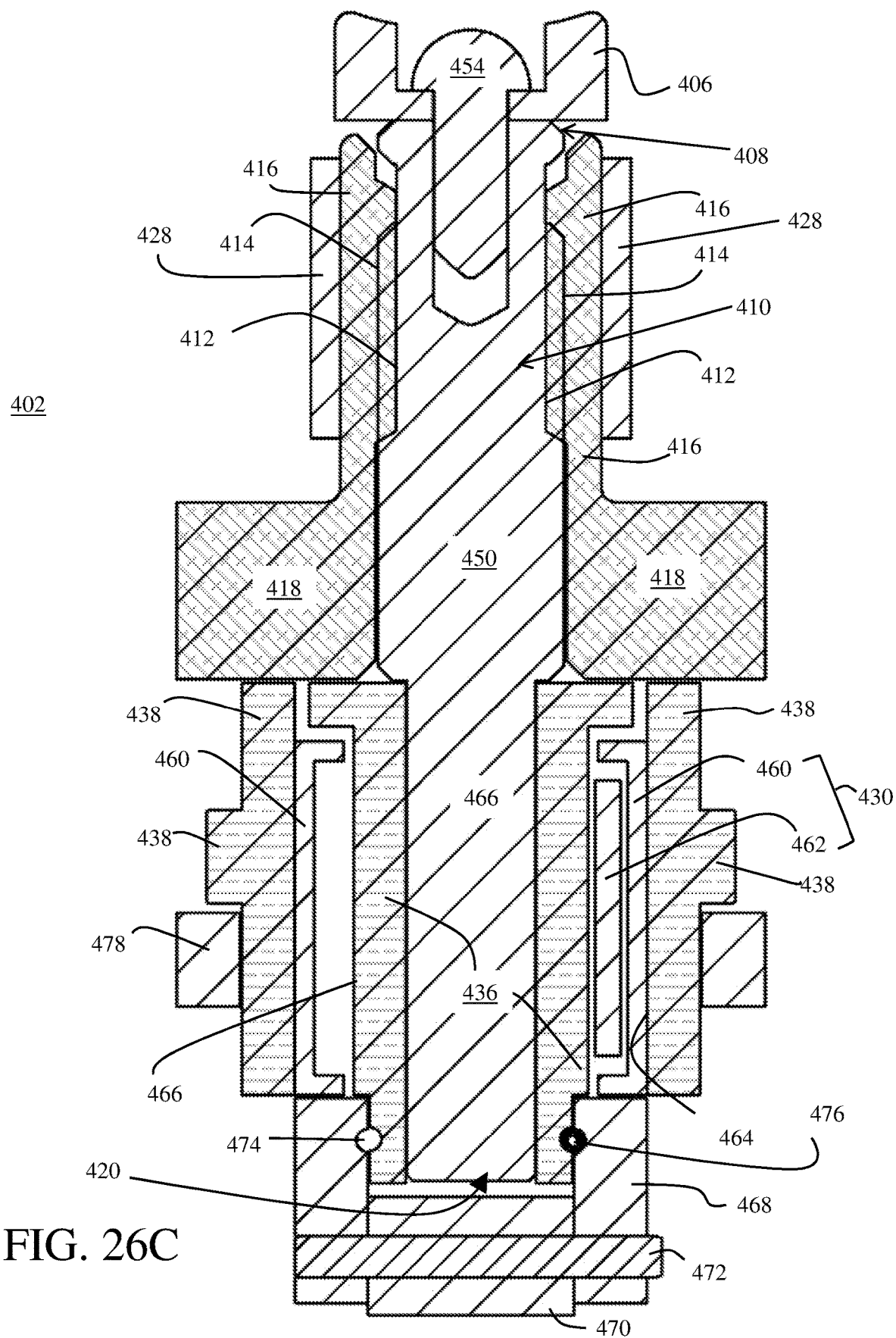
Figure 26D:
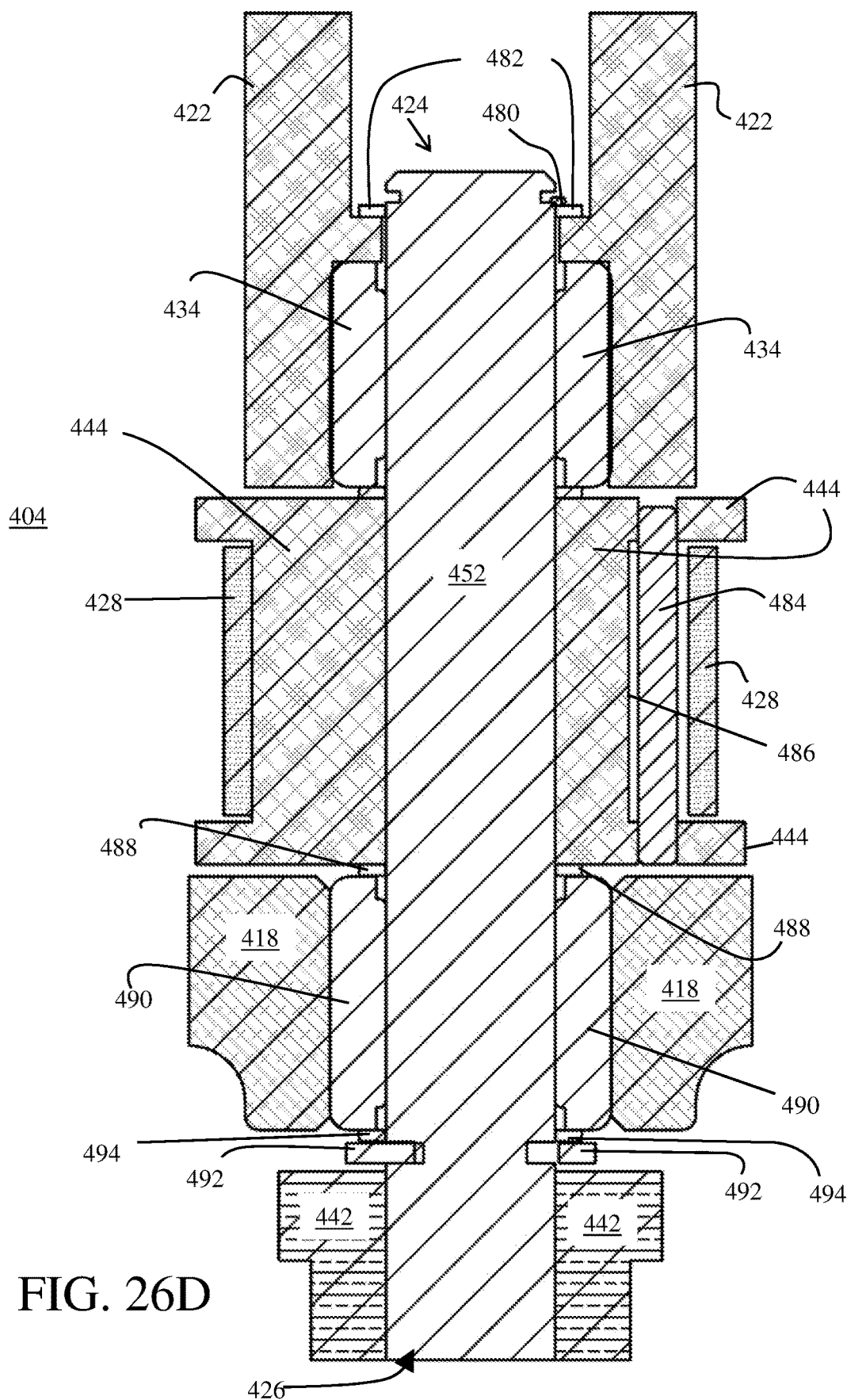
Figures 1, 26E:
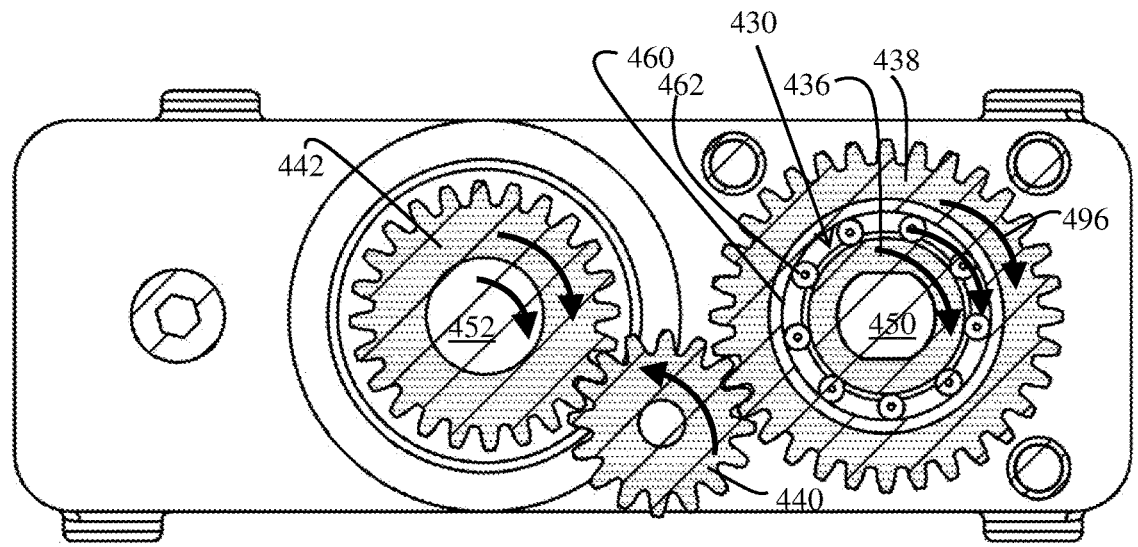
Figures 2, 26E:
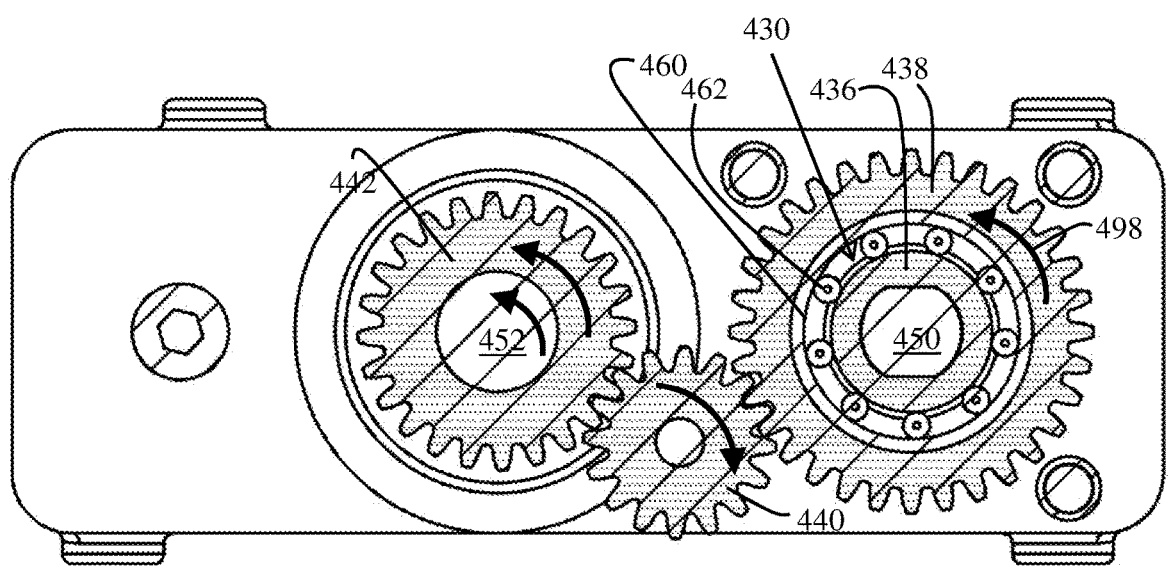

FIGS. 25A to 25Q-4 are non-limiting, exemplary illustrations of a replaceable cartridge or pre-pack 204, which includes canister 206 and projectile actuator module 208. As illustrated in FIGS. 25A to 25Q-4, pre-pack 204 is comprised of a first compartment 302 that houses projectile actuator module 208, and a second compartment 304 that houses canister 206.

First compartment 302 of cartridge 204 is comprised of a first end 306 (best illustrated in detail in FIGS. 25E and 25F) that is comprised of a first opening 308 for insertion and removal of projectile actuator module 208. First opening 308 is caped by a removable enclosure 310 that secures projectile actuator module 208 within first compartment 302, with enclosure 310 having an opening 312 through which a driver end 314 of projectile actuator module 208 is passed.

As further illustrated, first compartment 302 of cartridge 204 is further comprised of a second end 316 (best illustrated in FIGS. 25I, 25J-1, and 25J-2) that is comprised of a channel 318 that guides non-lethal projectiles 320 pushed from projectile actuator module 208 to an ejector opening 322 (shown by arrow 326). As best shown in FIG. 25I, a laterally extending protuberance 330 is also included that maintains or retains non-lethal projectiles 320 away from top distal end 316 in initial state (e.g., during shipping where there is no force applied to non-lethal projectiles 320).

Second compartment 304 of cartridge 204 is comprised of a first opening 332 that receives piercing end 334 of gas canister 206 (best illustrated in FIGS. 25C and 25D). Further included is a second opening 336, located opposite the first opening 332, which enables mating of the bottom end 338 of gas canister 206 with engagement end of piercing post of drive mechanism 210. It should be noted that the second compartment 304 has a larger size than the actual canister itself, enabling smaller-sized canister 206 to move along direction 340, while remaining within second compartment 304. That is, gas canister 206 may move along direction 340 until wider outer diameter section 342 of gas canister 206 reaches smaller, inner diameter of opening 332. This way, gas canister 206 is kept within second compartment 304 of cartridge 204 even during initial state (e.g., during shipping and handling).

As best illustrated in FIGS. 25K to 25Q-4, projectile actuator module 208 includes the illustrated auger 364 and associated components such as a latch member 350, bolt stop member 366, etc. Auger 364 moves non-lethal projectiles 320 within first compartment 302 from its first end 306 to second end 316.

Auger 364 includes a top distal end 344 that is comprised of a lateral recess or indentation 346. Lateral recess 346 functions as a keeper that receives an engagement portion 348 of a latch member 350. This prevents auger 364 from rotating when latch member 350 is in latch position (best shown in FIGS. 25G and 25J-2) where engagement portion 348 is positioned within the keeper 346.

Top distal end 344 of auger 208 further includes a circumferential groove 352 for accommodating engagement portion 348 of latch member 350 when latch member 350 is in unlatched position to thereby allow rotation of auger 364. As best illustrated in FIGS. 25P-1 to 25P-8, latch member 350 is moved from latched to unlatched position when magazine 108c is inserted into non-lethal gas-operated gun 100, where an added unlatching pin 362 (FIGS. 25P-1 to 25P-5) in non-lethal gas-operated gun 100 pushes latch member 350 from latched position (FIGS. 25P-7) to the unlatched position (FIGS. 25P-8). It should be noted that the added unlatching pin 362 is included and required only for magazine 108c. In other words, unlatching pin 362 is removed and in fact, need not be part of non-lethal gas-operated gun 100 when using magazines 108a and 108b.

Top distal end 344 of auger 364 further includes a central opening 354 that leads to final flighting 356 of the auger 364 via an angled conduit, or canal, 358, through which non-lethal projectiles 320 are moved from the final auger flighting 356 to the channel 318 of first compartment 316 of cartridge 204. Therefore, non-lethal projectiles move along the outer periphery of the auger 364, moved by flighting 356 of the auger, but exit through central opening 354 without being jammed. As further illustrated, a bottom distal end of auger 364 includes driver end 314 that is configured to engage with drive mechanism 210.

Auger 364 provides efficient packaging in that it provides narrowest (smallest diameter) for packing non-lethal projectiles. In general, viewed in the cross-sectional, auger 364 has four pillars of non-lethal projectiles 320 that are moved by auger 364.

The limitation of size of auger 364 to include optimal number of non-lethal projectiles 320 is not a limitation of capability, but one that provides the same number of rounds as a conventional M4 rifle magazine. The number of flightings, and flight angle for each flighting of auger 364 is selected in accordance with the number of auger rotations required based on the energy that may be stored in biasing mechanism 428 (detailed below).

Projectile actuator module 208 further accommodates a bolt stop member 366 (best illustrated in FIGS. 25Q-1 to 25Q-4) that indicates to a user that magazine 108c is out of non-lethal projectiles 320. Bolt stop member 366 includes a drive engagement section 368 that slides in-between individual flightings of auger 364 until toggle actuator section 370 of bolt stop 366 reaches a set of toggle levers 372, which in turn, push a "catch" (or metal bolt stop on the gun). The "catch" maintains bolt carrier group 506 open, which indicates to the user that magazine 108c is empty. Bolt stop 366 slides up auger 364 as auger 364 is rotated. Toggle actuator section 370 is longer than at least one flighting space and hence, not all non-lethal projectiles are emptied prior to indication of empty magazine 108c.

FIGS. 26A to 26E-1 are non-limiting, exemplary illustrations of the various views of a drive mechanism. As illustrated, drive mechanism 210 of magazine 108 is comprised of a piercing shaft assembly 402 that includes a piercing shaft 450 that moves gas canister 206 to engage with a piercing portal of gas regulator system 212.

Drive mechanism 210 further includes a projectile actuator shaft assembly 404 that includes a projectile shaft 452 that rotates auger 364 of projectile actuator module 208 to feed non-lethal projectiles 320 into chamber of gun. Drive mechanism 210 also includes mechanical components (e.g., one-way bearings, crank, adapter, torsion spring, etc. detailed below) that enables selective actuation of piercing shaft 450 and projectile actuator shaft 452.

Piercing shaft assembly 402 is comprised of a seat 406 that is moveably (rotates or spins) secured to a first distal end 408 of piercing shaft 450 by a fastener 454, with seat 406 engaging canister 206. Piercing shaft 450 includes a first end 410 that has an outer diameter threading 412 that engages an inner diameter threading 414 of a hollow support post 416 of a support base 418 of drive mechanism 210.

Further, piercing shaft assembly 402 also accommodates a second end of a biasing mechanism (or resilient member) 428 comprised of a torsion spring, near first end 410 of piercing shaft 450. Piercing shaft 450 also includes a second distal end 420 that is adapted and configured to slide within a central double D internal feature of an adapter 436 associated with crank assembly 456.

Piercing shaft assembly 402 is further comprised of a first one-way roller bearing (or one-way needle clutch bearing) 430 comprised of outer race 460 and roller pins 462. First one-way roller bearing 430 is associated with piercing shaft 450 by adapter (double D lock profile) 436 and a first driver gear 438 of the gear train, with the first one-way roller bearing 430 positioned in-between first driver gear 438 and the adapter 436. Outer race 460 of first one-way roller bearing 430 is connected to inner circumference 464 of first drive gear 438, while roller pins 462 roller over outer circumference 466 of adapter 436, enable one-way rotation of piercing shaft 450 in first direction 496. As detailed below, first one-way bearing 430 enables one-way transfer of torque from rotating piercing shaft 450 to a spool 444 associated with projectile actuator shaft assembly 404 via the gear train in the initial mode of operation. However, as detailed below, first one-way bearing 430 prevents rotation of adapter 436 (and hence piercing shaft 450) in second direction 498 while first driver gear 438 freely rotates in second direction 498 under the torsion force of biasing mechanism 428.

First one-way roller bearing 430 locks in relation to adapter 436 (and hence, the piercing shaft 450) when rotated along a first direction 496, including rotating the first driver gear 438 in the first direction 496. As first driver gear 438 turns, it rotates an idle gear 440 of the gear train, which, in turn, rotates a second driver gear 442 (detailed below) of the gear train in the first direction 496. First one-way roller bearing 430 freely rotates in relation to the adapter (and hence, piercing shaft 450) when rotated along a second direction 498 (roller pins 462 simply roll over the outer circumference 466 of adapter 436), which enables rotation of the first drive gear 438 in the second direction, while piercing shaft 450 is not rotated. It should be noted that a plate gear 478 supports the first drive gear 438.

Piercing shaft assembly 402 further includes crank assembly 456 that includes a handle base 468, a handle toggle 470, with pin 472 connecting handle base 468 and handle toggle 470 together. The pin 472 slips into the opening of handle toggle 470, and is press fit in the opening of handle base 468. Crank assembly 456 is connected to adapter 436 via a first and second roll-pin fasteners 474 and 476. Crank assembly 456 converts application of torque into a reciprocal (or linear) motion for piercing shaft 450 and further, for application of a torsion load to biasing mechanism 428 for storing mechanical energy.

As crank assembly 456 is rotated, torque from crank assembly 456 rotates piercing shaft 450 that has its outer diameter (OD) threading 412 engaged with inner diameter (ID) threading 414 of hollow support post 416 of base 418 to axially move (vertically) the piercing shaft 450. In other words, the threads enable translational movement of the rotating piercing shaft 450 along its longitudinal axis. The threaded shaft 450 pivots about its longitudinal axis, rotating through hollow support post 416, enabling both translational and rotational movement of shaft 450 through the threaded hollow support post 416. As indicated above, seat 406 is free to rotate due to fastener 454 connection.

Projectile actuator shaft assembly 404 is comprised of a driver engagement member 422 associated with a first distal end 424 of projectile actuator shaft 452 via a first spacer washer 480 to ensure relative movement of both in relation to one another. A snap ring 482 secures driver engagement member 422 onto projectile actuator shaft 452. Driver engagement member 422 latches onto driver end 314 of auger 364 to rotate auger 364.

Projectile actuator shaft assembly 404 is further comprised of a second one-way roller bearing (or one-way needle clutch bearing) 434 that is identical to first one-way roller bearing 430, but installed to have an opposite mode of operation in relation to bearing 430. Second one-way roller bearing 434 is illustrated as an "interface view" for simplicity.

Second one-way roller bearing 434 is associated with projectile actuator shaft 452 and driver engagement member 422, with second one-way roller bearing 434 positioned in-between projectile actuator shaft 452 and driver engagement member 422. Outer race (not shown) of second one-way roller bearing 434 is connected (press-fit) to inner circumference of driver engagement member 422, while roller pins (not shown) roll over outer circumference of projectile actuator shaft 452, enable one-way rotation of driver engagement member 422 in second direction 498 (detailed below). In other words, second one-way bearing 434 and driver engagement member 422 are fixed relative to one another.

As detailed below, second one-way bearing 434 enables one-way transfer of torque from rotating projectile actuator shaft 452 to driver engagement member 422 in second direction. However, as detailed below, second one-way bearing 434 prevents rotation of driver engagement member 422 in first direction 496 while projectile actuator shaft 452 freely rotates in first or second directions 498.

As further illustrated, projectile actuator shaft assembly 404 further includes a spool 444 that accommodates torsion spring 428, a first end of which is secured to spool 444 by pin 484 within space 486. Spool 444 is associated with a simple bearing 490 via washer 488 to ensure that the adjacent parts move one relative to the other, with bearing 490 allowing projectile actuator shaft 452 to rotate freely within base 418.

Projectile actuator shaft 452 also includes a second end 426 that is coupled with second driver gear 442 via an E-ring 492, which prevents projectile actuator shaft 452 from being pulled out through bearing 490. E-ring 492 in cooperation with washer 494 allow projectile actuator shaft 452 to rotate freely.

Drive mechanism 210 has an initial mode of operation that enables engagement of canister 206 with piercing portal of gas regulator system 212 and stores mechanical energy within biasing mechanism 428. Drive mechanism 210 has an operation mode function that rotates auger 364 of projectile actuator module 208 by stored mechanical energy of biasing mechanism 428. A final mode of drive mechanism 210 enables disengagement of canister 206 from piercing portal of gas regulator system 212 for replacing cartridge 204.

As indicated above, crank assembly 456 converts application of torque into a reciprocal (or linear) motion for piercing shaft 450 and further, for application of a torsion load to biasing mechanism 428 for storing mechanical energy. First one-way roller bearing 430 enables transfer of torque from rotating piercing shaft 450 to spool 444 associated with projectile actuator shaft 452 via a gear train in the initial mode of operation. Second one-way roller bearing 434 enables transfer of stored energy from biasing mechanism 428 (wound on piercing shaft assembly 402) back onto spool 444 on projectile actuator shaft 404, rotating projectile actuator shaft 452. The first and the second one-way bearings 430 and 434 are set to operate in opposite modes (e.g., opposite one-way directions).

The second one-way roller bearing 434 allows free rotation of the projectile actuator shaft 404 in the first direction 496 as shown but without the rotation of driver engagement member 424 when second driver gear 442 is rotated in the first direction 496. This means that as projectile actuator shaft 404 rotates in first direction 496, driver engagement member 422 does not rotate to rotate an attached auger 364. It should be noted that if driver engagement member 422 is rotated in the first direction 496 to rotate auger 364 in the first direction 496, non-lethal projectiles 320 would be pushed downwards towards the drive mechanism 210 and hence, they would jam. Accordingly, driver engagement member 422 does not rotate when projectile actuator shaft 404 rotates in first direction 496 (due to second one-way bearing 434).

The rotation of second driver gear 442 in first direction 496 rotates projectile actuator shaft 452 in first direction 496 to rotate the connected spool 444 in first direction 496 to unwind biasing mechanism 428 onto outer circumference of hollow support post 416 associated with piercing shaft 450 while second one-way roller bearing 434 prevents driver engagement member 422 from rotating. Once wound onto hollow support post 416, as non-lethal projectiles 320 are ejected (in operation mode), biasing mechanism 428 unwinds from hollow support post 416 back onto spool 444, applying a stored torsion energy to rotate projectile actuator shaft 452 in a second direction 498. Rotation of first driver gear 438 in second direction 498 rotates idle gear 440 in second direction 498 to rotate second driver gear 442 in second direction 498.

The piercing shaft 452 is locked out of rotation in second direction 498 due to first one-way roller bearing 430, which allows piercing shaft 450 to rotate in first direction 496 only. In other words, as first driver gear 438 rotates in second direction 498, one-way roller bearing 430 rotates in second direction 498 with bearings freely rotating and rolling over the piercing shaft 450 rather than locking shaft 450 in tandem motion with first driver gear 438.

Rotation of second driver gear 442 in second direction 498 rotates the projectile actuator shaft 452 in second direction 498, which rotates second one-way roller bearing 434 in second direction 498. This allows driver engagement member 422 to rotate in second direction 498, which rotate auger 364 to move non-lethal projectiles 320 into the chamber of the gun. In other words, in second direction 498, projectile actuator shaft 452 and driver engagement member 422 move in tandem due to second one-way roller bearing 434. That is, second one-way roller bearing 434 locks with the motion of projectile actuator shaft 452 together with engagement member 422.

At the final mode of operation, drive mechanism 210 may be used to facilitate disengagement of canister 206 from gas system 212. Rotating crank 802 in a second direction 498 rotates piercing shaft 402 to lower canister 206 away from the piercing portal, regardless of the state of the first and second one-way bearings 430 and 434. It should be noted that the biasing mechanism (e.g., torsion spring) 428 and piercing shaft 450 have no direct mechanical connection to affect one another in final mode. Further, first one-way bearing shaft 430 enables tandem rotation of drive gear 438 and piercing shaft 452 in only one direction (first direction 496), but not the second 498. Hence, when rotating crank assembly 456 in second direction 498, piercing shaft 452 rotates in second direction 498 since crank assembly 459 is connected to piercing shaft 450 by means of adapter 436, but first drive gear 438 is not rotated due to bearing 430.

Referring now to FIGS. 27A and 27B, non-lethal gas-operated gun 800 is illustrated. Non-lethal gas-operated gun 800 is an alternate embodiment of the claimed invention. Non-lethal gas-operated gun 800 is generally similar to a conventional AK47 rifle and is generally similar in the look, feel, operation and experience of a conventional AK47. Non-lethal gas-operated gun 800 generally includes magazine 808 that contains pre-pack 556*a* as described in detail above. Magazine 808 is removable insertable into non-lethal gas-operated gun 800 and generally is similar in the look, feel and experience of an AK47 magazine holding live rounds. In other embodiments (not illustrated), the look and feel of other types of rifles or carbines can be reproduced, including the felt recoil when fired.

Magazine 808 includes housing 858 with a form-factor commensurate with a magazine well (not illustrated) in non-lethal gas-operated gun 800. Magazine 808 includes opening 864 that receives feeder 566 of pre-pack 556a. Magazine 808 also includes gas seal 852 and magazine 808 defines opening 868 that receives strike member 870 of a gas system that is contained in magazine 808. The gas system in magazine 808 is similar to the gas system disclosed above with regard to magazine 108a.

Magazine 808 defines interior chamber 897 that receives pre-pack 556a. Magazine 808 includes pivot pin 818, handle 898 associated with latch member 899, and enclosure 802 with keeper portion 804 that enables latch member 899 to latch onto keeper 804 to maintain enclosure 802 in a closed, latched position.

Similar to magazine 108a detailed above, interior chamber 897 is keyed or indexed to receive pre-pack 556a in a specific orientation so that canister 206 is aligned with and is pierced by the gas regulator system of magazine 808 as enclosure 802 is fully latched (as shown in FIG. 27B).

Magazine 808 also includes the fail-safe feature described above with regard to magazine 108a in the event that canister 206 is accidentally released when still full of gas, which can cause it to "propel" towards the bottom of magazine 808; latch 899 catches enclosure 802 and allows gas to expel without the entire pre-pack 556a or canister 206 ejecting out of the bottom of magazine 808.

Figure 28C:
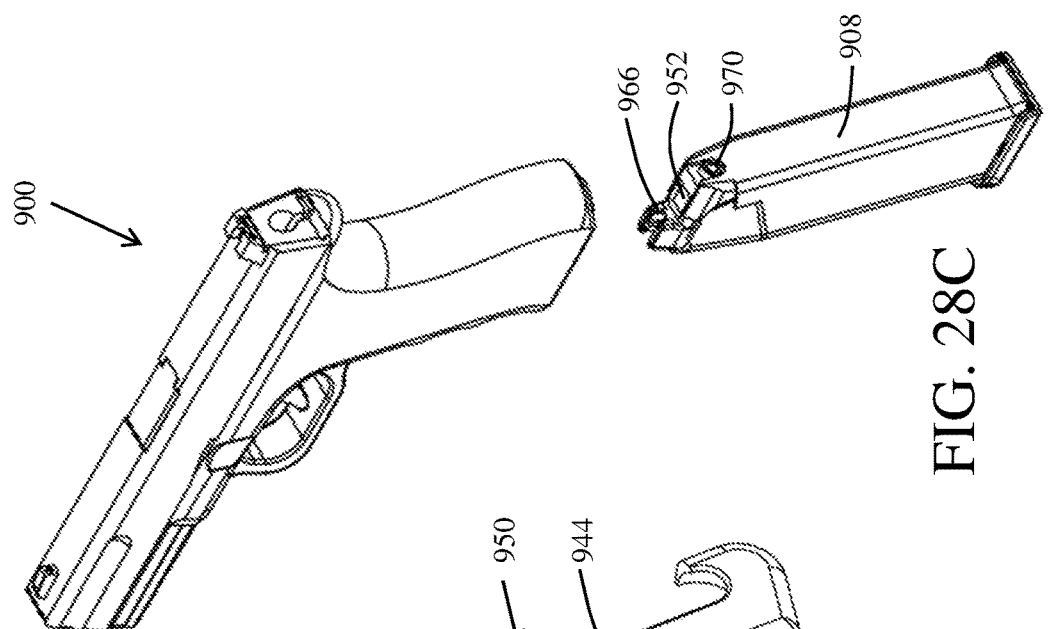
FIGS. 28A, 28B and 28C are non-limiting, exemplary illustrations of another embodiment of a non-lethal gas operated gun and its components.
Figure 28A:
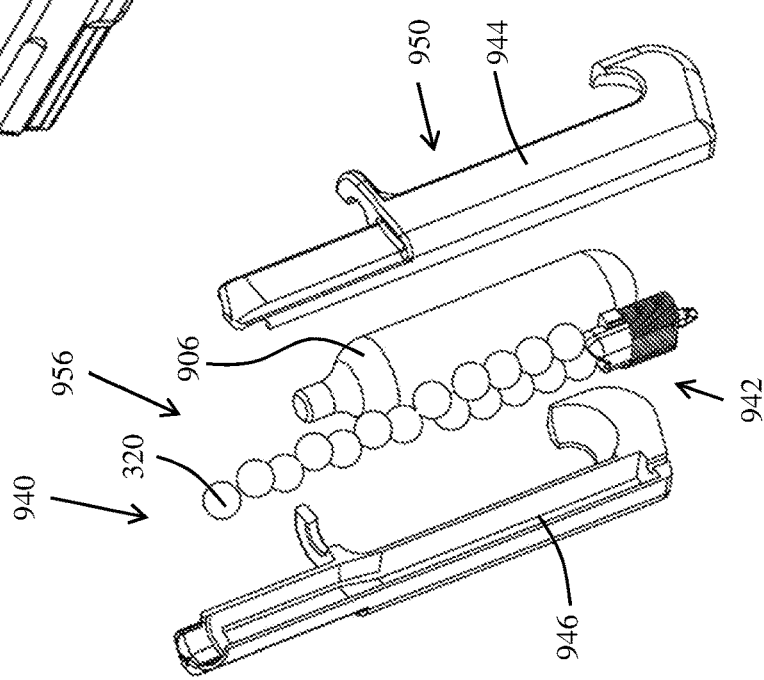
Figure 28B:
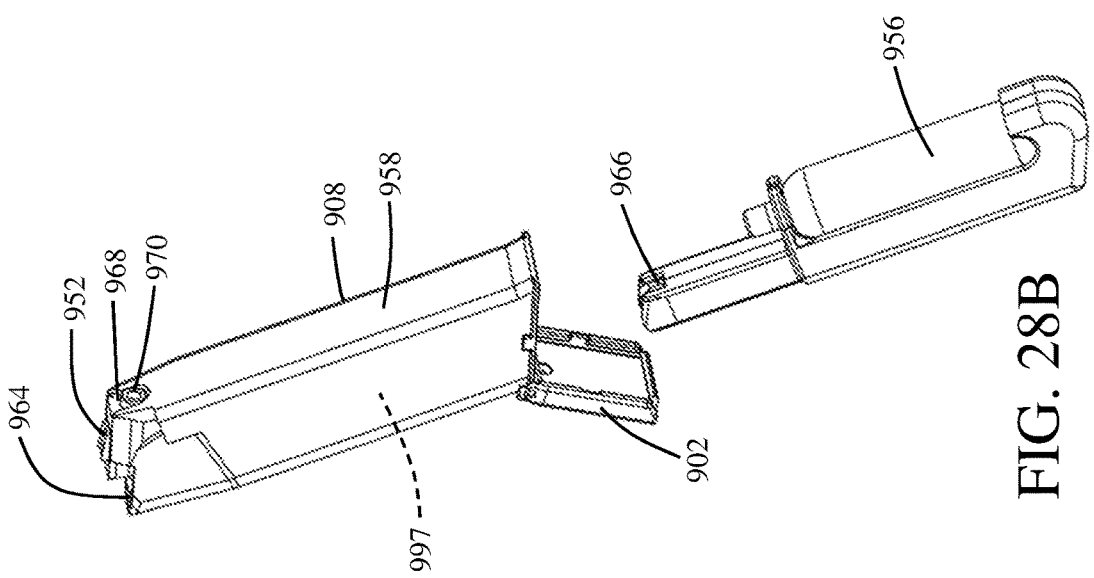

Referring now to FIGS. 28A, 28B and 28C, non-lethal gas-operated gun 900 is illustrated. Non-lethal gas-operated gun 900 is an alternate embodiment of the claimed invention. Non-lethal gas-operated gun 900 is generally similar to a Glock 17 pistol and is generally similar in the look, feel, operation and experience of a conventional firearm such as a Glock 17. Non-lethal gas-operated gun 900 generally includes magazine 908 that contains pre-pack 956 as described in detail above. Magazine 908 is removable insertable into non-lethal gas-operated gun 900 and generally is similar in the look, feel and experience of a pistol magazine such as a Glock 17 magazine holding live rounds. In other embodiments (not illustrated), the look and feel of other types of pistols can be reproduced, including the felt recoil when fired.

Magazine 908 includes housing 958 with a form-factor commensurate with a magazine well (not illustrated) in non-lethal gas-operated gun 900. Magazine 908 includes opening 964 that receives feeder 966 of pre-pack 956. Magazine 908 also includes gas seal 952 and magazine 908 defines opening 968 that receives strike member 970 of a gas system that is contained in magazine 908. The gas system in magazine 908 is similar to the gas system disclosed above with regard to magazine 108a.

Magazine 908 defines interior chamber 997 that receives pre-pack 956. Similar to magazine 108a detailed above, interior chamber 997 is keyed or indexed to receive pre-pack 956 in a specific orientation so that canister 906 is aligned with and is pierced by the gas regulator system of magazine 908 as enclosure 902 is fully latched (as shown in FIG. 28C). Magazine 908 includes enclosure 902 that contains pre-pack 956 inside enclosure 958.

As shown in FIG. 28A, pre-pack 956 is illustrated. Pre-pack 956 is a replaceable cartridge that includes casing 940, with casing 940 housing a projectile actuator assembly 942, a plurality of non-lethal projectiles 320 and accommodating gas canister 906. Casing 940 may comprise two mirrored pieces 944, 946 that may be connected together by a living hinge, solvent-bonded together, mechanically clipped together, ultrasonic welded together, or other well-known methods of connection. Projectile actuator assembly 942 may be similar to projectile actuator assembly 642 described above.

Casing 940 includes a cradle portion 950 that accommodates gas canister 906. Canister 906 may be secured to cradle portion 950 of casing 940 by a variety of mechanisms, a non-limiting example of which may include the use of adhesives such as a glue to fix canister 906 onto cradle portion 950 of casing 940. Casing 940 also includes feeder 966 that operates in the same way as feeder 566 described above.

As shown in FIGS. 29A, 29B and 29C, pre-pack 1056 is illustrated. Pre-pack 1056 is a replaceable cartridge that includes casing 1040, with casing 1040 accommodating gas canister 1006. Casing 1040 may comprise two mirrored pieces 1044, 1046 that may be connected together by a living hinge, solvent-bonded together, mechanically clipped together, ultrasonic welded together, or other well-known methods of connection. Pre-pack 1056 has similar dimensions as pre-pack 556a or 956 and is configured for use with magazine 108 and/or 908

Pre-pack 1056 does not include any structure similar to feeder 966 or feeder 566 or projectiles 320 described above. Instead, pre-pack 1056 is configured for use in situations where simulated weapon firing is desired but firing a projectile is not necessary. For example, pre-pack 1056 could be used with a non-lethal gas-operated gun fired in confined spaces where a projectile, even a non-lethal projectile, is not desired. Similarly, a non-lethal gas-operated gun could be integrated with a light or laser system and/or a virtual reality system where the hit point is determined by something other than a projectile, but the look and feel of an actual weapon is desired, for example, for training. Note that casing 1040 is the same as casing 940 and defines a compartment large enough to contain a feeder such as feeder 966 and 30 projectiles. Alternatively, a pre-pack 556a or 956 could be utilized in such an application, but without any projectiles, or with the projectiles retained in a position that they do not feed feeder 566.

Casing 1040 includes a cradle portion 1050 that accommodates gas canister 1006. Canister 1006 may be secured to cradle portion 1050 of casing 1040 by a variety of mechanisms, a non-limiting example of which may include the use of adhesives such as a glue to fix canister 1006 onto cradle portion 1050 of casing 1040. As shown in FIGS. 29A-29C, pre-pack 1056 may include collar 1052 to secure canister 1006 onto cradle portion 1050 of casing 1040. Collar 1052 is configured to closely fit neck 1007 of canister 1006. The use of collar 1052 to hold canister 1006 can optionally eliminate the use of adhesive to fix canister 1006 to cradle portion 1050 of casing 1040 of pre-pack 1056, which can eliminate a manufacturing step. It should be noted that collar 1052 maintains canister 1006 in place within casing 1040, which necessitates damaging the injection molded parts in order to remove the canister 1006, thus restricting re-use of pre-pack 1056.

Although the claimed invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments have been described, numerous variations and alternative embodiments will occur to those skilled in the art. For example, pre-pack 556 or 956 may comprise a single piece rather than two pieces. As another example, the path of the non-lethal projectiles within casings 640 could be purely linear (as shown) or cured in geometries similar to a "J" or a "U" shape to maximize the total number of non-lethal projectiles that could be housed in the allowed space. As yet another example, the two pieces of casing 640*b* or casing 640*a* may also be assembled so that the pieces are separated with ease (e.g., using well known detachable connection mechanisms) so that canister 206 or even their respective internally housed projectile actuator modules may be replaced without damaging the respective pre-packs 556*a* or 556*b*. Such variations and alternate embodiments are contemplated, and can be made without departing from the spirit and scope of the claimed invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

We claim:

1. A gas regulator assembly for use with an air gun and a gas canister containing gas pressurized at a canister pressure, the gas regulator assembly comprising:
 a piercing portal comprising an invasive probe adapted to pierce the gas canister and fluidly couple the gas canister to the piercing portal and a seal adapted to fluidly seal the gas canister and the piercing portal;
 a pressure regulator assembly comprising a restrictor valve, an inlet chamber and an outlet chamber, wherein the inlet chamber is fluidly coupled to the piercing portal, wherein the outlet chamber is fluidly coupled to the inlet chamber through the restrictor valve and wherein the restrictor valve reduces the pressure of gas passing through the restrictor valve to an operating pressure that is below the canister pressure;
 a gas storage chamber fluidly coupled to the outlet chamber, wherein the gas storage chamber contains a sufficient volume of gas at the operating pressure to enable automatic firing of the air gun at the operating pressure;
 a poppet valve fluidly coupled to the outlet chamber, wherein the poppet valve is adapted to provide sufficient gas flow from the outlet chamber and the gas storage chamber to fire the air gun when the poppet valve is actuated.

2. The gas regulator assembly of claim 1, wherein a volume of the gas storage chamber is larger than the outlet chamber.

3. The gas regulator assembly of claim 1, wherein a flow path between the outlet chamber and the poppet valve does not include the gas storage chamber.

4. The gas regulator assembly of claim 1, further comprising a relief valve fluidly coupled to the gas storage chamber, wherein the relief valve is adapted to reduce gas pressure in the gas storage chamber when gas pressure exceeds a maximum pressure.

5. The gas regulator assembly of claim 1, wherein the restrictor valve further comprises a first biasing mechanism that regulates the operating pressure.

6. The gas regulator assembly of claim 5, future comprising an adjuster mechanism adapted to adjust the operating pressure.

7. The gas regulator assembly of claim 5, further comprising a second biasing mechanism that acts against the first biasing mechanism.

8. The gas regulator assembly of claim 7, future comprising an adjuster mechanism adapted to adjust a force applied by the second biasing mechanism.

9. An air gun assembly and a gas canister containing gas pressurized at a canister pressure, the air gun assembly comprising:
 an air gun;
 a magazine that is removably insertable into the air gun, wherein the magazine comprises the gas regulator assembly of claim 1 and wherein the magazine can be fluidly coupled to the air gun.

10. The air gun assembly of claim 9, wherein the magazine further comprises a gas seal outlet fluidly coupled to the poppet valve, wherein the gas seal outlet is adapted to transfer compressed air from the poppet valve to the air gun.

11. The air gun assembly of claim 10, wherein the air gun further comprises a bolt comprising a gas inlet adapted to fluidly seal with the gas seal outlet when the gas inlet is aligned with the gas seal outlet.

12. The air gun assembly of claim 11, wherein the bolt defines a front bore that is fluidly coupled to the gas inlet, wherein the front bore is configured to fire a projectile out of a barrel of the air gun when the poppet valve is actuated.

13. The air gun assembly of claim 12, wherein the bolt further comprises a rocket valve that closes after the air gun fires the projectile so that air pressure from the gas inlet initiates a recoil process where the bolt moves rearward relative to the air gun.

14. The air gun assembly of claim 13, wherein, when closed, the rocket valve closes the fluid path between the gas inlet and the front bore.

15. The air gun assembly of claim 13, further comprising a recoil buffer that pushes the bolt forward relative to the air gun.

16. The air gun assembly of claim 13, wherein the bolt moving rearwardly generates felt recoil that approximates the recoil of a conventional live-fire weapon.

17. The air gun assembly of claim 13, wherein the air gun further comprises a trigger assembly comprising a trigger and a hammer and wherein the bolt moving rearwardly cocks the hammer.

18. The air gun assembly of claim 17, wherein the hammer is adapted to impact a secondary hammer which is adapted to subsequently impact the poppet valve in the magazine when the trigger is pulled.

19. The air gun assembly of claim 9, wherein the magazine is adapted to receive and feed a plurality of rounds that are fired by the air gun.

20. The air gun assembly of claim 9, wherein the magazine is adapted to receive the gas canister.

* * * * *